United States Patent [19]

Andersen et al.

[11] Patent Number: 5,549,859
[45] Date of Patent: Aug. 27, 1996

[54] METHODS FOR THE EXTRUSION OF NOVEL, HIGHLY PLASTIC AND MOLDABLE HYDRAULICALLY SETTABLE COMPOSITIONS

[75] Inventors: Per J. Andersen; Simon K. Hodson, both of Santa Barbara, Calif.

[73] Assignee: E. Khashoggi Industries, Santa Barbara, Calif.

[21] Appl. No.: 255,344

[22] Filed: Jun. 7, 1994

Related U.S. Application Data

[63] Continuation-in-part of Ser. No. 19,151, Feb. 17, 1993, Pat. No. 5,453,310, Ser. No. 95,662, Jul. 20, 1993, Pat. No. 5,385,764, Ser. No. 101,500, Aug. 3, 1993, and Ser. No. 109,100, Aug. 18, 1993, abandoned, each is a continuation-in-part of Ser. No. 929,898, Aug. 11, 1992, abandoned.

[51] Int. Cl.⁶ ............... B28B 1/00; B28B 21/52; B29C 47/00; B29C 65/00
[52] U.S. Cl. ............ 264/102; 264/148; 264/150; 264/152; 264/177.11; 264/211; 264/211.11; 264/241; 264/333
[58] Field of Search ............ 264/148, 177.11, 264/102, 177.1, 177.12, 177.17, 177.2, 211.2, 211.11, 211, 209.1, 209.3–209.4, 210.1–210.2, 210.5–210.6, 150, 163, 152, 241, 333

[56] References Cited

U.S. PATENT DOCUMENTS

| | | |
|---|---|---|
| 3,219,467 | 11/1965 | Redican . |
| 3,753,749 | 8/1973 | Nutt . |
| 3,754,954 | 8/1973 | Gabriel et al. . |
| 3,857,715 | 12/1974 | Humphrey . |
| 3,904,341 | 9/1975 | Putti . |
| 3,917,781 | 11/1975 | Gabriel et al. . |
| 3,927,163 | 12/1975 | Gabriel et al. . |
| 3,989,431 | 11/1976 | Martens . |
| 4,133,619 | 1/1979 | Wise . |
| 4,353,748 | 10/1982 | Birchall et al. . |
| 4,410,366 | 10/1983 | Birchall et al. . |
| 4,522,772 | 6/1985 | Bevan . |
| 4,524,042 | 6/1985 | Genba et al. . |
| 4,588,443 | 5/1986 | Bache . |
| 4,636,345 | 1/1987 | Jensen et al. . |
| 4,655,981 | 4/1987 | Nielsen et al. . |
| 4,943,219 | 7/1990 | Nash . |
| 4,968,236 | 11/1990 | Martens . |
| 5,030,282 | 7/1991 | Matsuhashi et al. . |
| 5,047,086 | 9/1991 | Hayakawa et al. . |
| 5,108,679 | 4/1992 | Rirsch et al. . |
| 5,154,771 | 10/1992 | Wada et al. . |
| 5,366,549 | 11/1994 | Imaizumi et al. ............ 264/333 X |

FOREIGN PATENT DOCUMENTS

| | | |
|---|---|---|
| 0340765A2 | 11/1989 | European Pat. Off. . |
| 3011330 | 3/1980 | Germany . |
| 53-16730 | 2/1978 | Japan . |

(List continued on next page.)

OTHER PUBLICATIONS

Shah, *Recent Trends In The Science and Technology of Concrete*, Trends in Science and Technology of Concrete.
ACBM, *Cementing the Future: A New Extrusion Technology*, vol. 6, No. 1, Spring 1994.

(List continued on next page.)

*Primary Examiner*—Karen Aftergut

[57] ABSTRACT

Hydraulically settable mixtures and methods for extruding such mixtures into a variety of objects which are form-stable in the green state. High green strength is achieved by increasing the yield stress of the mixture while maintaining adequate extrudability. Optimizing the particle packing density while including a deficiency of water yields a hydraulically settable mixture which will flow under pressures typically associated with the extrusion of clay or plastic. In addition, a rheology-modifying agent can be added to increase the yield stress of the mixture while not significantly increasing the viscosity. The desired strength properties and other performance criteria of the final hardened extruded product are controlled by adding aggregates, fibers, a hydraulically settable binder, water, and other admixtures.

104 Claims, 34 Drawing Sheets

FOREIGN PATENT DOCUMENTS

| | | |
|---|---|---|
| 55-37407 | 3/1980 | Japan. |
| 56-17965 | 2/1981 | Japan. |
| 58-120555 | 7/1983 | Japan. |
| 60-161381 | 8/1985 | Japan. |
| 60-264375 | 12/1985 | Japan. |
| 62-46941 | 2/1987 | Japan. |
| 62-39204 | 2/1987 | Japan. |
| 62-36055 | 2/1987 | Japan. |
| 62-36056 | 2/1987 | Japan. |
| 62-253407 | 5/1987 | Japan. |
| 62-151304 | 7/1987 | Japan. |
| 63-123851 | 5/1988 | Japan. |
| 63-210082 | 8/1988 | Japan. |
| 63-218589 | 9/1988 | Japan. |
| 63-248759 | 10/1988 | Japan. |
| 64-37478 | 2/1989 | Japan. |
| 2-51460 | 2/1990 | Japan. |
| 2-141484 | 5/1990 | Japan. |
| 3-80141 | 4/1991 | Japan. |
| 3-153551 | 7/1991 | Japan. |
| 3-187962 | 8/1991 | Japan. |
| 3-208847 | 9/1991 | Japan. |
| 3-202310 | 9/1991 | Japan. |
| 3-203313 | 9/1991 | Japan. |
| WO87/00828 | 2/1987 | WIPO. |
| WO93/20990 | 10/1993 | WIPO. |
| WO94/18388 | 8/1994 | WIPO. |
| WO94/18334 | 8/1994 | WIPO. |

OTHER PUBLICATIONS

Laenger, *Designing an Extruder with Allowance for the Properties of Ceramic Extrusion Compounds–Part 1*, cfi/Ber. DKG 67 (1990), No. 4.

Laenger, *Extruderauslegung unter Berucksichtingung . . . English Translation–Designing an Extruder with Allowance for the Properties of Ceramic . . . Part 2a*, cfi/Ber. DKG 68 (1991), No. 9.

Laenger, *Extruderauslegung unter Berucksichtingung . . . English Translation–Designing an Extruder with Allowance for the Properties of Ceramic . . . Part 2b*, cfi/Ber. DKG 68 (1991) No. 10/11.

Laenger, *Extruderauslegung unter Berucksichtingung . . . English Translation–Designing an Extruder with Allowance for the Properties of Ceramic . . . Part 3*, cfi/Ber. DKG 69 (1992), No. 3.

Laenger, *Extruderauslegung unter Berucksichtingung . . . English Translation–Designing an Extruder with Allowance for the Properties of Ceramic . . . Part 4a*, cfi/Ber. DKG 69 (1992), No. 7/8.

Laenger, *Extruderauslegung unter Berucksichtingung . . . English Translatin–Designing an Extruder with Allowance for the Properties of Ceramic . . . 4b*, cfi/Ber. DKG 69 (1992), No. 9.

Laenger, *Extruderauslegung unter Berucksichtingung . . . English Translation–Designing an Extruder with Allowance for the Properties of Ceramic . . . Part 5a*, cfi/Ber. DKG 69 (1992), 10.

Laenger, *Extruderauslegung unter Berucksichtingung . . . English Translation–Designing an Extruder with Allowance for the Properties of Ceramic . . . Part 5b*, cfi/Ber. DKG 70 (1993), No. 3.

Robinson, *Extrusion Defects*, pp. 391–407, (no date).

Benbow et al., *The Extrusion Mechanics of Pastes–The Influence of Paste Formulation on Extrusion Parameters*, Chemical Engineering Science, vol. 42, No. 9, pp. 2151–2162, (1987).

*Plastic–Forming Processess*, Corning Glass Works, pp. 357–361, (no date given).

*Fiberbeton–nyt*, Teknologisk Institut, Byggeteknik, Blad No. 1, Oktober 1987.

*English Translation*—Fiber Concrete News, Technological Institute of Denmark, Dept. of Building Technology, Pamphlet No. 1, Oct. 1987.

Finn Strabo et al., *Ekstrudering af Fiberbeton*, Teknologisk Institut, Byggeteknik, Oktober 1987.

*English Translation*–Finn Strabo et al., *Extrusion of Fiber Concrete*, Technology Institute of Denmark, Dept. of Building Technology, Oct. 1987.

Finn Strabo et al., *Nye Formgivningsmetoder til Fiberbeton*, Teknologisk Institut, Byggeteknik, Apr. 1987.

*English Translation*–New Design Methods for Fiber Concrete, Technological Institute of Denmark, Dept. of Building Technology, Apr. 1987.

N. Clauson–Kaas et al., *Ekstrudering af Fiberbeton–delrapport*, Teknologisk Institut, Byggeteknik, Dec. 1986.

Anderson, *Tailoring of Concrete Materials*, Rambøll & Hennemann, Annual Review, 1988, particularly p. 3.

Ashby, *Materials Selection in Engineering Design*, Indian J. of Techology, vol. 28, pp. 217–225, Jun.–Aug. 1990.

Steven H. Kosmatka & William C. Panarese, *Design and Control of Concrete Mixtures*, 77–93 (13th ed. 1988).

W. Vom Berg, *Influence of Specific Surface and Concentration of Solids Upon the Flow Behavior of Cement Pastes*, Magazine of Concrete Research, Dec. 1979, at 211–216.

Purton, *The Effect of Sand Grading on the Calcium Silicate Brick Reaction*, Cement and Concrete Research vol. 4, pp. 13√(1974).

Bache, *Densified Cement/Ultra–Fine Particle–Based Materials*, Presented at the Second International Conference on Superplasticizers in Concrete, (Jun. 10–12, 1991) in Ottawa, Canada.

Knudsen, *On Particle Size Distribution in Cement Hydration*, presented to the 7th International Congress on the Chemistry of Cement, Paris (1980).

Anderson, *Effects of W/C–Ration and Dispersion on the Pore Size Distribution of Cement Paste and Concrete*, Paper prepared for MRL by Per Just Anderson, Aug. (1988).

Sun, Lu, Touse, and Young, *The Composition of Hydrated DSP Cement Pastes*.

Roy, *New Strong Cement Materials: Chemically Bonded Ceramics*, Science, vol. 235, 6, Feb. (1987).

*Doing More With Less: Optimizing Concrete Mix*, Better Roads, Aug. (1990).

Westman and Hugill, *The Packing of Particles*, (1930)

Arioglu, *Analysis of the Concrete Strength versus Water––Cement Ratio Relationship*, ACI Materials Journal, Sep.–Oct. (1991)

Bailey and Higgins, *Flexural Strength of Cements*, Nature, vol. 292, 2 Jul. (1981).

Jennings, Bhatty, and Hodson, *Towards Establishing Relationships Between Microstructure and Properties of Cement–Based Materials*.

*Effects of Water Reducers and Retarders on the Microstructure of Cement Paste and Concrete*.

Dragicevic, *Prognosis of the Physical–Mechanical Characteristics of Portland Cement* The Highway Institute, Belgrade.

Studt, *New Advances Revive Interest In Cement–Based Materials*, R&D Magazine, Nov. (1992).

Shilstone, Sr., *Mix Temperature and $$$$$*, Concrete Producer News, Oct. (1989).

Shilstone, Sr., *Concrete Mixture Optimization by Coarseness Factor, Mortar Factor & Particle Distribution*, Concrete International, Dec., (1989).

Shilstone, Sr., *Mixture Optimization for Fast–Track*, Report for American Concrete Institution Convention, San Diego, CA.

*Packing Program*, G. M. Idorn Consult A/S.

Stovall, De Larrard, and Buil, *Linear Packing Density Model of Grain Mixtures*, Powder Technology, 48 (1986), 1–12.

Furnas, *Grading Aggregates. 1–Mathematical Relations for Beds of Broken Solids of Maximum Density*, Industrial and Engineering Chemistry, Sep. (1931).

Ridgway and Tarbuck, *Particulate Mixture Bulk Densities*, Chemical and Process Engineering, Feb. (1968).

Osbaeck and Johansen, *Particle Size Distribution and Rate of Strength Development*, Paper for the 89th Annual Meeting of the American Ceramic Society, Inc., Pittsburgh, PA, Apr. 26–30, (1987).

McGeary, *Mechanical Packing of Spherical Particles*, Journal of the American Ceramic Society, vol. 44, No. 10, Oct. (1961).

Patankar and Mandal, *The Packing of Some Non–Spherical Solid Particles*, Trans. J. Brit. Ceram. Soc., 79, 59–66, (1980).

Gebler, *The Effects of High–Range Water Reducers on the Properties of Freshly Mixed and Hardened Flowing Concrete*, Portland Cement Association Research and Development Bulletin RD081.01T, (1982).

Saglik and Jennings, *An Improved Mathematical Model for the Kinetics of Portland Cement Hydration. Part 1. Theory*.

Knudsen, *Modelling Hydration of Portland Cement: The Effect of Particle Size Distribution*, Paper presented at the Engineering Foundation Conference, Jul. 25–30, (1982) Henniker, N. H.

Young, *Macro–Defect–Free Cement: A Review*, Mat. Res. Soc. Symp. Proc. vol. 179 (1991).

Idorn and Henriksen, *State of the Art for Fly Ash Uses in Concrete*, Cement and Concrete Research, vol. 14, pp. 463–470, (1984).

Fedors and Landel, *An Empirical Method of Estimating the Void Fraction in Mixtures of Uniform Particles of Different Size*, Powder Technology, 23 (1979), 225–231.

Shilstone, *A Hard Look At Concrete*, Civil Engineering, Jan. (1989).

Bach and Eternit, *Development of Structure in Hydrating Particulate Systems and Influence on Rheology and Final Properties*, Paper presented at a Conference on Advances in Cementitious Materials, Jul. 22–26, (1990), Gaithersburg, MA.

Anderson, et al., *Tailoring of Cement–Bound Materials By the Use of Packing and Rheological Models*, American Ceramic Society (1988).

Johansen, Vagn and Andersen, *Particle Packing and Concrete Properties*, Materials Science of Concrete II, pp. 111–147.

Lewis and Kriven, *Microstructure–Property Relationships in Macro–Defect–Free Cement*, MRS Bulletin, Mar. 1993.

Roy, et al., *Processing of Optimized Cements and Concretes Via Particle Packing*, MRS Bulletin (Mar. 1993).

Young and Berg, *Introduction to MDF Cement Composites*, ACBM vol. 1, No. 2, Fall 1989.

Zukoswski and Struble, *Rheology of Cementitious Systems*, MRS Bulletin, Mar. 1993.

Andersen, *Effect of Organic Superplasticizing Admixtures and Their Components on Zeta Potential and Related Properties of Cement Materials*, Thesis in Concrete Technology submitted in fulfillment of degree requirements (May 1987).

Andersen, *Evaluation of the Potential Alkali–Silica Reactivity of Sand and Coarse Aggregates by the Use of a New Zeta Potential Method*, GM Idorn Consult A/S, (Aug. 1988).

Andersen, *Control and Monitoring of Concrete Production: a Study of Particle Packing and Rheology*, Danish Academy of Technical Sciences (1990).

J. Murata, *Flow and Deformation of Fresh Concrete*, Materials and Structures, Mar.–Apr. 1984, pp. 117–129.

65% Solid Particles    35% Water

Volume

95% Solid Particles    5% Water

Volume

70% Solid Particles | 15% Air | 15% Water

80% Solid Particles | 5% Air | 15% Water

METHODS FOR THE EXTRUSION OF NOVEL, HIGHLY PLASTIC AND MOLDABLE HYDRAULICALLY SETTABLE COMPOSITIONS

RELATED APPLICATIONS

This application is a continuation-in-part of U.S. patent application Ser. No. 08/019,151, entitled "Cementitious Materials For Use in Packaging Containers and Their Methods of Manufacture," and filed Feb. 17, 1993, in the names of Per Just Andersen, Ph.D., and Simon K. Hodson, now U.S. Pat. No. 5,453,310. This application is also a continuation-in-part of U.S. patent application Ser. No. 08/095,662, entitled "Hydraulically Settable Containers And Other Articles For Storing, Dispensing, And Packaging Food And Beverages And Methods For Their Manufacture," and filed Jul. 20, 1993, in the names of Per Just Andersen, Ph.D., and Simon K. Hodson, now U.S. Pat. No. 5,385,764. This application is also a continuation-in-part of U.S. patent application Ser. No. 08/101,500, entitled "Methods And Apparatus For Manufacturing Moldable Hydraulically Settable Sheets Used In Making Containers, Printed Materials, And Other Objects," and filed Aug. 3, 1993, in the names of Per Just Andersen, Ph.D., and Simon K. Hodson. This application is also a continuation-in-part of U.S. patent application Ser. No. 08/109,100, entitled "Design Optimized Compositions And Processes For Microstructurally Engineering Cementitious Mixtures," and filed Aug. 18, 1993, in the names of Per Just Andersen, Ph.D. and Simon K. Hodson (now abandoned). Each of these applications is also a continuation-in-part of U.S. patent application Ser. No. 07/929,898, entitled "Cementitious Food And Beverage Storage, Dispensing, And Packaging Containers And The Methods Of Manufacturing Same," and filed Aug. 11, 1992, in the names of Per Just Andersen, Ph.D., and Simon K. Hodson (now abandoned). For purposes of disclosure, each of these applications is incorporated herein by specific reference.

BACKGROUND OF THE INVENTION

1. The Field of the Invention

The present invention relates to hydraulically settable compositions and methods used to extrude a wide variety of articles therefrom. More particularly, the invention relates to hydraulically settable mixtures which have rheological properties that render them highly extrudable under pressure and then form-stable immediately after they have been extruded, even while in the green or unhardened state. The compositions and methods allow for the extrusion of articles having thin walls, complicated shapes, or highly critical tolerances.

2. The Relevant Technology

Hydraulically settable materials such as those that contain a hydraulically settable binder like hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. Hydraulic cement is a hydraulically settable binder derived from clay and limestone, while gypsum is a naturally occurring mineral. Both are essentially nondepletable.

Hydraulically settable materials are generally formed by mixing a hydraulically settable binder with water and usually some type of aggregate to form a hydraulically settable mixture, which hardens into, e.g., concrete. Typically, a freshly mixed hydraulically settable mixture is fairly non-viscous, semi-fluid slurry, capable of being mixed and formed by hand. Because of its fluid-like nature, a hydraulically settable mixture is generally shaped by being poured into a mold, worked to eliminate large air pockets, and allowed to harden. If the surface of the concrete structure is to be exposed, such as on a concrete sidewalk, additional efforts are usually made to finish the surface to make it more functional and to give it the desired surface characteristics.

Due to the high level of fluidity required for typical hydraulically settable mixtures to have adequate workability, the uses of concrete and other hydraulically settable materials have been limited to mainly simple shapes which are generally large, heavy, and bulky, and which require mechanical forces to retain their shape for an extended period of time until sufficient hardening of the material has occurred. Another aspect of traditional hydraulically settable mixtures or slurries is that they have little or no form-stability and are usually molded into the final form by pouring the mixture into a space having externally supported boundaries or walls. The problem of low form-stability is exacerbated by the lengthy curing and hardening times of most concretes. It may take days for most cementitious mixtures to have enough strength to be demolded without being harmed, and weeks of wet curing to avoid defects in the structural matrix.

The uses of hydraulically settable materials have also been limited by the strength properties of concrete, namely, the high ratio of compressive strength to tensile strength, which is usually about 10:1. Fortunately, the strength limitations of concrete can usually be overcome by simply molding it into massive structures of enormous size. This is possible because of the extremely low cost of most concretes. The tensile strength of such massive structures has also been improved by extensive use of metal reinforcing bars, or "rebar". However, the use of such hydraulically settable materials to make smaller, thinner-walled articles has not been possible. The inability to use conventional cementitious materials in the manufacture of small, thin-walled objects is further complicated by the low strength per unit weight of the composition. In light of these factors, concrete is ideally suited for manufacturing large, bulky, and massive objects such as curbs, walkways, highways, bridges, buildings, aqueducts, sewer pipes, etc.

The long time period which must pass before typical hardened cementitious products can be demolded greatly impedes the ability to mass produce cementitious objects and increases the cost of the final product. The lengthy period before demolding also makes necessary the initial investment of substantial amounts of money in order to purchase the large number of molds required to mass produce a particular shape or article.

One way to avoid the added difficulties of having to demold the large, molded concrete forms would be to create a cementitious mixture with sufficient viscosity and cohesive strength so that it could be extruded into the desired shape without a mold and then maintain that shape (i.e., have form-stability). Extrusion of such a material would allow for the continuous production of hydraulically settable objects without the use of molds. The term "extrusion" has often been misleadingly used in many patents and articles to denote processes for laying out a continuous layer of concrete in a mold, which is then often compacted. Some have attempted to "extrude" cementitious mixtures, although the objects extruded therefrom have mainly consisted of slab-like objects, relatively thick-walled pipes, and other structures of simple shape.

The extrusion processes that do not require a mold, mandrel, or other supporting structure often involve the vertical (or downward) extrusion of materials to eliminate gravitational deformation of the structure. One problem with this is the discontinuous nature of the downward extrusion process, since the extruded structures will eventually fail under their own weight. Another drawback has been that to obtain structures that would maintain their shape and not slump when extruded it has been necessary to use highly viscous cementitious materials that require correspondingly high extrusion pressures and energies (such as vibration). In most cases, true form-stability (in which the object will not slump without supporting mandrels, or in the vertical position) is not achieved for a significant period of time, usually minutes or even hours. The use of fibers to improve the material properties of the final cured materials has further compounded the difficulties of the prior "extrusion" processes.

An example of an "extrudable" cementitious mixture can be found in U.S. Pat. No. 3,857,715 to Humphrey. Humphrey discloses a cementitious mixture having a low water content, a carbohydrate additive (such as molasses), and a high pH regulator, and which is said to be "self-supporting before being cured" (col. 3, lines 19–20), at least with respect to the objects which were reportedly formed by extrusion, namely "concrete block and pipe." (col. 1, line 7).

Nevertheless, Humphrey only partially solves the problems typically associated with the molding of cementitious materials, which have prevented their use in manufacturing a variety of useful objects which must presently be made from materials having superior properties of strength or moldability (such as paper, paperboard, plastic, polystyrene, or metal). The cementitious mixtures disclosed in Humphrey are only useful in the manufacture of relatively large, bulky objects of extremely simple shape, such as concrete slabs or relatively thick-walled pipes (measured by the ratio of wall thickness to cavity cross-section). There is no indication that the compositions in Humphrey can be molded or extruded into more complicated structures or objects having relatively thin walls or highly critical tolerances.

In addition, the cementitious mixtures disclosed in Humphrey obtain their higher level of plastic-like behavior and form-stability through the use of sugar-based additives, together with a strong base, such as NaOH, and set accelerators, such as $CaCl_2$. The use of these additives in these combinations diminishes the ultimate strength of the final cured cementitious product. Furthermore, in spite of the use of accelerators, the use of sugars to thicken the cementitious composition in Humphrey greatly retards the hydraulic reaction of the cement binder to the point that the extruded materials will sag or slump over time because of the inability of the mixtures to hydrate, and thereby solidify, in a timely manner.

U.S. Pat. No. 5,047,086 to Hayakawa et al. discloses a cementitious composition suitable for "extrusion molding" into the shape of boards having nailing and sawing characteristics similar to that of wood. In order to provide a composition with adequate extrudability, a cellulose-based additive is blended with the cementitious mixture in an amount of 0.2% to 1% by weight, along with cellulosic fibers. However, Hayakawa et al. does not disclose or teach that the cementitious mixture described therein would be useful in creating "extruded" articles other than flat boards. Nor does Hayakawa et al. anywhere indicate that the cementitious materials disclosed therein would have adequate strength, toughness, or other performance criteria that would allow it to be extruded into anything other than relatively thick boards having a simple, rectangular shape.

U.S. Pat. No. 4,588,443 to Bache discloses a densified cementitious product known in the art as "DSP", which has superior compressive strength properties and which is ideal for a number of uses requiring high compressive strength concrete. Within Bache are drawings showing a cementitious mixture being "extruded" onto a form, or extruded to form a continuous strip which is then spiral wound onto a mandrel to form a pipe. However, nowhere does Bache teach that the cementitious materials disclosed therein might be extruded into more complicated structures, including multicellular or thin-walled objects, which will then maintain their shape without external support. Moreover, Bache fails to teach how to obtain a hydraulically settable mixture that is form-stable in the green state.

A major reason why cementitious materials, including those disclosed in Humphrey, Hayakawa et al., and Bache, are not capable of being continuously extruded into complicated or thin-walled shapes is the tradeoff between workability and form-stability. The level of workability and flowability is substantially constant in all known cementitious compositions throughout the three phases of extrusion: (1) placing the mixture into the extruder opening, (2) applying a pressure to the mixture to cause it to flow through the extruder, and (3) allowing the mixture to pass through a die orifice of the extruder. Although a stiff product might be greatly desired after step (3), it cannot be so stiff as to prevent the flowability of the mixture during step (2). Vibration of the mixture during steps (2) and (3) is often necessary in order for the mixture to flow or be "extruded."

In order for a hydraulically settable mixture to be capable of being extruded using ordinary auger extruders used to extrude clay or plastic, the stiffness of the hydraulically settable mixture may not exceed the level which will prevent it from flowing through the extruder (or which would only yield a dry, noncohesive extrudate). However, the maximum allowable stiffness which will still allow the hydraulically settable mixture to flow through the extruder has heretofore yielded an extruded product having inadequate form-stability for all but the simplest extruded articles, such as the cement slabs or thick-walled pipes disclosed in Humphrey or Hayakawa et al. In most cases, the "extruded" cementitious mixture must be placed into a supporting form or onto a mandrel in order to maintain the "extruded" material in the desired shape, such as in Bache.

As the article being extruded becomes thinner-walled (by using a die head with smaller openings), greater amounts of pressure and workability are required to overcome the increased resistance to flow of the material. However, greater cohesive strength and form-stability are also required in order for an extruded material having thinner walls to maintain its shape without external support. For this reason, cementitious mixtures have not been used to extrude anything but the simplest of objects because they have not been able to simultaneously have adequate extrudability while yielding a product with adequate form-stability.

Because of the tradeoff between workability (and extrudability) and form-stability, cementitious materials which are "extruded" horizontally according to conventional methods generally must have a wall thickness of about 25% of the cavity cross-section in the case of hollow objects (e.g., pipe), although vertically extruded objects can have a wall thickness to cavity cross-section up to about 1:16. Furthermore, conventional cementitious mixtures typically cannot be continuously extruded into objects that are very long. For example, the length to width ratio of most extruded objects has typically peaked out at about 5:1.

Even when fully cured, typical cementitious materials, even those disclosed in Humphrey, Hayakawa et al., and Bache, have relatively low tensile and flexural strengths compared to other materials such as paper, metal, or plastic. On the other hand, typical cementitious mixtures, particularly those such as DSP, have a correspondingly high level of compressive strength to the point that it is unnecessary and, hence, inefficient. The relatively low tensile and flexural strengths, along with the problems with molding or forming cementitious mixtures, limit the use of cementitious mixtures to mainly large, bulky, heavyweight objects. Consequently, it would be a tremendous advancement in the art if a wider variety of articles having complex shapes or highly critical tolerances could be manufactured from cementitious mixtures, particularly in light of the extremely low cost of cementitious materials compared to most other materials.

In fact, it is completely contrary to human experience to imagine the manufacture from hydraulically settable materials of small, thin-walled, relatively lightweight articles which are presently manufactured from lighter weight, yet higher strength, materials such as paper, paperboard, plastic or other polymers, and aluminum or other metals. It would be an even greater achievement if such hydraulically settable objects could be mass-produced in an economical and cost-effective manner.

Due to a growing awareness of the environmental harm caused by the massive use of paper, paperboard, plastic, metal, and wood to manufacture the large quantities of mainly disposable items, there has been an acute need to find environmentally sound substitutes for such materials, such as hydraulically settable materials. In spite of such pressures and long-felt need, the technology simply has not previously existed for the economic and feasible production of hydraulically settable materials which could be substituted for paper, paperboard, plastic, polystyrene, metal, or wood in making a huge variety of articles. From an ecological standpoint, such a substitution of materials would greatly reduce the amount of essentially nondegradable, environmentally harmful refuse which continues to build up within the nation's ever dwindling landfills.

Hydraulically settable materials are environmentally sound because they essentially include aggregates consisting of natural geologic materials, such as sand and clay, which are bound together by the reaction products of a hydraulically settable binder and water, which is also essentially "rocklike" from a structural, and especially chemical, viewpoint. Hydraulically settable materials have essentially the same chemical and structural composition as the earth into which such materials might eventually be disposed.

In addition, paper, plastic, metal, and wood are far more expensive than typical hydraulically settable (including cementitious) materials. Because no rational business would ignore the economic benefit which would necessarily accrue from the substitution of radically cheaper hydraulically settable materials for paper, paperboard, plastic, metal, or wood materials, the failure to do so can only be explained by a marked absence of available technology to make the substitution.

Based on the foregoing, it would be an advancement in the art to provide compositions and methods that would allow the extrusion of hydraulically settable materials into articles and shapes which have heretofore been impossible because of the inherent strength and moldability limitations of presently known hydraulically settable compositions.

It would yet be a tremendous advancement in the art to provide compositions and methods which result in the ability to extrude hydraulically settable products that have high strength in the green state. Such composition and methods would be particularly useful if the extruded products were immediately self-supporting without external support.

It would further be an advancement in the art to provide hydraulically settable compositions which were highly plastic or moldable and which would readily maintain whatever shape into which they were extruded.

It would be an even greater advancement if such extruded hydraulically settable materials could be handled and transported using conventional handling means.

Still, it would be an advancement in the art to provide compositions and methods which would yield a variety of thin-walled hydraulically settable articles. In addition, it would be a tremendous advancement in the art to extrude hydraulically settable articles having highly critical tolerances or dimensional preciseness.

It would yet be an advancement in the art to provide compositions and methods for the extrusion of hydraulically settable articles having an increased tensile strength to compressive strength ratio compared to conventional hydraulically settable materials.

It would be a tremendous advancement in the art to provide compositions and methods which could be used to extrude hydraulically settable articles that could take the place of articles presently manufactured from other materials, such as paper, paperboard, plastic, clay, metal, or wood.

In addition, it would be a significant improvement in the art if such compositions and methods yielded hydraulically settable articles which were environmentally benign which essentially consisted of the components found naturally within the earth.

It would be an advancement in the art to provide hydraulically settable compositions that had the rheology and plastic-like behavior of clay such that such compositions could be extruded using a clay extruder.

From a practical point of view, it would be a significant improvement if such compositions and methods made possible the continuous manufacture of hydraulically settable articles at a cost and at production rates (i.e., high quantity) that are comparable or superior to the cost of manufacturing such articles from paper, paperboard, plastic, clay, metal, or wood.

Such compositions and methods are disclosed and claimed herein.

SUMMARY AND OBJECTS OF THE INVENTION

The present invention encompasses novel hydraulically settable compositions and methods used for extruding a variety of objects therefrom. Such compositions can generally be described as multi-component, multi-scale, fiber-reinforced, micro-composites. By carefully incorporating a variety of different materials (including hydraulically settable binders, inorganic aggregates, rheology-modifying agents, and fibers) capable of imparting discrete yet synergistically related properties, it is possible to create a unique class or range of micro-composites having remarkable properties of strength, toughness, environmental soundness, mass-producibility, and low cost.

These compositions can be extruded into a variety of shapes, ranging from the very simple to articles having highly critical tolerances and thin walls. Because of the continuous nature of the extrusion process, such articles can be produced in a very cost-effective and economical manner. Moreover, the hydraulically settable materials of the present invention are environmentally neutral and comprise materials that have essentially the same qualities and characteristics as the earth, as do most hydraulically settable materials.

Using a microstructural engineering approach, one can design into a hydraulically settable mixture the desired properties of rheology (including workability, yield stress, viscosity, and green strength) and final cured strength. In addition, properties such as high particle packing density, toughness, tensile strength, and elongation can also be designed into the mixture beforehand.

In order to solve the problems inherent in typical hydraulically settable mixtures, namely the tradeoff between good workability and high green strength, the present invention makes possible the ability to have a high degree of workability during the molding process and yet achieve form-stability immediately or shortly after the extrusion process. This is preferably accomplished by creating a hydraulically settable mixture having a relatively high yield stress and an apparently low viscosity, particularly when exposed to higher pressures during the extrusion process.

To achieve high extrudability and high green strength (i.e., form-stability), the hydraulically settable mixtures of the present invention generally rely on the heretofore perceived nonanalogous properties of particle packing optimization and water deficiency to create a relatively stiff material with high yield stress, but which has high workability when subjected to the increased pressures and shear rates associated with extrusion. By choosing aggregates selected to have varying but carefully chosen diameters, particle size distribution ("PSD"), and packing density, it is possible to reduce the amount of interstitial space between the particles by filling the spaces between the larger particles with smaller particles, and in turn filling the spaces formed by the smaller particles by yet smaller particles. In this way, it is possible to achieve particle packing densities in the range from about 65% to even as high as about 99%. That is, the volume of the dry hydraulically settable mixture will include from about 65% to about 99% solid material, and only from about 35% to as low as about 1% interstitial space.

By carefully controlling how much water is added to the hydraulically settable mixture, one can create a mixture having a carefully chosen degree of "water deficiency." As discussed in greater detail below, it should be understood that water is added to a hydraulically settable mixture for essentially two reasons: (1) to chemically react with (or "hydrate") the hydraulically settable binder and (2) to fill the voids between the particles in order to reduce the friction between the particles and lubricate them in order to give the mixture adequate plasticity and cohesion. If the amount of water is deficient, there will be greater friction between the particles, thereby resulting in a stiffer material. Depending on the amount of water or other additives (such as dispersants, which can be added to lubricate or disperse the particles), one skilled in the art can carefully control the rheology in order to create the desired level of workability under pressure.

It should be understood that a mixture having greater packing density will require much less water to fill the interstitial voids. Consequently, the amount of water added to create a desired level of water deficiency must be carefully calculated before the water is added, the amount of water being based primarily upon the particle packing efficiency and the anticipated compression of the extrusion process.

Once a suitable hydraulically settable mixture has been created, it is placed in an extruder and then subjected to pressure. The resulting compression increases the packing density by forcing the particles together, which in turn decreases the volume of interstitial space between the individual particles of the mixture. This decreases the "effective" level of water deficiency, which increases the amount of water available to lubricate the particles (as well as to lubricate the movement of the hydraulically settable mixture through the extruder die), whereupon the hydraulically settable mixture has greater workability and is able to flow. In addition, compressing the mixture during extrusion also creates a thin film of water between the extruder die and the mixture, which lubricates the surface between the die and mixture. The extruder die may also be heated in order to create a steam "cushion" or barrier between the extruded hydraulically settable mixture and the extruder die, thereby reducing the friction and increasing the ease of extrusion. Thereafter, the internally formed capillaries or menisci caused by compressing the mixture creates internal cohesion forces that give the mixture improved form-stability after extrusion.

The high level of workability and flowability of the mixture while under pressure allows it to be extruded through an orifice of an extruder die into the desired article or shape. The ability of the hydraulically settable mixture to be extruded and have good form-stability may be accomplished in one of two ways. First, because most of the hydraulically settable mixtures of the present invention approximately behave as a Bingham fluid, or pseudo-plastic body, the viscosity of the mixture will decrease as the critical shear rate in the form of applied pressure is exceeded. In other words, the hydraulically settable mixtures of the present invention usually experience "shear thinning" as the pressure (and hence the shear) is increased, such as by using an extruder capable of applying high pressure. Hence, by applying high pressures, most hydraulically settable mixtures of the present invention can be extruded.

Instead of, or in addition to the application of high pressure, it may also be advantageous to design a hydraulically settable mixture that has the lowest possible ratio of viscosity to yield stress. As the viscosity is lowered the amount of stress above the materials yield stress necessary to cause the mixture to flow decreases. This strategy is especially useful where lower pressure extrusion is desired.

Upon being extruded, the hydraulically settable mixture will no longer be exposed to the compressive and shear forces of the extruder, and the mixture will then revert to its pre-compression stage of greater stiffness and higher viscosity. Consequently, the extruded shape or article will exhibit a high level of green strength and form-stability. The amount of green strength achieved by the compositions and methods of the present invention far exceeds that which has been obtained using previous cementitious compositions and methods.

The hydraulically settable compositions of the present invention may also include other components besides a hydraulically settable binder, water, and aggregates such as rheology-modifying agents, dispersants, and fibers. Rheology-modifying agents can be added to increase the yield stress, cohesive strength, and plastic-like behavior of the hydraulically settable mixture, while dispersants can be added in order to obtain a mixture having similar flow properties while including less water. Fibers are usually added to increase the toughness and tensile, flexural and, sometimes, even the compressive strength of the final cured product.

More particularly, rheology-modifying agents increase the "plastic-like" behavior, or the ability of the mixture to retain its shape when molded or extruded. Suitable rheology-modifying agents include a variety of cellulose-, starch-, and protein-based materials, which can be ionic or nonionic, and which act by bridging the individual hydraulically settable binder particles and other particles in the matrix together.

By increasing the "plastic-like" consistency of the hydraulically settable mixture, the rheology-modifying agent also increases the ability to extrude an article having high form-stability. (Gypsum hemihydrate may also be added in order to increase the form-stability due to its rapid reaction with water, thereby reducing the amount of capillary water present in the hydraulically settable mixture in a short period of time. In this way gypsum hemihydrate may act as a rheology-modifying agent in some cases.)

Dispersants, on the other hand, act to decrease the viscosity and yield stress of the mixture by dispersing the individual hydraulically settable binder particles. This allows for the use of less water while maintaining adequate levels of workability, which allows for greater water deficiency. Suitable dispersants include any material which can be adsorbed onto the surface of the hydraulically settable binder particles and which act to disperse the particles, usually by creating a negative electrical charge on the particle surface or into the near colloid double layer. Fillers such as kaolin, mica, calcium carbonate, or bentonite also become highly dispersed by the use of dispersants.

However, in the case where both a dispersant and a rheology-modifying agent are used, it will usually be advantageous to add the dispersant first and the rheology-modifying agent second in order to obtain the beneficial effects of each. Otherwise, if the rheology-modifying is first adsorbed by the binder particles it will form a protective colloid, which will greatly inhibit the adsorption of the dispersant by the particles, thereby limiting the dispersing effect of the dispersant within the hydraulically settable mixture.

In addition to adding aggregates having various diameters, shapes, sizes, and properties (e.g., specific gravity, bulk density, morphology), it might be desired to include aggregates having different strength and insulation properties. In this way, the hydraulically settable mixture can be optimized both from the standpoint of the desired rheology or flow properties useful in the extrusion process as well as the final properties of the cured material.

Using the compositions and processes described above, it has been possible to extrude a wide variety of different articles having varying shapes, sizes, thicknesses, and other properties. Such extruded objects or shapes include flat sheets, rods, bars, rectangular bars, boards, "I-beams," "two-by-fours," honeycomb and other multicellular structures, corrugated structures, pencils, cylinders, peanut-shaped packing materials, pipes, "spaghetti" or other packaging or filler material, window frames, bricks, roofing tiles, or factory panels. It has been possible to maintain highly critical tolerances of these extruded objects, where necessary, because of the workability and high green strength of the hydraulically settable mixtures disclosed and claimed herein.

These objects have properties which are similar, and even superior, to similar objects made from other materials such as paper, plastic, paperboard, polystyrene, wood, clay, or metal. However, hydraulically settable materials have the advantage that they are often much lower in cost than these other materials. In addition, the hydraulically settable materials made according to the present invention are much more environmentally benign than presently used materials and do not require further processing after extrusion.

From the foregoing, it would be appreciated that an object of the present invention is to provide and teach the microstructural engineering design process for obtaining highly plastic, extrudable hydraulically settable mixtures that can be extruded into a variety of articles not previously obtainable using hydraulically settable mixtures of the prior art. This is accomplished by creating hydraulically settable mixtures having high yield stress and sufficiently low viscosity under pressure so that the mixture will flow during the extrusion process but have sufficient cohesiveness to be immediately form-stable and strong enough to maintain its shape without external support after being extruded, even while in a green state.

Another object of the present invention is to provide hydraulically settable compositions which are highly plastic or moldable and which will readily maintain whatever shape into which they are extruded. Yet another object is to provide hydraulically settable materials and methods in order to extrude articles that can be handled and transported using conventional means.

It is a further object of the present invention to provide hydraulically settable compositions and methods which yield a variety of thin-walled articles including articles that require highly critical tolerances or dimensional preciseness.

Yet another object of the present invention is to provide compositions and methods for the extrusion of hydraulically settable articles having an increased tensile strength to compressive strength ratio compared to conventional hydraulically settable materials.

A still further object and feature of the present invention is the development of hydraulically settable compositions and methods used to extrude a variety of articles that can take the place of articles presently manufactured from other materials, such as paper, paperboard, plastic, wood, clay, or metal.

Another object and feature of the present invention is the development of compositions and methods that yield hydraulically settable articles which are environmentally benign and which essentially consist of the components found naturally within the earth.

Yet another object of the present invention is to provide hydraulically settable compositions that have the rheology and plastic-like behavior of clay, such that they can be extruded using a clay extruder.

A still further object and feature of the present invention is the development of hydraulically settable compositions and methods which make possible the manufacture of a variety of hydraulically settable articles at a cost and at production rates that are comparable or superior to the cost of manufacturing such articles from paper, paperboard, plastic, wood, clay or metal.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof, which is illustrated in the appended drawings. Understanding that these drawings depict only a typical embodiment of the invention and are not, therefore, to be considered limiting of its scope, the invention will be described and explained with additional specificity and detail through the use of the accompanying drawings in which.

DETAILED DESCRIPTION OF THE PREFERRED EMBODIMENTS

Figure 1:
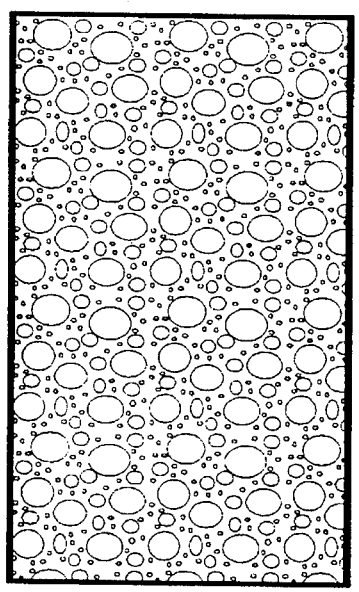
FIG. 1 is a greatly enlarged elevational cross-section view of the arrangement of particles within a hydraulically settable mixture having a moderately high natural particle packing density of 70%.

The present invention includes novel compositions and methods for obtaining highly plastic, extrudable hydraulically settable mixtures, which can be extruded into a variety of articles, including those which have thin walls, complicated shapes, and/or highly critical tolerances. In addition, relatively large, thick-walled objects such as "two-by-fours" or other structural objects can also be efficiently extruded using the compositions of the present invention. Such extruded objects are immediately (or in a manner of seconds) form-stable upon being extruded.

The novel extrudable compositions can generally be described as multi-component, multi-scale, fiber-reinforced, micro-composites. By carefully incorporating a variety of different materials (including inorganics and fibers) capable of imparting discrete yet synergistically related properties, it is possible to create a unique class or range of micro-composites having remarkable properties of strength, toughness, environmental soundness, mass-producibility, and low cost.

The term "multi-component" refers to the fact that the extrudable hydraulically settable materials of the present invention typically include three or more chemically or physically distinct materials or phases, such as fibers, inorganic aggregate materials, organic aggregate materials, hydraulically settable materials, organic rheology-modifying agents, dispersants, water, and other liquids. Each of these broad categories of materials imparts one or more unique properties to the final article extruded therefrom (as well as the mixture used to form the article). Within these broad categories it is possible to further include different components (such as two or more inorganic aggregates or fibers) which can impart different, yet complementary, properties to the extruded article. This allows for the specific engineering of desired properties within the article in conjunction the extrusion process.

The term "multi-scale" refers to the fact that the compositions and materials of the present invention are definable at different levels or scales. Specifically, within the hydraulically settable materials of the present invention there is typically a macro-component composition in the range from about 0.01 mm to as high as about 10 mm, a micro-component composition in the range of about 10 nanometers to about 10 microns, and a submicron component. Although these levels may not be fractal, they are usually very similar to each other, and homogeneous and uniform within each level.

The term "fiber-reinforced" is self-explanatory, although the key term is "reinforced", which clearly distinguishes the hydraulically settable material of the present invention from other conventional materials used to manufacture a variety of articles, such as conventional paper or paper products. Conventional paper relies on "web" physics, or intertwining of fibers, to provide the structural matrix and mass, as well as the binding, of the paper. However, the matrix of the hydraulically settable materials of the present invention relies on the bond or interaction between the hydraulically settable binder, inorganic aggregate, the rheology-modifying agent, and the fibers. The fibers act primarily as a reinforcing component to specifically add ductility, tensile strength, and flexibility.

Finally, the term "micro-composite" refers to the fact that the hydraulically settable materials are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strength of the fibrous component; the insulation of the matrix has a direct correlation to the total porosity and insulative character of the aggregate material; etc.).

In light of these definitions and principles, materials that include a hydraulically settable binder, an inorganic aggregate, water, (optionally) fibers (both organic and inorganic), and (optionally) an organic rheology-modifying agent can be combined and extruded into a variety of articles. Such articles can have a variety of different strength, toughness, and density characteristics, and can have highly critical tolerances. This allows the hydraulically settable materials of the present invention to be extruded (and, hence, mass produced) into a variety of articles presently made from, e.g., plastic, paperboard, metal, wood, glass, or polystyrene.

As described more fully hereinafter, the basic parameters of the hydraulically settable mixtures of the present invention include (1) the particle packing density, (2) the amount of hydraulically settable binder (usually hydraulic cement), (3) the amount of water, (4) the extrusion pressure, (5) the rheology (including the yield stress and green strength), and (6) the strength of the final cured product (including compressive and tensile strengths).

I. GENERAL DISCUSSION

A. General Description of the Extrusion Process

Hydraulically settable products, including cementitious materials and the methods of utilizing them, have been known for millennia. The types of cementitious or other hydraulically settable products that have been made are various and numerous, although they share the common quality of generally being large and bulky. In particular, cementitious objects generally require significant size and mass in order to achieve the desired strength and other performance criteria. Typical cementitious materials also require relatively extensive setting and curing times before they can be demolded. The moldability and/or extrudability of most hydraulically settable mixtures is generally limited by the tradeoff between workability and form-stability. Increasing one usually decreases the other, leaving only a narrow range of acceptable rheologies.

The present invention overcomes this tradeoff between extrudability and form-stability by creating a highly plastic and cohesive hydraulically settable mixture that is form-stable immediately or shortly after being extruded. The term "plastic" refers to a hydraulically settable mixture that is workable, which will flow under pressure, and which has sufficient cohesive strength so as to be form-stable in the green state (green strength or form-stability is either immediate or within a matter of seconds).

The unique properties of the hydraulically settable mixtures made according to the present invention result from carefully controlled rheology, preferably by optimizing the particle packing density, as described more fully below, coupled with a deficiency of water. The deficiency of water yields a relatively stiff, or highly viscous, hydraulically settable mixture because there is insufficient water to completely fill the interstices between the particles, leaving insufficient water to fully lubricate the particles. In cases where there is very low initial water, the hydraulically settable mixture may consist of dry-looking granulates that lack cohesion and do not hold together as a single mass.

However, by exposing the water deficient mixture to increased mechanical pressure by an auger or piston extruder, as well as by applying a vacuum to the mixture in order to substantially evacuate the air within the interstitial space, the particles within the hydraulically settable mixture compress together, thereby increasing their packing density. This in turn reduces the effective water deficiency, thus allowing the water to more completely fill the interstices between the more densely packed particles. The apparent increase in the water that is available to fill the interstices better lubricates the particles, reduces the interparticulate friction, and allows the mixture to flow more easily by temporarily decreasing the yield stress. In addition, vibrating the mixture may also decrease the viscosity of a water deficient mixture.

Upon exiting the die, the reduction in pressure exerted on the hydraulically settable mixture allows the material to expand slightly and return to a slightly less optimized state of particle packing. This in turn creates a partial vacuum or negative pressure within the capillaries and strong meniscus forces are created that hold the hydraulically settable material together. The sudden lack of pressure (and lower shear rate) increases the viscosity of the material which, together with a high yield stress at the zero sheer rate, reduces the amount of water available to lubricate the particles, and results in an immediate increase in form-stability.

The rheology of the hydraulically settable mixture may also be influenced by other additives within the cementitious mixture, such as cellulose-, starch-, or protein-based or synthetic organic rheology-modifying agents, which increase the yield stress of the mixture while not significantly increasing or decreasing the viscosity to the point of unworkability. Under the high shear conditions within either an auger or piston extruder, the higher yield stress is overcome, the plastic viscosity is temporarily lowered, and the mixture has a temporary increase in its ability to flow. Once the hydraulically settable material has been extruded and the shear forces have been removed, the rheology-modifying agent aids in creating a more cohesive, form-stable extruded product. Hence, the rheology-modifying agent helps to create a hydraulically settable mixture that exhibits sheer thinning, thixotropic, or pseudo-plastic behavior, that is, a material which has an apparent decrease in viscosity when subjected to shear forces, including pressure and vibration.

In addition to imparting desired rheological properties to the mixture, optimizing the particle packing within the mixture greatly increases the final strength of the cured product by reducing the amount of water and air within the hydraulically settable matrix. According to the Strength Equation below, the compressive strength of a cured cementitious product has been found to be inversely proportional to the amount of added water and interstitial air ($\sigma$ is the strength of the cured cementitious product; k represents the highest possible theoretical strength, assuming no interstitial water or air, and is usually about 300–500 MPa, although it may be as high as 800 MPa in some cases, such as where the extruded article is cured by autoclaving; $V_c$ is the volume of cement; $V_w$ is the volume of water; and $V_a$ is the volume of air or interstitial space within a cementitious mixture):

$$\sigma = k[V_c/(V_c+V_w+V_a)]^2 \text{ MPa}$$

In normal, uncompacted cement paste, k=340 MPa, while in a highly compacted system k=500 MPa. The size of k therefore depends on the processing technique, but is constant for the same technique. In general, reducing the amount of air and water within the hydraulically settable mixture will both increase the strength of the final cured material. Both can be reduced while also improving the workability of the hydraulically settable mixture by increasing the particle packing density, as set forth more fully below. In addition, increasing the extrusion pressure and attendant compaction during the extrusion process can also greatly reduce the amount of interstitial air, while maintaining adequate flowability where a higher water deficiency (less water) is used.

In cases where the particle packing density of the hydraulically settable mixture has been optimized to the higher end of the ranges discussed herein, a relatively high extrusion pressure capable of eliminating most of the interstitial air is used, and very little water is added initially, articles of manufacture having a hydraulically settable matrix can be extruded which have compressive strengths higher than 500 MPa, even approaching 800 MPa if autoclaved, for example.

It is true that high strength concrete products have been made in a laboratory setting which have low water and low interstitial air. However, they are generally formed by isostatic compaction (often dry packed) under extreme pressures, usually by means of high pressure molding greater than about 70 MPa. However, these methods are not adaptable to the economical mass production of cementitious materials, nor do they allow for the molding of anything but the simplest, most rudimentary forms. They certainly do not allow for the continuous formation by extrusion of large volumes of form-stable hydraulically settable articles such as are possible using the compositions and methods of the present invention. Moreover, extrusion provides a more continuous method for mass producing certain articles, such as those that are relatively long and narrow and have a constant cross-sectional shape and dimension, compared to conventional molding processes.

It may also be desirable to co-extrude the hydraulically settable mixture with other materials in order to obtain, e.g., a laminate structure or an extruded product with other materials impregnated within or extruded over the surface of the hydraulically settable matrix. Things which may be co-extruded with the extrudable hydraulically settable mixtures of the present invention include another hydraulically settable mixture (often having different or complementary properties), a fibrous mat, continuous fibers, graphite (to form pencils), coating materials, polymers, clays, continuous fibers, or strips, wires, or sheets of almost any other material (such as metal). It has been found that by joining together, for example, a hydraulically settable sheet and a fibrous mat by co-extrusion the final product exhibits synergistic results of strength, toughness, and other desirable properties.

After the hydraulically settable mixture has been extruded into the desired shape, it may be allowed to harden in the extruded shape. The hardening process may be accelerated by heating the object, such by means of heating under controlled high relative humidity or high pressure autoclaving. Alternatively, the extruded shape may further be altered or manipulated, such as by passing an extruded sheet between a pair of rollers in order to reduce the thickness of the sheet and/or improve the surface quality of the sheet. The extruded object may also be curved, bent, cut, or further molded using any known molding process into a wide variety of other objects or shapes.

B. Extruded Shapes and Articles

Terms such as "extruded shape" or "extruded article," as used in this specification and the appended claims, are intended to include any known or future designed shape or article extruded using the compositions and methods of the present invention. An illustrative, yet by no means exhaustive, list of the shapes or objects which may be formed according to the present invention includes rods, bars, concrete rebars, pipes, cylinders, honeycomb and other multicellular structures, corrugated structures, boards, I-beams, "two-by-fours", flat sheets (ranging upwardly from 0.05 mm in thickness), "spaghetti" or other packaging or filler materials, straws, window frames, bricks, roofing tiles, and pencils and other marking implements.

In addition, the terms "extruded article" or "extruded shape" are intended to also include all precursor shapes or articles that are initially formed by extruding the compositions of the present invention and then manipulated, augmented, or otherwise formed into other shapes or articles. For example, an extruded bar or pipe which is initially straight might be curved into a curved bar. Both straight and curved bars or pipes are within the purview of the present invention and are intended to fall within the definition of an "extruded article" or "extruded shape."

These terms are also intended to include any extruded article or shape which is intended to be incorporated into any other article, whether or not such article is also within the scope of this patent. While the combination of extruded articles, or the combination of an extruded article and any other article, might have independently patentable features, the subpart obtained by the extrusion of the hydraulically settable mixtures made according to the present invention is intended to fall within the terms "extruded object" or extruded article," as would any combination of subparts.

C. Microstructural Engineering Design

As mentioned above, the compositions used to make the extrudable hydraulically settable mixtures of the present invention have been developed from the perspective of a microstructural engineering and materials science approach in order to build into the micro structure of the hydraulically settable matrix certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of strength, weight, insulation, cost, and environmental neutrality that are necessary in order to extrude a wide variety of hydraulically settable objects in a significantly more efficient manner than previously possible.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). In part, it is this specialization and conservative thinking that has limited the consideration of using hydraulically settable materials for a variety of products such as extruded shapes, particularly those with relatively thin walls, complicated shape or highly critical tolerances.

Nevertheless, once it is realized that hydraulically settable materials have such a wide utility and can be microstructurally designed and engineered, then their applicability to a variety of possible products becomes obvious. Hydraulically settable materials have an additional advantage over other conventional materials in that they gain their properties under relatively gentle and nondamaging conditions. (Other materials require high energy, severe heat, or harsh chemical processing that significantly affects the material components.) Therefore, many nonhydraulically settable materials can be incorporated into hydraulically settable materials without damage and with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to an extruded object, those primary constraints include desired weight and desired strength (both compressive and tensile), toughness, and other performance criteria requirements, while simultaneously keeping the costs comparable to their, e.g., paper, plastic, or metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach their maximum strength. Even with expensive "set accelerators," this strength gain occurs over a period of days. Such time periods are usually impractical for the economic mass production of the extruded objects contemplated by the present invention.

As a result, an important feature of the present invention is that when the hydraulically settable mixture is extruded into the desired shape or article, it will maintain its shape (i.e., support its own weight subject to minor forces, such as gravity and movement through the processing equipment) in the green state without external support. Further, from a manufacturing perspective, in order for production to be economical, it is important that the extruded object rapidly (in a matter of minutes or even seconds) achieve sufficient strength so that it can be handled using ordinary manufacturing procedures, even though the hydraulically settable mixture may still be in a green state and not fully hardened.

Another advantage of the microstructural engineering and materials science approach of the present invention is the ability to develop compositions in which cross-sections of the structural matrix are more homogeneous than have been typically achieved in the prior art. Ideally, when any two given samples of about 1–2 $mm^3$ of the hydraulically settable matrix are taken, they will have substantially similar amounts of hydraulically settable binder particles, hydraulically settable binder gel, aggregates, fibers, rheology-modifying agents, and any other additives.

In its simplest form, the process of using a materials science analysis in microstructurally engineering and designing a hydraulically settable material comprises characterizing, analyzing, and modifying (if necessary): (a) the aggregates, (b) the particle packing, (c) the system rheology, and (d) the processing and energy of the manufacturing system. In characterizing the aggregates, the average particle size is determined, the natural packing density of the particles (which is a function of the actual particle sizes and morphology) is determined, and the strength of the particles is ascertained. (Unreacted or previously reacted hydraulically settable binder particles may be considered to be an aggregate.)

With this information, the particle packing can be predicted according to mathematical models. It has been established that the particle packing is a primary factor for designing desired requirements of the ultimate product, such as workability, form-stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, rheology-modifying agents, plasticizers, dispersants, other materials, or a combination of these), the viscosity and yield stress can be modified. The micro-rheology can also be modified physically by changing the shape and size of the particles, e.g., the use of chopped fibers, plate-like mica, round-shaped silica fume, rhombic fused silica, or crushed, angular, or granular hydrated binder particles, each of which will interact with the lubricants differently.

Finally, the manufacturing processing can be modified to manipulate the balance between workability and form-stability. In general, lowering the viscosity of the mixture increases the workability, while increasing the yield stress increases the form-stability of the extruded material. As applied to the present invention, it is generally optimal to maintain a minimum desired yield stress while minimizing the viscosity. Molding or deformation of the material only occurs when a force greater than the yield stress of the hydraulically settable mixture is applied.

The yield stress and, hence, the form-stability of the extruded object can also be increased by either chemical additives (such as by adding a rheology-modifying agent) or by adding energy to the system (such as by heating the extrusion apparatus or the extruded materials). For example, heating the material as it is extruded can activate a starch additive, thereby causing it to increase the yield stress of the extruded material. In addition, heat accelerates the hydration reaction between the hydraulically settable binder and water, sometimes by factors as high as 10 or even 20 times the normal reaction rate. Indeed, it is this discovery of how to manipulate the hydraulically settable compositions in order to increase the form-stability of the compositions while obtaining good flow during the formation process that make the present invention such a significant advancement in the art.

From the following discussion, it will be appreciated how each of the component materials within the hydraulically settable mixture, as well as the processing parameters, contributes to the primary design constraints of the extrudable hydraulically settable mixtures so that a wide variety of extruded articles can be produced therefrom. Specific compositions are set forth in the examples given later in order to demonstrate how the maximization of the performance of each component accomplishes the combination of desired properties.

D. Hydraulically Settable Materials

The materials used to manufacture the extruded objects of the present invention develop strength through the chemical reaction of water and a hydraulically settable binder, such as hydraulic cement, calcium sulfate (or gypsum) hemihydrate (which is sometimes mixed with gypsum anhydride, commonly known as "anhydrite"), and other substances which harden after being exposed to water. Even slag, blast furnace slag, fly ash, or silica fume may be activated and act as a "hydraulically settable binder."

The term "hydraulically settable materials" as used in this specification and the appended claims includes any material with a structural matrix and strength properties that are derived from a hardening or curing of a hydraulically settable binder. These include cementitious materials, plasters, and other hydraulically settable materials as defined herein. The hydraulically settable binders used in the present invention are to be distinguished from other cements or binders such as polymerizable, water insoluble organic cements, glues, or adhesives.

The terms "hydraulically settable material," "hydraulic cement materials," or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products. While in a green state, hydraulically settable materials may also be referred to as "hydraulically settable mixtures."

1. Hydraulically Settable Binders

The terms "hydraulically settable binder" or "hydraulic binder," as used in this specification and the appended claims, are intended to include any inorganic binder (such as hydraulic cement, gypsum hemihydrate, calcium oxide, or mixtures thereof) which develops strength properties and hardness by chemically reacting with water and, in some cases, with carbon dioxide in the air and water. The terms "hydraulic cement" or "cement" as used in this specification and the appended claims are intended to include cement clinker and crushed, ground, milled, and processed clinker in various stages of pulverization and in various particle sizes.

Examples of typical hydraulic cements known in the art include the broad family of portland cements (including ordinary portland cement without gypsum), MDF cement, DSP cement, Densit-type cements, Pyrament-type cements, calcium aluminate cements (including calcium aluminate cements without set regulators), plasters, silicate cements (including β-dicalcium silicates, tricalcium silicates, and mixtures thereof), gypsum cements, phosphate cements, high alumina cements, micro fine cements, slag cements, magnesium oxychloride cements, and aggregates coated with micro fine cement particles. The term "hydraulic cement" is also intended to include other cements known in the art, such as α-dicalcium silicate, which can be made hydraulic under hydrating conditions within the scope of the present invention.

The basic chemical components of, e.g., portland cement include $CaO$, $MgO$, $SiO_2$, $Al_2O_3$, $Fe_2O_3$, $SO_3$, in various combinations and proportions. These react together in the presence of water in a series of complex reactions to form insoluble calcium silicate hydrates, carbonates (from $CO_2$ in the air and added water), sulfates, and other salts or products of calcium, magnesium, aluminum, and iron, together with hydrates thereof. These include tricalcium aluminate, dicalcium silicate, tricalcium silicate, and tetracalcium alumina ferrite. The aluminum and iron constituents are thought to be incorporated into elaborate complexes within the aforementioned materials. The cured cement product is a complex matrix of insoluble hydrates and salts which are complexed and linked together much like stone. This material is highly inert and has both physical and chemical properties similar to those of natural stone or dirt.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulically settable binders such as calcium oxide are generally not as strong as hydraulic cement, high strength may not be as important as other characteristics (e.g., the rate of hardening) in some applications. In terms of cost, gypsum and calcium oxide have an advantage over hydraulic cement because they are somewhat less expensive.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention. It has been found that adding gypsum hemihydrate to a hydraulically settable mixture containing hydraulic cement as a binder yields a mixture having a much lower water-to-cement ratio and, hence, higher strength according to the Strength Equation.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form-stability of the hydraulically settable material in the green state.

As mentioned above, preferred hydraulically settable binders include portland white cement, portland grey cement, micro fine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto. It has been found that portland grey cement improves the cohesive nature of the green hydraulically settable mixture better than other types of cements.

The present invention may include other types of cementitious compositions such as those discussed in copending (now abandoned) U.S. patent application Ser. No. 07/981,615, filed Nov. 25, 1992 in the names of Hamlin M. Jennings, Ph.D., Per Just Andersen, Ph.D. and Simon K. Hodson, and entitled "Methods of Manufacture And Use For Hydraulically Bonded Cement," which is a continuation-in-part of U.S. patent application Ser. No. 07/856,257, filed Mar. 25, 1992 in the names of Hamlin M. Jennings, Ph.D. and Simon K. Hodson, and entitled "Hydraulically Bonded Cement Compositions and Their Methods of Manufacture and Use" (now abandoned), which was a file wrapper continuation of U.S. patent application Ser. No. 07/526,231 (also abandoned). In these applications, powdered hydraulic cement is placed in a near net final position and compacted prior to the addition of water for hydration. For purposes of disclosing the use of such compositions, the forgoing patents applications are incorporated herein by specific reference.

Additional types of hydraulic cement compositions include those wherein carbon dioxide is mixed with hydraulic cement and water. Hydraulic cement compositions made by this method are known for their ability to more rapidly achieve high green strength. This type of hydraulic cement composition is discussed in copending U.S. patent application Ser. No. 07/418,027 filed Oct. 10, 1989, in the names of Hamlin M. Jennings, Ph.D. and Simon K. Hodson, and entitled "Process for Producing Improved Building Material and Products Thereof," now U.S. Pat. No. 5,232,496, wherein water and hydraulic cement are mixed in the presence of a carbonate source selected from the group consisting of carbon dioxide, carbon monoxide, carbonate salts, and mixtures thereof. For purposes of disclosure, the forgoing patent is incorporated herein by specific reference.

2. Hydraulic Paste

In each embodiment of the present invention, the hydraulic paste (including cement paste) is the key constituent which eventually gives the extruded object the ability to set up and develop strength properties. The term "hydraulic paste" shall refer to a hydraulically settable binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials have been added, whether in the green state or after it has hardened and/or cured. The other ingredients added to the hydraulic paste serve the purpose of altering the properties of the unhardened, as well as the final hardened product, including, but not limited to, tensile strength, compressive strength, shrinkage, flexibility, bulk density, color, porosity, surface finish, and texture.

Although the hydraulically settable binder is understood to be the component which allows the hydraulically settable mixture to set up, to harden, and to achieve much of the strength properties of the material, certain hydraulically settable binders also aid in the development of better early cohesion and green strength. For example, hydraulic cement particles are known to undergo early gelating reactions with water even before it becomes hard; this can contribute to the internal cohesion of the mixture.

It is believed that aluminates, such as those more prevalent in portland grey cement (in the form of tricalcium aluminates and tetracalcium alumina ferrites) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., plasticity) of hydraulically settable mixtures made therefrom.

The percentage of hydraulically settable binder within the overall mixture varies depending on the identity of the other added constituents. However, the hydraulically settable binder is preferably added in an amount ranging from between about 1% to about 90% as a percentage by weight of the wet hydraulically settable mixture, more preferably within the range from between about 8% to about 60%, and most preferably from about 10% to about 45%. From the disclosure and examples set forth herein, it will be understood that this wide range of weight percentages covers the many different types of articles that may be formed by extruding a hydraulically settable mixture.

Despite the foregoing, it will be appreciated that all concentrations and amounts are critically dependent upon the qualities and characteristics that are desired in the final product. For example, in a very thin-walled structure (even as thin as 0.05 mm) where high strength is needed, such as in an extruded drinking straw, it may be more economical to have a very high percentage of hydraulically settable binder with little or no aggregate. In such a case, it may be desirable to include a high amount of fiber to impart flexibility and toughness.

The other important constituent of hydraulic paste is water. By definition, water is an essential component of the hydraulically settable materials within the scope of the present invention. The hydration reaction between hydraulically settable binder and water yields reaction products which give the hydraulically settable materials the ability to set up and develop strength properties.

In most applications of the present invention, it is important that the water to hydraulically settable binder ratio be carefully controlled in order to obtain a hydraulically settable mixture which after extrusion is self-supporting in the green state. Nevertheless, the amount of water to be used is dependent upon a variety of factors, including the types and amounts of hydraulically settable binder, aggregates, fibrous materials, rheology-modifying agents, and other materials or additives within the hydraulically settable mixture, as well as the extrusion conditions to be used, the specific article to be extruded, and its properties.

The preferred amount of added water within any given application is primarily dependent upon two key variables: (1) the amount of water which is required to react with and hydrate the binder; and (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened, extruded product. The appropriate rheology to meet these needs can be defined in terms of yield stress. In order for the hydraulically settable mixtures to have adequate green strength and form-stability upon being extruded into the desired article, the hydraulically settable mixture will preferably have a yield stress greater than or equal to about 2 kPa, more preferably greater than or equal to about 10 kPa, and most preferably greater than or equal to about 100 kPa. It should be understood that these figures represent preferred minima. There is no limit to the yield stress which, depending on a number of factors such as the water deficiency, the morphology of the particles, the amount of rheology-modifying agent within the mixture, may be much higher. The desired level of yield stress can be (and may necessarily have to be) adjusted depending on the particular shape or article to be extruded.

Because the hydraulically settable mixtures of the present invention exhibit shear thinning, there is no single preferred viscosity, although the mixtures should have a viscosity adequate to make them form-stable but small enough to render them flowable using an extruder. In general, however, the apparent viscosity will usually be about $10^7$ poise or greater at a shear rate of 0 s$^{-1}$, about $10^4$ poise or greater at a shear rate of 20 s$^-$, and about $2 \times 10^2$ poise or greater at a shear rate of 1000 s$^{-1}$.

One skilled in the art will understand that when more aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water as a fraction of the hydraulically settable binder volume. Porous aggregates can also internally absorb significant mounts of water due to their high void content. Based on the foregoing qualifications, typically hydraulically settable mixtures within the scope of the present invention will have a water to hydraulically settable binder ratio within a range from about 0.05 to about 4, preferably about 0.1 to about 1, and most preferably from about 0.15 to about 0.5.

Because of the higher levels of particle packing density of the hydraulically settable binder particles within a typical mixture of the present invention, the specific gravity of the hydraulic paste fraction of the hydraulically settable mixture will preferably (in cases where higher strength is desired) be greater than about 2.2, more preferably greater than about 2.5, and most preferably greater than about 2.6.

It should be understood that the hydraulically settable binder has an internal drying effect on the hydraulically settable mixture because the binder particles chemically react with water and reduce the mount of free water within the interparticulate interstices. This internal drying effect can be enhanced by including faster reacting hydraulically settable binders, such as gypsum hemihydrate, along with slower reacting hydraulic cement.

3. Water Deficiency

In many cases, the amount of water needed to both hydrate the binder and also impart the desired rheology to the hydraulically settable mixture may be more accurately described in terms of either volume percent or "water deficiency." The level of water deficiency is determined by subtracting the volume of free interstitial water from the total interstitial space, and then dividing the result by the total interstitial space.

$$\text{water deficiency} = (V_{space} - V_{water})/V_{space}$$

By way of example, and in order to better illustrate the concept of water deficiency, the hydraulically settable mixture can contain added water and yet be 100% water deficient (i.e., have no interstitial water) in the case where all of the water has either been absorbed into the pores of the aggregates or reacted with the hydraulically settable binder.

Of course, it should be understood that the amount of water that has actually reacted with the hydraulically settable binder at any given time after the hydraulically settable binder and water have been mixed together will usually be significantly lower than the calculated stoichiometric equivalent of water needed to substantially hydrate the binder. Because of the kinetics of the hydration reaction, the water does not immediately react completely with the hydraulically settable binder, but only over time and generally during the curing stage after the material has been extruded.

Hence, water within the theoretical stoichiometric equivalent amount which does not react with the binder is generally available to fill the interstices or voids between the particles (if not absorbed by the aggregate material). Water that has not chemically reacted with the hydraulically settable binder may be classified as either gel water or capillary water. Both forms tend to decrease the strength of the final cured material and, hence, should be minimized where possible. Because the amount of water available to fill the interstices directly affects the workability and rheology of the hydraulically settable mixture, it will usually be necessary to determine the amount of unbound stoichiometric water available to fill the interstices and lubricate the particles at any given time after mixing, although initially almost all of the added water is free because of the slowness of the hydration reaction.

Some of the factors that will determine what percentage of the calculated stoichiometric equivalent of water will have actually reacted with the hydraulically settable binder, include the reactivity (or rate of reaction) of the binder, the temperature of the mixture, the particle size of the binder, the level of mixing, the wettability of the components within the overall mixture, and the time which has elapsed since the addition of water.

For example, hydraulically settable binders having a high rate of reaction will absorb or react with the available water more quickly than binders having lower rates of reaction. As with most reactions, higher temperatures generally will increase the rate of reaction of all hydraulically settable binders, and hence, the rate of water removal of the binder.

Moreover, hydraulically settable binders with smaller particle sizes will also tend to react with more water because they will have a greater overall surface area that will come in contact and react with the available water. Of course, the tendency of the hydraulically settable binder particles to react with water is dependent upon the level of mixing. More thoroughly blended mixtures will result in greater contact between water and binder particles, and, hence, greater reaction with the water.

The extent of any reaction that has not reached equilibrium is also dependent upon the time which has elapsed since the reactants have been mixed together. Obviously, a hydraulically settable mixture in which the hydraulically settable binder has been in contact with water over a greater period of time will show a greater level of reaction between the water and the binder. Nevertheless, where a dispersant has been added, longer mixing time increases the specific surface area for adsorption of the dispersant, thereby creating a more fluid mixture in the short run. In general, substantial setting of hydraulic cement usually occurs within about 5 hours.

Aside from the dynamics of the reaction between the hydraulically settable binder and water, the other components within the hydraulically settable mixture will also affect to some degree the absorption by or reaction of the water with the binder particles. Certain additives, such as water soluble rheology-modifying agents, will compete with the binder particles and actually absorb some of the available water.

In addition, other additives such as dispersants can impede the reaction between water and hydraulically settable binder particles. Whether a given component or reaction condition will increase or decrease the reaction between the water and the hydraulically settable binder particles must be carefully determined while designing any particular mix design. However, one skilled in the art will be able to predict the effect of a given component or reaction condition on the tendency of the water to react with the hydraulically settable binder, at least on the basis of empirical observation.

Once it has been determined how much water will actually react with the cement, the next step is to determine how much "interstitial water" should be added in addition to this reacted or absorbed amount. Interstitial water is the water which is available to fill the voids or interstices and which will directly affect the workability of the hydraulically settable mixture. The preferred amount of interstitial water that will be required is determined by a combination of factors, including the particle packing density of the mixture, the compressibility of the mixture, and the pressure exerted on the mixture by the extruder.

Knowing the particle packing density allows one to determine the volume of interstitial space within the uncompressed mixture which will initially be filled by interstitial water. Knowing the compressibility of the mixture and the pressure that will be exerted allows one to determine the expected reduction of interstitial space when the hydraulically settable mixture is subjected to a given pressure during the extrusion process.

Where the particle packing density is lower, there will be more interstitial space as a percentage of the overall volume of the mixture, and more water will be required to fill this space. Conversely, where the particle packing density is greater, there will be less interstitial space as a percentage of the overall volume of the mixture, and less water will be required to fill this space. How to optimize the packing density will be discussed hereinafter.

Similarly, where the hydraulically settable mixture will be subjected to a greater amount of pressure during the extrusion process, the compression step will more dramatically reduce the volume of interstitial space, which in turn means that less interstitial water will be required initially in order to achieve the desired rheology. Also, including less water (higher deficiency) allows the particles to be brought into more intimate contact during the compression process, resulting in a final cured product having less porosity, higher density and greater strength.

Conversely, where the hydraulically settable mixture will be subjected to a lesser amount of pressure during the extrusion process, the compression step will less dramatically reduce the volume of interstitial space, which in turn means that more interstitial water will be required initially in order to achieve the desired rheology. Certain aggregates, such as sand, have relatively low compressibility. (How much pressure that may be exerted on the hydraulically settable mixture without destroying the integrity of the aggregate particles therein depends on the compressive strength of the aggregate particles.)

The key is to add just enough water in order to substantially occupy the interstitial space when the mixture is compressed during the extrusion process. Adding more water than what is required to fill the interstices during the compression of the extruded mixture would reduce both the green strength of the extruded product as well as the final strength of the cured material (according to the Strength Equation).

In light of the foregoing, it has been found that adequate workability of a hydraulically settable mixture that will be subjected to increased pressure can be obtained when a deficiency of water is included. The amount of water may be expressed in terms of volume percent, and, if deficient, will be less than the volume of the interstitial space, which is determined by subtracting the natural packing density from 1. For example, if the natural packing density is 65%, the mixture will be deficient in water if the water is included in an amount of less than about 35% by volume of the mixture. The amount of water that is required to create adequate workability will depend somewhat on the relative quantities of the mixture components, such as the hydraulically settable binder particles, aggregates, and fibers. Nevertheless, it is generally not the identity or relative quantities of the components but the overall volume and packing density of the components that will determine how much water should be added to achieve a hydraulically settable mixture having the desired rheological and plastic-like properties.

The amount of added water may, therefore, be expressed in terms of "water deficiency" before the mixture is compressed during the extrusion process. In mixtures relying upon the principles of particle packing and water deficiency in order to attain the desired rheology, the level of water deficiency will be within the broad range from between about 1% to about 90%. Because the preferred level of water deficiency is highly dependent upon many other variables, such as the components of the hydraulically settable mixture, the rheology of the mixture, and the level of particle packing efficiency, as well as the desired properties of the extruded product, there is no more narrow preferred range of water deficiency. Where a high level of rheology-modifying agent is employed, it may be possible to extrude a mixture having excess water (or "negative" water deficiency).

Nevertheless, for any given mixture it will usually be preferable to include the minimum quantity of water necessary to allow it to flow under the desired extrusion pressure and have enough internal cohesion to hold together once an article has been extruded from the mixture. The minimum amount of water necessary for the hydraulically settable mixture to flow may further be reduced by the addition of admixtures, such as plasticizers or dispersants, as set forth more fully herein. Where very low levels of water are employed, it may be necessary in some cases to pelletize the hydraulically settable mixture in order to increase the extrudability of the mixture.

Nevertheless, as a general rule, a mixture having a greater water deficiency will generally be stiffer and have lower workability initially. Conversely, a mixture having a lower water deficiency will generally have lower viscosity and greater workability initially. The level of stiffness, viscosity, or workability that will be desired for any given mixture will depend upon the extrusion process of a given situation. Of course, during the extrusion process when the hydraulically settable mixture is compressed, the level of water deficiency will decrease, often dramatically. In some cases it may approach or even exceed 0%. (A negative water deficiency means that there is a surplus or excess of water; that is, the volume of water exceeds the volume of interstitial voids between the solid particles after they have been compacted during the extrusion process.)

Nevertheless, hydraulically settable mixtures having a higher particle packing density will generally be able to contain a greater deficiency of water and yet be highly extrudable under pressure, as compared to mixtures which have a lower particle packing density. For example, while the particle packing density of a hydraulically settable mixture having a natural packing density of 50% might increase to 65%, one with a packing density of 80% might increase to 95%. The drop in interstitial space in the former case (50% to 35%) is slight compared to in the latter (20% to 5%), which is a four-fold decrease. Hence, the mixture with the higher particle packing density will experience a much more dramatic drop in the apparent water deficiency.

In some cases, it may also be preferable to add "excess water" or more water than is needed to fill the interstitial space in order to decrease the viscosity and increase the workability of the mixture. However, in order to obtain immediate green strength, it may be necessary in those cases to heat the surface the of extruded article using a heated die in order to remove some or all of the "excess water." In addition, gypsum hemihydrate may be added to react with some or all of the excess water and thereby increase the form stability of the extruded article.

In the case where more water or dispersant is added initially in order to give the hydraulically settable mixture greater workability, increased form-stability of the extruded object or shape can be obtained by, for example, immediately passing the object through a heating tunnel or vacuum chamber. This causes part of the water to be driven off in the form of vapor or steam from the article surface, which reduces the volume of interstitial water, increases the friction between the particles, and result in a quick increase in form-stability. However, overheating the extruded article, or drying it out too quickly, may harm the micro structure of the article, thereby reducing the strength of the article.

E. Rheology-modifying Agents

The inclusion of a rheology-modifying agent acts to increase the plastic or cohesive nature of the hydraulically settable mixture so that it behaves more like a moldable or extrudable clay. The rheology-modifying agent tends to thicken the hydraulically settable mixture by increasing the yield stress of the mixture without greatly increasing the viscosity of the mixture. Raising the yield stress in relation to the viscosity makes the material more plastic-like (or clay-like) and moldable, while greatly increasing the subsequent form-stability or green strength.

A variety of natural and synthetic organic rheology-modifying agents may be used which have a wide range of properties, including high or low viscosity, yield stress, and solubility in water. Although many of the rheology-modifying agents contemplated by the present invention might be very soluble in water, the insoluble reaction products of hydraulic cement and water encapsulate the rheology-modifying agent and prevent it from dissolving out of an extruded hydraulically settable article that is exposed to water.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here, but other cellulose materials which have the same or similar properties as these would also work well.

Suitable starch based materials include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide based rheology-modifying agents include, for example, alginic acid, phycocolloids, agar, gum arabic, guar gum, locust bean gum, gum karaya, and gum tragacanth.

Suitable protein-based rheologyomodifying agents include, for example, Zein® (a prolamine derived from corn), collagen derivatives extracted from animal connective tissue such as gelatin and glue, and casein (the principal protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex, which may be a styrene-butadiene copolymer. The rheology of polylactic acid is significantly modified by heat and could be used alone or in combination with any other of the foregoing rheology-modifying agents.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 generally act to plasticize or lubricate the mixture rather than thicken it, which aids in flowability during the extrusion procedure.

More particularly, lower molecular weight rheology-modifying agents improve the extrusion process by lubricating the particles. This reduces the friction between the particles as well as between the mixture and the adjacent extruder surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the extruded hydraulically settable material a smoother surface. Stearates can also be added to lubricate the hydraulically settable mixture.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of the desired extruded article.

The rheology-modifying agents within the hydraulically settable materials of the present invention are preferably included in a range from about 0.1% to about 5% by weight of the hydraulically settable mixture exclusive of water, more preferably in a range from about 0.25% to about 2%, and most preferably in a range from about 0.5% to about 1%. The actual amount to be used will depend upon the nature of the extruded article or product.

F. Aggregates

Aggregates common in the concrete industry may be used in the hydraulically settable mixtures of the present invention. In the case where relatively thin-walled articles will be extruded, and in order for the mixtures to remain extrudable through the reduced cross-section dies, the diameter of the aggregates used will most often be less than about 25% of the smallest cross-section of the structural matrix of the extruded article.

Aggregates may be added to increase the compressive strength, decrease the cost by acting as a filler, and affect the particle packing density of the resultant hydraulically settable materials. Aggregates are also useful for creating a smooth surface finish, particularly plate-like aggregates. The tensile and compressive strengths of the aggregate will often affect the tensile and compressive strengths of the final hardened product.

Examples of useful aggregates include sand, dolomite, gravel, rock, basalt, granite, limestone, sandstone, glass beads, aerogels, xerogels, seagel, mica, clay, synthetic clay, alumina, silica, fly ash, silica fume, tabular alumina, kaolin, glass microspheres, ceramic spheres, gypsum dihydrate, calcium carbonate, calcium aluminate, xonotlite (a crystalline calcium silicate gel), unreacted cement particles, and other geologic materials. Both hydrated and unhydrated cement particles may also be considered to be "aggregates" in the broadest sense of the term, depending on their distribution and the nature of their incorporation within the hydraulically settable matrix. Even discarded hydraulically settable materials, such as discarded sheets, containers, boards, or other objects of the present invention can be employed as aggregate fillers and strengtheners. Silica fume and fly ash also can be added to reduce the porosity of the hydraulically settable mixture and increase its workability and cohesiveness.

The amount of the aggregate will vary depending upon the particular application or purpose, and can vary greatly from no added aggregate up to about 90% by weight of the green hydraulically settable mixture, more preferably within the range from between about 3% to about 70% by weight, and most preferably from between about 20% to about 50% by weight.

Both clay and gypsum are particularly important aggregate materials because of their ready availability, extreme low cost, workability, and ease of formation. Gypsum hemihydrate can also provide a degree of binding and strength if added in high enough amounts. Clay is a general term used to identify all earths that form a paste with water and harden when dried. The predominant clays include silica and alumina (used for making pottery, tiles, brick, and pipes) and kaolinite. The two kaolinitic clays are anauxite, which has the chemical formula $Al_2O_3 \cdot 3SiO_2 \cdot 2H_2O$, and montmorillonite, which has the chemical formula $Al_2O_3 \cdot 4SiO_2 \cdot H_2O$. However, clays may contain a wide variety of other substances such as iron oxide, titanium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix.

Similarly, gypsum hemihydrate is also hydratable and forms the dihydrate of calcium sulfate in the presence of water. Thus, gypsum may exhibit the characteristics of both an aggregate and a binder depending on whether (and in what proportion) the hemihydrate or dihydrate form is added to the hydraulically settable mixture.

It is often preferable, according to the present invention, to include a plurality of differently sized and graded aggregates capable of more completely filling the interstices between the aggregate and hydraulically settable binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Strength Equation).

In order to optimize the packing density, differently sized aggregates with particle sizes ranging from as small as about 0.01 microns to as large as about 4 mm may be used. (Of course, the desired purpose and thickness of the resulting product will dictate the appropriate particle sizes of the various aggregates to be used.)

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Andersen, P. J. "Control and Monitoring of Concrete Production—A Study of Particle Packing and Rheology," The Danish Academy of Technical Sciences. For purposes of teaching particle packing techniques, the disclosures of the foregoing article and thesis are incorporated herein by specific reference.

A detailed description of how to select a mixture of aggregates and aggregate particle sizes to accommodate a given mix design criteria can be found within co-pending (now abandoned) U.S. patent application Ser. No. 08/109,100, filed Aug. 18, 1993, in the names of Per Just Andersen, Ph.D. and Simon K. Hodson "Design Optimized Compositions And Processes For Microstructurally Engineering Cementitious Mixtures." For purposes of disclosure, this reference is incorporated herein by specific reference.

G. Fibers

As used in the specifications and appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, and flexural, tensile, and even compressive strengths. Fibrous materials reduce the likelihood that the extruded hydraulically settable object will shatter when a strong cross-sectional force is applied.

Fibers which may be incorporated into the structural matrix are preferably naturally occurring fibers, such as cellulosic fibers extracted from hemp, cotton, sisal, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hardwood or softwood, such as southern hardwood or southern pine), ceramic fibers (such as alumina, silica nitride, silica carbide, and graphite,) and cotton. Recycled paper fibers can be used, but they are somewhat less desirable because of the fiber degradation that occurs during the original paper manufacturing process, as well as in the recycling process. Any equivalent fiber, however, which imparts strength and flexibility is also within the scope of the present invention. Abaca fibers are available from Isarog Inc. in the Philippines. Glass fibers, such as Cemfill®, are available from Pilkington Corp. in England.

The fibers used to make the hydraulically settable materials of the present invention preferably have a high length to width ratio (or "aspect ratio") because longer, narrower fibers can impart more strength to the matrix without significantly adding bulk and mass to the mixture. The fibers should have an aspect ratio of at least about 10:1, preferably at least about 100:1, and most preferably at least about 200:1. However, although the toughness and tensile strength of the final product are increased as the aspect ratio of the fibers is increased, fibers with lower aspect ratios are cheaper, provide better particle packing, and are easier to disperse within the hydraulically settable mixture.

The amount of fibers added to the hydraulically settable matrix will vary depending upon the desired properties of the final product, with strength, toughness, flexibility, and cost being the principal criteria for determining the amount of fiber to be added in any mix design. In most cases, fibers will be added in an amount within a range from about 0.5% to about 30% by volume of the green hydraulically settable mixture, more preferably within the range from about 1% to about 20% by volume, and most preferably within the range from about 2% to about 10% by volume. The extrusion process tends to longitudinally orient the fibers and results in a tougher product.

It will be appreciated, however, that the strength of the fiber is a very important feature in determining the amount of the fiber to be used. The stronger the tensile strength of the fiber, the less the amount that must be used to obtain the same level of tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

In addition, while ceramic fibers are generally far more expensive than naturally occurring or glass fibers, their use will nevertheless be economical in some cases due to their far superior tensile strength properties. Obviously the use of more expensive fibers becomes more economical as the cost restraints of the extruded object are relaxed, such as where a comparable object made from a competing material is relatively expensive.

It should be understood that the fibers used within the scope of the present invention differ from fibers typically employed in making paper or paperboard objects, primarily in the way in which the fibers are processed. In the manufacture of paper, either a Kraft or a sulphite process is typically used to form the pulp sheet. In the Kraft process, the pulp fibers are "cooked" in a NaOH process to break up the fibers. In a sulphite process, acid is used in the fiber disintegration process. Both processes greatly reduce the strength of the resulting fibers, and fibers made by these processes are not preferred in most cases. Consequently, far less fiber may be added to the hydraulically settable mixtures of the present invention while still deriving a high level of strength from the fibers.

It should also be understood that some fibers, such as southern pine and abaca, have high tear and burst strengths, while others, such as cotton, have lower strength but greater flexibility. In the case where both flexibility and high tear and burst strength is desired, a mixture of fibers having the various properties can be added to the mixture.

H. Dispersants

The term "dispersant" is used hereinafter to refer to the class of materials which can be added to reduce the amount of water that must be added in order to maintain the same flow properties. Dispersants generally work by reducing the viscosity and yield stress of the hydraulically settable mixture. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the hydraulically settable binder particles and/or into the near colloid double layer of the binder particles. This creates a negative charge around the surfaces of particles, causing them to repel each other. This repulsion of the particles adds "lubrication" by reducing the "friction" or attractive forces that would otherwise cause the particles to have greater interaction. Because of this, less water can be added initially while maintaining the workability of the hydraulically settable mixture.

Greatly reducing the viscosity and yield stress may be desirable where clay-like properties, cohesiveness, and/or form-stability are less important or where it is desired to use less water initially. Adding a dispersant aids in keeping the hydraulically settable mixture workable even when very little water is added, particularly where there is a "deficiency" of water. Hence, adding a dispersant allows for an even greater deficiency of water, although the extruded article may have somewhat less form-stability if too much dispersant is used. Nevertheless, including less water initially will theoretically yield a stronger final cured article, according to the Strength Equation.

Whether or not there is a deficiency of water is both a function of the stoichiometric amount of water required to hydrate the binder and the amount of water needed to occupy the interstices between the particles in the hydraulically settable mixture, including the hydraulically binder particles themselves and the particles within the aggregate material and/or fibrous material. As stated above, improved particle packing reduces the volume of the interstices between the hydraulically settable binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® or starch is added, the dispersant must be added first and the flocculating agent second. Otherwise, it will be more difficult for the dispersant to become adsorbed on the surface of the hydraulically settable binder particles as the Tylose® or starch may become irreversibly adsorbed onto the surface of the particles, thereby bridging them together rather than causing them to repel each other.

A preferred dispersant is sulfonated naphthalene-formaldehyde condensate, an example of which is WRDA 19, which is available from W.R. Grace, Inc. located in Baltimore. Other dispersants which would work well include sulfonated melamineformaldehyde condensate, lignosulfonate, and acrylic acid. The sodium salt of sulfonated naphthalene-formaldehyde condensate can be added after the hydraulic cement and water have had sufficient time to form early hydration products (such as ettringite) in order to increase the specific surface area of the cement particles, which allows for greater dispersion of the particles.

Another way to improve the flowability of the hydraulically settable mixture under lower pressure is by adding other reactive products having a high specific surface area, such as silica fume. This also increases the yield stress and, hence, the form-stability of the extruded article.

The amount of added dispersant will generally range up to about 5% by weight of the hydraulically settable binder, more preferably within the range of between about 0.25% to about 4%, and most preferably within the range of between about 0.5% to about 2%. However, it is important not to include too much dispersant as it tends to retard the hydration reactions between, e.g., hydraulic cement and water. Adding too much dispersant can, in fact, prevent hydration, thereby destroying the binding ability of the hydraulic paste altogether.

The dispersants contemplated within the present invention have sometimes been referred to in the concrete industry as "superplasticizers," "water reducers," or "high range water reducers." In order to better distinguish dispersants from rheology-modifying agents, which often act as plasticizers, the term "superplasticizer" will not be used in this specification.

I. Set Accelerators

In some cases, it may be desirable to accelerate the initial set of the hydraulically settable mixture and obtain earlier form stability of the extruded article by adding to the mixture an appropriate set accelerator. These include $Na_2CO_3$, $KCO_3$, KOH, NaOH, $CaCl_2$, $CO_2$, triethanolamine, aluminates, and the inorganic alkali salts of strong acids, such as HCl, $HNO_3$, and $H_2SO_4$. In fact, any compound which increases the solubility of gypsum and $Ca(OH)_2$ will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding or extruding the hydraulically settable mixture, the temperature of the mixture, and the identity of the set accelerator. One of ordinary skill in the art will be able to adjust the amount of added set accelerator according to the parameters of a particular manufacturing process in order to optimize the setting time of the hydraulically settable mixture.

J. Coatings

It is within the scope of the present invention to coat the extruded hydraulically settable objects with sealing materials, paints, and other protective coatings. Appropriate coatings include calcium carbonate, melamine, polyvinyl chloride, polyvinyl alcohol, polyvinyl acetate, polyacrylate, hydroxypropylmethylcellulose, polyethylene glycol, acrylics, polyurethane, polyethylene, synthetic polymers, polylactic acid, Biopol® (a polyhydroxybutyrate-hydroxyvalerate copolymer), waxes (such as beeswax or petroleum based wax), elastomers, kaolin clay, polyacrylates, and synthetic polymers including biodegradable polymers. Biopol® is manufactured by ICI in the United Kingdom.

For example, a coating comprised of sodium silicate, which is acid resistant, is a particularly useful coating. Resistance to acidity is important, for example, where the extruded article is exposed to substances having a high acid content. Where it is desirable to protect the extruded article from basic substances, the extruded objects can be coated with an appropriate polymer or wax, such as are used to coat paper or paperboard products. If the extruded articles are intended to come into contact with foodstuffs the coating material will preferably comprise an FDA-approved coating.

The coatings may be applied to the extruded articles using any coating means known in the art. Coatings may be applied by spraying the extruded object with any of the above-referenced coating materials, or it may be advantageous to apply the coating by dipping the article into a vat containing an appropriate coating material. In the case where a coating material is sprayed onto the surface of a generally flat or regularly curved object, the coating material may be spread or smoothed by means of a straight or curved doctor blade which is held a particular distance above the object, or which rides directly on the surface. In addition, coatings may be coextruded along with the extruded object in order to integrate the coating process with the extrusion process.

II. EXTRUDING HYDRAULICALLY SETTABLE MIXTURES

The basic structural component of the extruded articles of the present invention is the hydraulically settable matrix, which is formed from the reaction products of a hydraulically settable binder and water. Within the basic structural matrix are incorporated other components which add additional characteristics and properties, such as fibers, aggregates, rheology-modifying agents, dispersants, and set accelerators. Using a microstructural engineering and materials science approach makes possible the ability to include these various ingredients in a variety of amounts and proportions in order to build into the mixture the desired properties of form-stability and ultimate strength, toughness, and other performance criteria of the final hardened product.

The basic steps involved in the extrusion of hydraulically settable mixtures are as follows: (1) choosing the desired qualities and attributes of the article to be extruded from a hydraulically settable mixture, including size and strength properties; (2) selecting the desired parameters of an appropriate extrusion process, including the type of extruder, the die orifice shape, and the extrusion pressure, speed, and temperature; (3) determining the optimum composition and rheology, or range of rheologies, of an appropriate hydraulically settable mixture tailored to the desired qualities and attributes of the article and the desired parameters of the extrusion process; (4) preparing a suitable hydraulically settable mixture having the appropriate composition and rheology; (5) extruding the hydraulically settable mixture into the desired articles, or precursors to articles that can be further shaped into the desired articles; and (6) allowing the extruded article, or later shaped article, to harden into the final cured article. Optionally, the curing process may be accelerated by, for example, autoclaving or by placing a partially hardened article into a high humidity environment.

A. Designing the Desired Qualities of the Article

Using the compositions and methods set forth herein, a wide variety of articles may be mass produced in high volume by extruding a hydraulically settable mixture into the desired shape of the article, or into a precursor shape that may be further shaped into the desired article. The articles formed by using the extrusion methods of the present invention are characterized as having high compressive, tensile, and flexural strength, as well as high particle packing density of the solid aggregate and hydraulically settable binder particles. This results in a more dense and less porous hydraulically settable material than has been heretofore possible. This results in an article having low penetrability and low diffusion of moisture. These characteristics are possible using a microstructural engineering approach in order to design into the material beforehand the desired properties and performance criteria.

The high particle packing density of the extruded articles results from (1) the selection of aggregate particles having a predetermined distribution of sizes and shapes in order to optimize the natural particle packing density, and (2) the extrusion of the hydraulically settable material under generally high pressures, which force the particles into an even higher packing density than the natural packing, particularly where a there is an initial deficiency of water.

The high particle packing density and low water to hydraulically settable binder ratio that results from having an initial deficiency of water yield extruded articles having very low porosity and, hence, high strength according to the Strength Equation. The use of dispersants allows for the inclusion of even less water initially in order to create a more water deficient hydraulically settable mixture which will, nevertheless, be capable of being extruded under pressure.

The type of aggregate that will be used will depend largely on the desired strength and density criteria of the final cured article, as well as cost. Aggregates such as crushed sand, crushed granite, crushed basalt, silica, gypsum, and clay are extremely inexpensive and can greatly reduce the cost of manufacturing an extruded article therefrom. Such aggregates are also characterized as having high density and high compressive strength.

The inclusion of a hydraulically settable binder such as portland grey or portland white cement will yield a final cured product that is generally waterproof and which will resist penetration by water and other liquids. Nevertheless, other hydraulically settable binders, such as gypsum hemihydrate, are less water resistant and will yield a final cured article having lower resistance to water. In the event that a more water resistant article is desired, it may be advantageous to apply an appropriate coating onto the surface of the extruded article.

The inclusion of fibers and other high strength fillers can greatly increase the tensile and flexural strength of the final cured articles. The tensile strength may be stronger along one or more vectors or be evenly distributed depending on whether the fibers are aligned or randomly dispersed throughout the hydraulically settable matrix. The extrusion process itself will tend to orient the fibers in the direction of extrusion.

Different fibers have greatly varying degrees of tear and burst strength, flexibility, tensile strength, ability to elongate without breaking, and stiffness. The type of fiber that will be incorporated into the hydraulically settable material will depend on the desired properties of the article. In order to obtain the advantageous properties of different types of fibers it may be preferable in some cases to combine two or more different kinds of fibers within the hydraulically settable material.

In light of the foregoing, the cured extruded articles will preferably have a tensile strength greater than about 15 MPa. In many cases, depending on the mix design, water content, and extrusion pressure, it will be possible to obtain extruded articles having tensile strengths of about 30 MPa or greater and, in some cases, of about 50 MPa or greater. Because of the ability to remove a large percentage of the interstitial voids which are normally found within most cementitious products, the cured extruded hydraulically settable materials of the present invention will have a tensile strength to compressive strength ratio of about 1:7, which is higher than conventional concrete products, which typically have a tensile strength to compressive strength ratio of only about 1:10. Moreover, where high tensile strength fibers are employed in sufficient quantities, it is possible, according to the present invention, to obtain cured hydraulically settable materials which have a tensile strength to compressive strength ratio of about 1:3.

Because of the ability to extrude relatively thin-walled articles having relatively large internal cavities, it is possible for such extruded articles to have relatively low bulk densities. Extruded articles having a multicellular structure will preferably have a bulk density less than about 1.5 g/cm$^3$.

Because of the ability to extrude multicellular articles having wall thickness to cavity ratios that are far lower than what is presently possible in the art, it is possible to extrude articles having bulk densities of about 0.7 g/cm$^3$ or lower and, in some cases, of about 0.3 g/cm$^3$ or lower. Whether an extruded article will have a lower, intermediate, or higher bulk density will generally depend on the desired performance criteria for a given usage, and will usually depend on the ratio of the volumes of the solid walls of the article and internal cavities therein. The specific gravity of the solid walls of the articles will generally remain within the ranges stated herein.

In light of the foregoing, the extruded articles of the present invention will usually have significantly higher tensile strength to bulk density ratios compared to prior art cementitious articles. The extruded articles will preferably have a tensile strength to bulk density ratio greater than about 5 MPa-cm$^3$/g, more preferably greater than about 15 MPa-cm$^3$/g, and most preferably greater than about 30 MPa-cm$^3$/g.

B. Selecting the Extrusion Process

The type of extrusion process that will be employed will vary depending on the nature of the hydraulically settable mixture being extruded, as well as the desired properties of the extruded article. Although the hydraulically settable mix designs of the present invention have carefully controlled rheology and plastic-like properties, which make them suitable for other molding processes, the essential feature of the products of the present invention is that they can be continuously extruded into extruded articles that are form-stable immediately or very shortly after the extrusion process. The continuous nature of extrusion process allows for the formation of a wide variety of articles in an economical and inexpensive fashion.

As stated above, a combination of particle packing density, water deficiency, and compression during the extrusion process creates a hydraulically settable mixture with a discontinuous rheology. An important criterion in the extrusion process is providing an extruder capable of exerting the proper pressure or range of pressures for a given mix design. Pressure within the proper range is necessary in order to increase the particle packing density, and concomitantly decrease the volume of interstitial space, which decreases the effective water deficiency of the mixture. This allows for better lubrication of the particles and increased workability and flow properties.

The best properties are generally obtained by exerting a pressure which is commensurate with the levels of particle packing, water deficiency, and aggregate strength within the mixture. Too little pressure might be inadequate to impart adequate flow properties to the hydraulically settable mixture. Conversely, too much pressure may pulverize certain aggregates within the hydraulically settable mixture, while compressing the mixture to the point of having excess water. Excess water may, in some cases, reduce the viscosity and/or yield stress of the hydraulically settable mixture to the point that it will lack sufficient form-stability.

Depending on the amount of pressure that is desired and the amount of type of shear to be exerted onto the hydraulically settable mixture, either a piston-type or auger-type extruder can be used. The advantage of the piston-type extruder as shown in FIG. 1 is the greater amount of pressure which can be applied. In order to apply very high pressures, including those of up to 100,000 psi, the only current possibility is to use a piston extruder.

Figure 2:
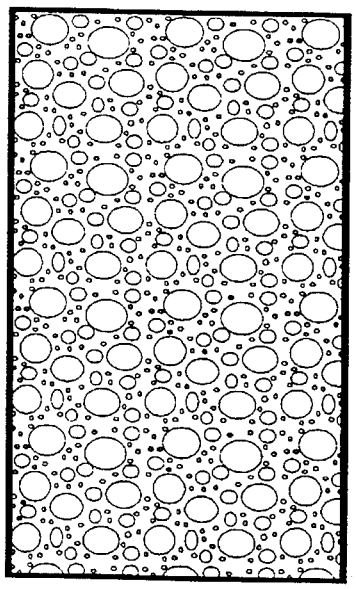
FIG. 2 is a greatly enlarged elevational cross-section view of the mixture illustrated in FIG. 1, together with a corresponding graph quantifying the volume occupied by the particles and the volume occupied by the interstitial voids between the particles.
Figure 2:
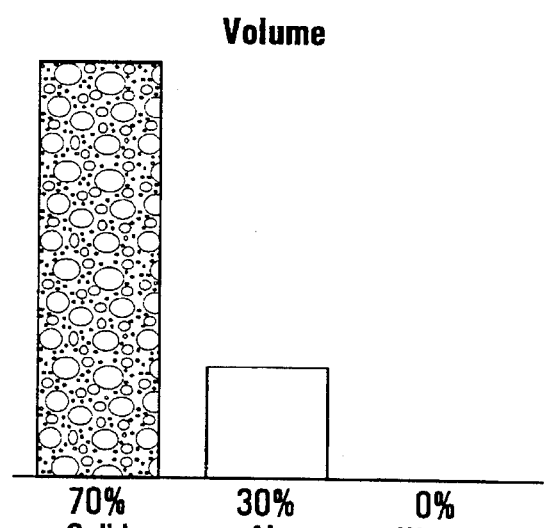

Auger-type extruders, as shown in FIG. 2, typically do not exert as much pressure as a piston extruder, and are preferred where extremely high pressures are unnecessary. Auger-type extruders have the advantage of imparting internal shear by the turning of the auger screw and the ability to apply a vacuum or negative pressure to the hydraulically settable mixture within the auger extruder to remove unwanted air within the mixture on a more continuous basis. The double auger extruder has been used mainly on an experimental basis and includes two parallel auger screws, which allow for a wider extruder die and greater extrusion pressures. In most other respects, the twin auger extruder is similar to the single auger extruder.

However, where hydraulically settable mixtures that are very deficient in water are used, it will often be necessary to use a piston extruder in order to exert higher pressures on the mixtures and cause them to flow. In such cases, the hydraulically settable mixture might appear as a dry-looking, granulate material prepared by mixing the components within a drum. The granulates are placed into a piston extruder chamber, put under a vacuum, and then compacted under high pressure by the piston in order to extruded the material. The use of a duel-batch piston extruder allows for a semi-continuous extrusion process.

A currently preferred system for large scale mixing and extrusion in an industrial setting involves equipment in which the materials incorporated into the hydraulically settable mixture are automatically and continuously metered, mixed, de-aired, and extruded by either a single or twin auger extruder apparatus. Either a single or twin auger extruder apparatus has sections with specific purposes, such as low shear mixing, high shear mixing, vacuuming, and pumping. A single or twin auger extruder apparatus has different flight pitches and orientations which permit the sections to accomplish their specific purposes.

The main types of extruders include either the clay or the plastic or food extruder. A clay extruder usually has an extruder having a very high pitch and flight height, the pitch often being 90° from the extruder die. The high pitch increases the amount of surface area of the interface between the auger blades and the material to be extruded, and increasing the pitch and resulting surface area increases the pressure and shear rate of the extruder.

On the other hand, a plastic or food extruder has a much lower flight height and pitch compared to the clay extruder. In this case, the pressure and shear rate are controlled by increasing or decreasing the RPM of the auger screw. Of course, increasing the RPM of the auger screw of a clay extruder will also increase the pressure and shear rate.

C. Designing The Hydraulically Settable Mixture

The two main criteria used to design an appropriate hydraulically settable mixture are the desired rheology of the mixture before, during, and after the extrusion process and the desired properties of the final hardened extruded article. As set forth above, the rheology of the hydraulically settable mixture is preferably designed so that the mixture will be able to flow and be extruded when subjected to the parameters of the given extrusion process, and thereafter be form-stable immediately or shortly after being extruded.

As previously discussed, the rheology of the hydraulically settable mixture may be determined initially by controlling (1) the particle packing density of the aggregate and hydraulically settable binder particles, (2) the amount of added water, including the level of water deficiency, and (3) the identity and amount of any organic polymer rheology-modifying agents, plasticizers, or dispersants. How these materials and conditions are interrelated has been discussed in detail.

In addition, the rheology of the hydraulically settable mixture may be altered by the addition of shear forces to effect shear thinning or pseudo-plastic behavior of the water deficient mixture, as well as by compressive forces which reduce the level of water deficiency by forcing the aggregate and hydraulically settable binder particles into closer proximity. In light of this, the level of water deficiency should correlate to the amount of compression and shear force that will be exerted on the hydraulically settable mixture. That is, less water may, as a general matter, be added initially as the amount of compressive and shear forces associated with the extrusion process are increased.

The release of the compressive and shear forces upon extruding the hydraulically settable mixture into the desired article results in a form-stable article held together by internal cohesion of the capillary water or meniscuses. However, these internal forces are dependent upon the amount of water within the capillaries of the material within the extruded article. If the amount of water is too low, there will be insufficient capillary forces to maintain adequate cohesion. Conversely, if the amount of water is too high, the material will have inadequate yield stress to remain form-stable. The amount of water that remains will be a function of the amount of water added initially, as well as the level of compression during the extrusion process.

Upon hydrating, the extruded hydraulically settable material will develop its final strength properties. The compressive strength of the material may be determined by the Strength Equation, and is mainly a function of the porosity of the final hardened material. This is also true for the tensile and flexural strengths of the hardened material to a certain extent. Porosity can be reduced by increasing the initial particle packing density and by decreasing the amount of water that is added initially (or increasing the water deficiency). The level of compressive strength that is desired will depend on the particular performance criteria of the desired article.

In addition, the compressive strength can be increased by using stronger aggregates. Conversely, lighter weight aggregates can be employed when a less strong, but lighter weight article is desired. The tensile and flexural strengths may be altered by adding varying amounts of fiber. Shorter, stronger fibers, such as ceramic fibers, will generally yield a relatively stiff final hardened article with high tensile and flexural strength. Other fibers, such as cellulosic fibers, have lower tensile strength but are less expensive and more flexible and may be adequate where properties of flexibility and toughness are more important.

1. Optimizing the Particle Packing Density

Achieving an optimized particle packing arrangement within the solid materials of the hydraulically settable mixture is desirable in order to obtain a hydraulically settable mixture having the desired rheological and final strength properties. Once the particle packing density of a dry mixture is determined, it is then possible to calculate how much water should be added to the mixture in order to achieve the desired level of water deficiency. A detailed description of the theory, models, and steps necessary to accurately and reproducibly optimize the particle-packing density of the solid particles with a hydraulically settable mixture is set forth in copending U.S. application Ser. No. 08/109,100, entitled: "Design Optimized Compositions and Processes for Microstructurally Engineering Cementitious Mixtures," and filed Aug. 18, 1993, in the name of Per Just Andersen, Ph.D. and Simon K. Hodson. For purposes of disclosure, this application is incorporated herein by specific reference. In addition, mathematical and graphic models used to determine and quantify the particle-packing density of a mixture is set forth in V. Johansen and P. J. Andersen, "Particle Packing and Concrete Properties" at 118–22, *Materials Science of Concrete II* (The American Ceramic Society, Inc., 1991). For purposes of disclosure, this article is incorporated herein by specific reference.

In order to achieve a desired packing density of the various particles within the hydraulically settable mixture, including the hydraulically settable binder particles and the aggregates, the particles will have at least two size ranges. In order to increase the particle-packing density to higher theoretical limits, it may be preferable in some cases to have three or more different size ranges of particles. For purposes of particle packing, mixtures that contain two different size ranges of particles are referred to as "two-component systems", those that have three different particle size ranges are referred to as "three-component systems", and so on. For simplicity, the two different components of a two-component system may be referred to as the fine and coarse components, while in the three-component system they may be referred as the fine, medium, and coarse components.

In order to obtain an optimized level of particle packing, it is preferable for the average particle size within one size range to be at least seven and one-half times the particle size of the next smallest particle range, more preferably at least about ten times, and most preferably at least about twelve and one-half times. (In many cases the ratio may be greater.) For example, in a two-component system, it will be preferable for the average particle size of the coarse component to be at least about seven and one-half times the average particle size of the fine component. Likewise, in a three-component system, it will be preferable for the average particle size of the coarse component to be at least seven and one-half times the average particle size of the medium component, which will likewise preferably be at least seven and one-half times the size of the fine component. Nevertheless, as more differently sized particles are added, the ratio between the particle size magnitudes need not always be this great.

In a three-component system, it will be preferable for the fine aggregate particles to have diameters within a range from about 0.01 microns to about 2 microns, with a medium aggregate particle to have diameters in a range from about 1 to about 20 microns, and for the coarse aggregates to have a diameter within a range from about 100 microns to about 2 mm. In a two component system, any two of these ranges may be preferable. Larger and smaller diameter particles may be used, as well as particles within different ranges, depending on the number of different particle types.

The term "type" as used in the specification and appended claims with regard to aggregate, hydraulically settable binder, and other solid particles is intended to include both the kind of material used and the ranges of the particle sizes. For example, although coarse aggregates usually have particle diameters in a range from about 100 microns to about 2 mm, one type of coarse aggregate may have a particle size range from about 200 to about 500 microns while a second type may have a particle size range from about 700 microns to about 1.2 mm. As stated herein, optimal particle packing of a mixture can be obtained by selectively combining different types of aggregates. Each type of aggregate has a defined average particle size; studies have found, however, that particle gap grading leads to good packing but low workability compared to continuous gradation.

In general, a two-component (or binary) packing system will seldom have an overall packing density higher than about 80%, while the upper limit for a three-component (or ternary) system is about 90%. To obtain higher particle packing it will be necessary in most cases to add four or more components, although having broader and more optimized particle sizes among two- or three-component systems can yield higher overall particle packing than 80% and 90%, respectively.

The hydraulically settable binder used in the present invention is usually a hydraulic cement, gypsum, or calcium oxide and may, in some cases, comprise fly ash or silica fume. Hydraulic cement is characterized by the hydration products that form upon reaction with water. Hydraulic cements generally have particle sizes ranging from 0.1 µm to 100 µm. Portland cement, Type 1 has an average particle size in a range from about 10 to about 25 microns.

The types of aggregates and hydraulically settable binders used in the present invention are further defined by the average diameter size (d') and the natural packing density ($\phi$) of the types of particles. These values are experimentally determined and are necessary for calculating the packing density of the resulting hydraulically settable mixture.

The natural packing density of each type of material is determined by filling the material into a cylinder having a diameter of at least 10 times the largest particle diameter of the material. The cylinder is then tapped against a hard surface until the material is fully compacted. By reading the height of compacted material in the cylinder and the weight of material, the packing density is calculated according to the formula:

$$\phi = \frac{W_M}{SG_M \cdot V_M} \qquad (1)$$

Where, $W_M$=weight of the material, $SG_M$=specific gravity of the material, and $V_M$=volume of the material.

Of course, two or more types of hydraulically settable binder may also be added to a mixture. The particle size of the hydraulically settable binder is usually so small, however, that the combination of different types of hydraulically settable binders generally does not significantly affect the packing density of the mixture. Nevertheless, in some situations the combination of different types of hydraulically settable binders may be relevant. In these situations, the types of hydraulically settable binder can be represented as a pseudo-particle in the same manner as for fine and coarse aggregate.

The above described process teaches a method for determining the packing density for all possible combinations of a given feed stock. With regard to the rheological effect, increasing the particle packing density allows for the inclusion of less water while maintaining the same levels of workability and plastic-like behavior of the mixture. In addition to improving the rheological properties of the mixture while in the green state, maximizing particle packing density also increases the strength of the final cured product by reducing the amount of interstitial space filled either by air, water, or a combination of both (according to the Strength Equation).

Nevertheless, it should be understood that "optimizing" the particle packing system will not necessarily be achieved by simply maximizing the particle packing density. As a general rule, maximization of particle packing density tends to increase the desired properties which are achieved through particle packing. However, restraints such as cost and/or availability of particular aggregates might warrant a lower particle packing density while still obtaining a mixture with adequate rheological properties for a particular purpose.

Although it has been recognized that increasing the particle packing density aids in controlling the rheological properties of a hydraulically settable mixtture, the maximum packing density in the prior art has been about 65%. In contrast, through the particle packing techniques described above, it is possible to obtain natural particle packing densities greater than 65%, and even as high as 99%.

In general, the particle packing density will preferably be within a range from about 0.65 to about 0.99, more preferably between about 0.70 and about 0.95, and most preferably between about 0.75 and about 0.90 (The added cost of achieving 99% particle packing efficiency is often prohibitive. Therefore, most preferred packing densities are somewhat less).

FIG. 1 illustrates the concept of particle packing by showing a cross-section of particles which have been efficiently packed together (particle packing density of 0.70). From FIG. 1, it can be seen that the spaces between the larger aggregate particles that would normally be occupied by air are instead occupied by smaller aggregates. Moreover, the space between the larger and smaller particles which would normally be occupied by air are in turn occupied by yet smaller sized aggregate particles. In this way, the volume of interstitial air between the particles is greatly reduced, while the particle packing density is greatly increased.

FIG. 2 graphically illustrates and quantifies the actual packing density by showing how in a typical packing system (particle packing density of 0.70) the overall volume of the mixture is distributed between solid particles (70%) and interstitial space (30%). It is this interstitial space into which water is added in order to lubricate the individual particles so that the hydraulically settable mixture will have adequate workability and flow properties, particularly when the packing density is temporarily increased by extruding the mixture under increased pressure.

C. Water Deficiency

As stated above, the amount of water which will be added to any given hydraulically settable mixture should be carefully measured in order to obtain the desired properties of workability and rheology. It will be understood, however, that the amount of water to be added to any given mixture will often have less to do with the volume, or even the mass, of the dry hydraulically settable mixture but directly corresponds to the packing density, more particularly the amount of interstitial voids within the mixture.

Figure 3A:
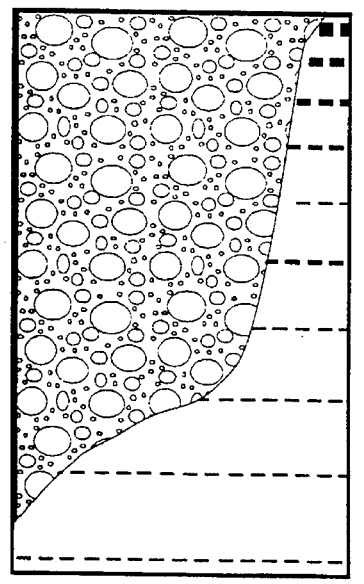
FIG. 3 is a greatly enlarged elevational cross-section view of the mixture illustrated in FIG. 1 to which a quantity of water equaling the volume of interstitial voids has been added, together with a corresponding graph quantifying the volume occupied by the particles and the volume occupied by the water between the particles.
Figure 3A:
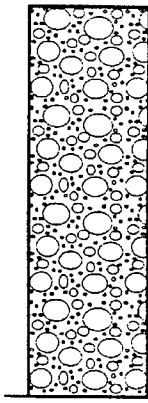
Figure 3A:
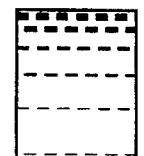
Figure 3B:
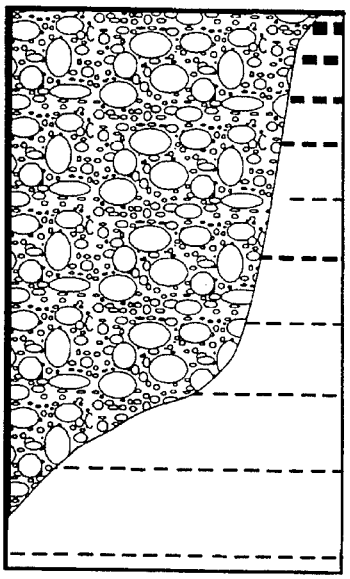
Figure 3B:
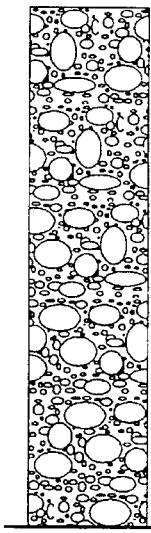

To better illustrate this point, reference is made to FIGS. 3A and 3B, which show two different particle packing systems having the same overall volume and which are both 0% deficient in water. That is, just enough water has been added to completely fill the interstices between the particles. Both of these mixtures will have similar rheologies even though they have quite varying amounts of water. As shown graphically in FIGS. 3A and 3B, the mixture having a packing density of 65% (FIG. 3A) has seven times the interstitial water of the mixture having 95% packing density (FIG. 3B). (Of course, it would also be predicted that the mixture with the higher packing density will have greater strength when cured, according to the Strength Equation.)

Figure 4:
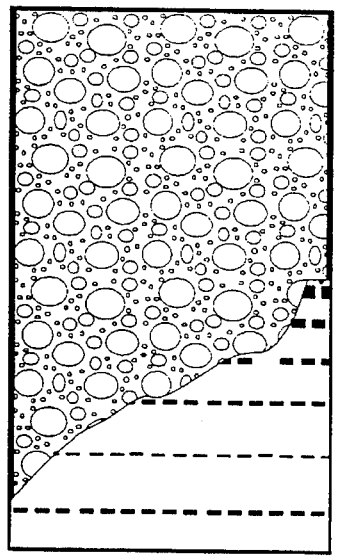
FIG. 4 is a greatly enlarged elevational cross-section view of the mixture illustrated in FIG. 1 to which a quantity of water less than the volume of interstitial voids has been added to form a water deficient mixture, together with a corresponding graph quantifying the volume occupied by the particles, the volume occupied by the water between the particles, and the volume occupied by the interstitial voids that yet remain between the particles.
Figure 4:
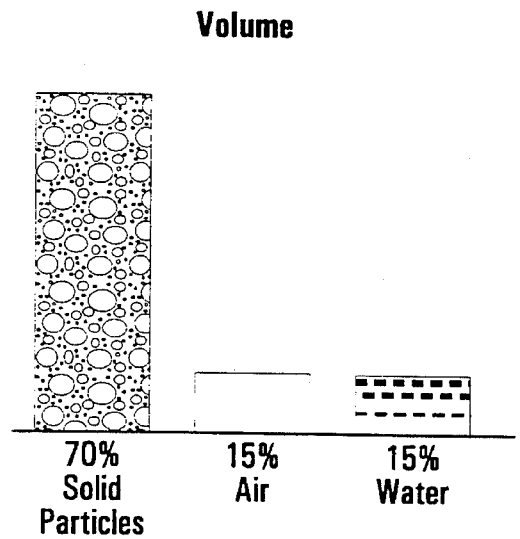

FIG. 4 shows an optimized particle packing system in which there is a 50% deficiency of water, that is, only half of the interstitial space has been filled with water (50% of the space, or 15% of the overall mixture by volume). As a matter of comparison, two hydraulically settable mixtures which have the same overall volume and the same volume of added water will have differing levels of water deficiency whenever their particle packing density differs. The lower the packing density the greater the water deficiency since there is more interstitial space to be filled.

Figure 5:
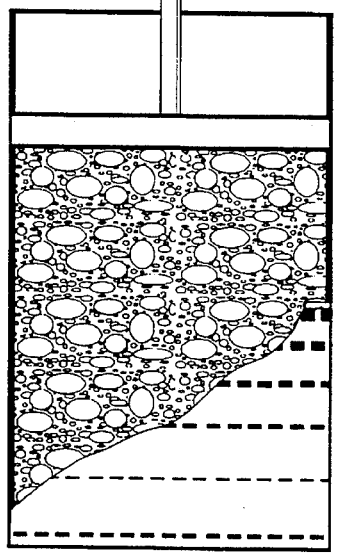
FIG. 5 is a greatly enlarged elevational cross-section view of the mixture illustrated in FIG. 4 upon which a compressive force (i.e., pressure) has been applied sufficient to force the particles into a more closely packed arrangement, together with a corresponding graph quantifying the volume occupied by the particles, the volume occupied by the water between the particles, and the lesser volume occupied by the interstitial voids that yet remain between the particles.
Figure 5:
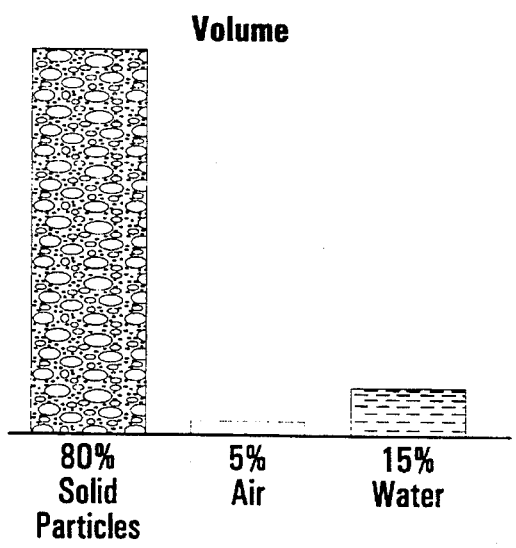

FIG. 5 shows both pictorially and graphically how the application of pressure to a hydraulically settable mixture, such as by an extruder, causes the particles of the mixture to become more compacted, thereby increasing their packing density. Because the particles and water are essentially incompressible, the amount of interstitial voids greatly decreases, while the amount of water available to lubricate the particles apparently increases. Although air is extremely compressible and would not significantly impede the compaction process described above, it is advantageous to remove the air by means of a vacuum in order to prevent re-expansion of the air upon release of the compressive force.

Knowing just how much water should be added to any given hydraulically settable mixture must be carefully calculated prior to actually adding the water and also verified once the water is added. As stated above, the hydraulically settable binder does not necessarily react with all of the theoretical stoichiometric water necessary to hydrate the binder. Instead, some of this water actually fills the interstitial space, at least temporarily until it reacts with the hydraulically settable binder over time.

Of course, it should be understood that the level of water deficiency is not the only determinant of the rheology of the hydraulically settable mixture. Other additives, such as dispersants and rheology-modifying agents, greatly affect the viscosity, workability, and other rheological properties of the mixture. One skilled in the art will be able to adjust the level of water deficiency based on the amount of dispersant and/or rheology-modifying agent that has been added to the mixture to obtain a hydraulically settable mixture having the desired properties.

D. Preparing The Hydraulically Settable Mixture

As set forth above, any mixing means that is appropriate for a particular manufacturing process will work well to achieve good particle packing, although it is believed that the best particle packing density is achieved by mixing together the aggregates and the hydraulically settable binder particles before any water has been added. Once the desired amount of water is ready to be added, any appropriate mixing process may be used. A high shear mixer, such as those described more fully hereinafter, may be used to create a very homogeneous mixture. A kneader-mixer, such as a clay kneader, is often preferable where lower shear is desired. Finally, the materials may be mixed together and extruded using either a single or twin auger extruder. High frequency vibration may be used in conjunction with any mixing process to aid in the mixing of the components.

The currently preferred embodiment for preparing an appropriate moldable mixture in an industrial setting includes equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 60 minutes, and thereafter emptied from the mixer by extrusion.

In certain circumstances it may be desirable to mix some of the components together in a high shear mixture in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. High shear mixers within the scope of these patents are available from E. Khashoggi Industries of Santa Barbara, Calif., the Assignee of the present invention.

Different mixers are capable of imparting differing shear to the moldable mixer. For example, a kneader imparts higher shear compared to a normal cement mixer, but is low compared to an Eirich Intensive Mixer or a twin auger food extruder.

It should be understood, however, that high shear, high speed mixing is generally efficacious only where the mixture has relatively low viscosity. In those cases where it is desirable to obtain a more cohesive, plastic-like mixture, it may be desirable to blend some of the ingredients, including water, in the high shear mixer and thereafter increase the concentration of solids, such as fibers or aggregates, using a lower shear kneading mixer.

In many cases the order of mixing will impart different properties to the hydraulically settable mixture. In a currently preferred embodiment in which both a dispersant and a rheology-modifying agent are used, it will be preferable to first mix the hydraulically settable binder and water together using a high shear mixer. The dispersant is preferably added after significant wetting of the hydraulically settable binder particles has occurred. After the dispersant has been substantially adsorbed by the hydraulically settable binder particles, the rheology-modifying agent is added to the mixture.

E. Extruding Articles From The Hydraulically Settable Mixture

Once the moldable mixture has been properly blended, it is then transported to the extruder. Although the hydraulically settable mix designs of the present invention have o carefully controlled rheology and plastic-like properties which make them suitable for other molding processes, the essential feature of the products of the present invention is that they can be continuously extruded. It is this continuous extrusion process which allows the formation of a wide variety of objects and shapes in an economical and inexpensive fashion.

As stated above, a combination of particle packing density, water deficiency, and compression during the extrusion process creates a hydraulically settable mixture with discontinuous rheological properties. Hence, an important criterion in any extrusion process is choosing an extruder which is capable of exerting a carefully predetermined pressure for any given mix design. This is because the compressive forces of the extruder are responsible for temporarily increasing the particle packing density, which decreases the volume of interstitial space and decreases the effective water deficiency of the mixture. This immediately translates into better lubricated particles and increased workability and flow properties.

However, the best properties are generally obtained by exerting a pressure which is commensurate with the levels of particle packing, water deficiency and aggregate strength within the mixture. Adding too little pressure would prevent the ability to impart adequate flow properties to the hydraulically settable mixture. Conversely, adding too much pressure might also cause a number of problems, including the pulverization of certain aggregates within the hydraulically settable mixture, a tendency of the extruded material to burst out of the extruder die rather than continuously flowing out, or non-uniformity of flow through the die.

Depending on the amount of pressure that is desired and the amount of type of shear to be exerted onto the hydraulically settable mixture, either a piston-type or auger-type extruder can be used. An auger-type extruder (FIG. 6) has certain advantages even though it cannot be used to extrude at the same high pressures as a piston extruder. These advantages include continuous internal shear which is applied by the turning auger screw, as well as greater ease in continuously applying a vacuum or negative pressure to the hydraulically settable mixture within the auger extruder to remove any unwanted air within the mixture. In some cases, an apparatus capable of both mixing and extruding the moldable mixture may be used in order to streamline the operation and minimize the coordination of the various o components within the system. The advantage of the piston-type extruder as shown in FIG. 7 is the greater amount of pressure which can be applied. In order to apply very high pressures, even up to 100,000 psi, the only currently known to use possibility is a piston extruder.

Figure 6:
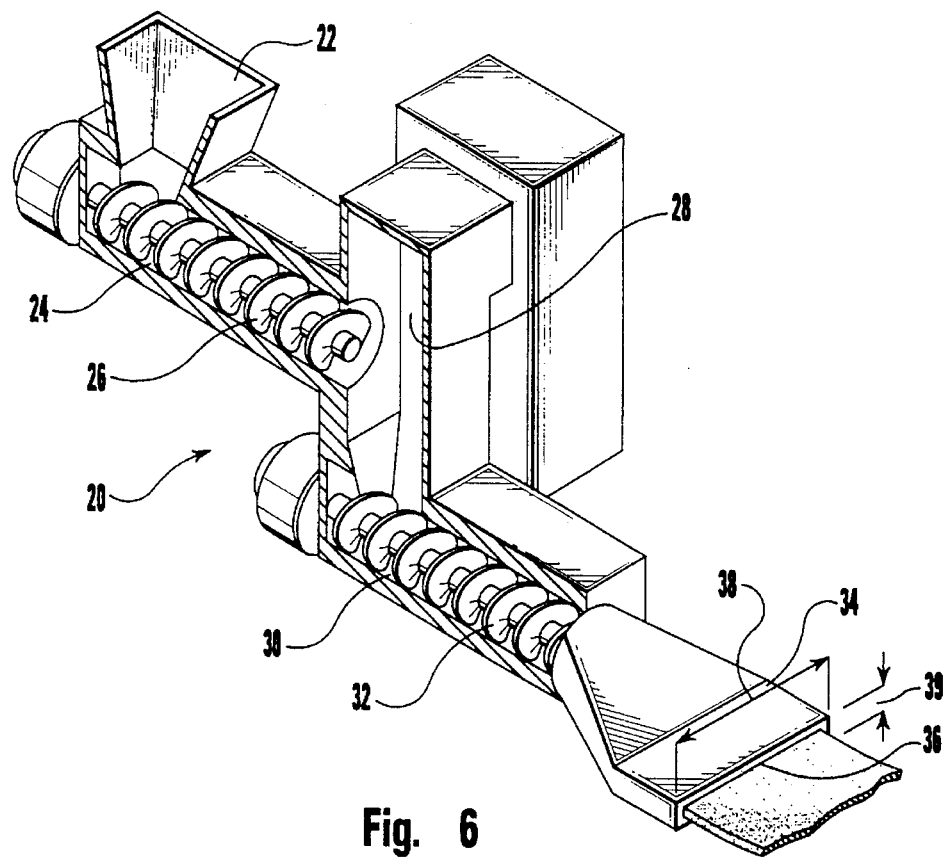
FIG. 6 is a cross-section view of an auger extruder.
Figure 7:
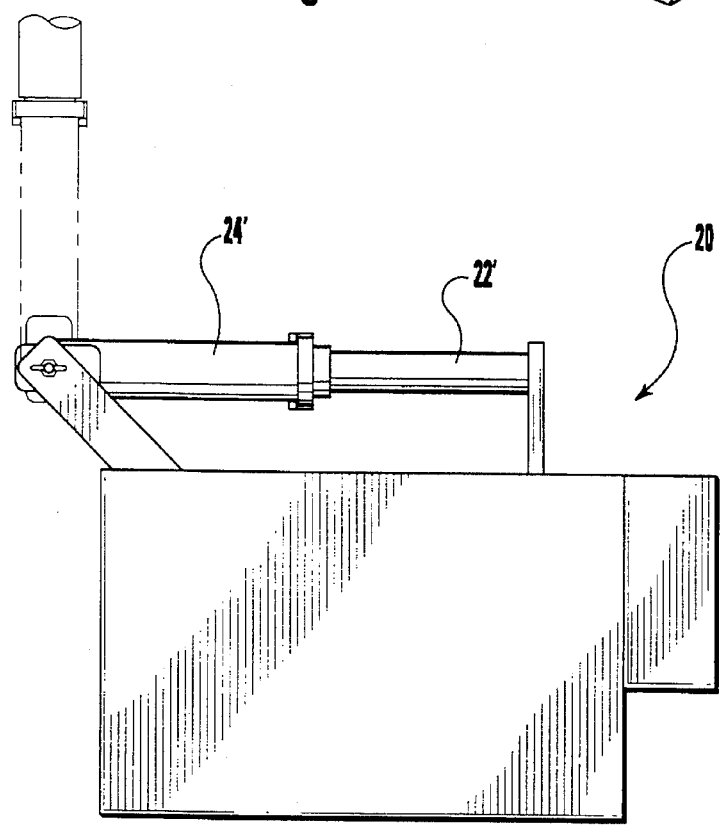
FIG. 7 is a cross-section view of a piston extruder.

Reference is now made to FIG. 6, which is a closeup view of an auger extruder 20, which includes a feeder 22 that feeds the moldable mixture into a first interior chamber 24 within the extruder 20. Within the first interior chamber 24 is a first auger screw 26 which exerts forward pressure on and advances the moldable mixture through the first interior chamber 24 toward an evacuation chamber 28. Typically, a negative pressure or vacuum will be applied to the evacuation chamber 28 in order to remove unwanted air voids within the moldable mixture.

Thereafter, the moldable mixture will be fed into a second interior chamber 30. A second auger screw 32 will advance the mixture toward a die head 34 having a transverse slit 36 with a die width 38 and a die thickness 39. The cross-sectional shape of the die slit 36 is configured to create a sheet of a desired width and thickness that will generally correspond to the die width 38 and die thickness 39.

Alternatively, as seen in FIG. 7, the extruder may comprise a piston extruder 20' instead of an auger extruder 20. A piston extruder utilizes a piston 22' instead of an auger screw 22 in order to exert forward pressure on and advance the moldable mixture through the interior chamber 24'. An advantage of using a piston extruder is the ability to exert much greater pressures upon the moldable mixture. Nevertheless, due to the highly plastic-like nature of mixtures typically employed in the present invention, it is not generally necessary, or even advantageous, to exert pressures greater than those achieved using an auger extruder.

A currently preferred system for large scale mixing and extrusion in an industrial setting involves equipment in which the materials incorporated into the hydraulically settable mixture are automatically and continuously metered, mixed, de-aired, and extruded by a twin auger extruder apparatus. A twin auger extruder apparatus has sections with specific purposes, such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into the twin auger extruder apparatus. The preferable twin auger extruder apparatus utilizes uniform rotational augers wherein the augers rotate in the same direction. Counter-rotational twin auger extruders, wherein the augers rotate in the opposite directions, accomplish the same purposes. A pug mill may also be utilized for the same purposes. Equipment meeting these specifications are available from Buhler-Miag, Inc., located in Minneapolis, Minn.

The amount of pressure that is applied in order to extrude the moldable mixture will generally depend on the pressure needed to force the mixture through the die head, as well as the desired rate of extrusion. The rate of extrusion should be carefully controlled in some circumstances in order for the rate of formation of the extruded article to correspond to the rate of subsequent processing steps, such as cutting and/or reformation of the extruded article. An important factor which will affect the optimum speed or rate of extrusion is the final thickness of the extruded article. A thicker article contains more material and will require a higher rate of extrusion to provide the necessary material. Conversely, a thinner article contains less material and will require a lower rate of extrusion in order to provide the necessary material.

The ability of the moldable mixture to be extruded through a die head, as well as the rate at which it is extruded, is generally a function of the rheology of the mixture, as well as the operating parameters and properties of the machinery. Factors such as the amount of water, hydraulically settable binder, rheology-modifying agent, dispersant, the particle packing density, or the level of water absorption or reaction by the mixture components all affect the rheological properties of the mixture.

As set forth above, adequate pressure is necessary in order to temporarily increase the workability of the moldable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions. However, as the mixture is compressed within the extruder, the compressive forces drive the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

In light of each of the factors listed above, the amount of pressure which will be applied by the extruder in order to extrude the moldable mixture will preferably be in a range from about 10 bars to about 7000 bars, more preferably in a range from about 20 bars to about 3000 bars, and most preferably in a range from about 50 bars to about 200 bars.

It will be understood that the extrusion of the moldable mixture through the die head will tend to unidirectionally orient the individual fibers within the moldable mixture along the "Y" axis, or in the lengthwise direction of the extruded article.

As set forth above, it may also be desirable to co-extrude the hydraulically settable mixture with other materials in order to obtain, e.g., a laminate structure or an extruded product with other materials impregnated within the hydraulically settable matrix. Things which may be co-extruded with the extrudable hydraulically settable mixtures of the present invention include another hydraulically settable mixture (often having different or complementary properties), a fibrous mat, continuous fibers, coating materials, polymers, clays, graphite (for making a pencil), continuous fibers, or strips, wires, or sheets of almost any other material (such as metal). It has been found that by joining together, for example, a hydraulically settable sheet and a fibrous mat by co-extrusion that the final product exhibits synergistic results of strength, toughness, and other performance criteria.

F. Accelerated Drying

Although the hydraulically settable materials of the present invention are capable of quickly gaining high green strength, it may yet be desirable to accelerate further the hardening or stiffening of the extruded materials. This can be accomplished by applying heat to further remove some of the water within the hydraulically settable mixture, particularly from the surface where the greatest amount of green strength is often desired. Heating is especially desirable where there is an excess of water within the mixture in order to increase the viscosity and yield stress of the extruded article and impart the desired rapid form-stability.

Because of the nature of extrusion, it will usually not be advantageous to overheat the extruder die above a certain temperature in order to remove water during the extrusion process. Overheating the die might cause the extruded mixture to expand or form pockets of high pressure steam that can cause the hydraulically settable mixture to "explode" out of the extruder die. (Nevertheless, some degree of heating may be desirable in order to reduce the friction between the extruded material and the extruder die by forming a steam barrier.) By careful control of the rheology of the hydraulically settable mixture and appropriate heating of the extruder die, it is generally possible to obtain extruded articles having strength to allow it to be handled immediately after extrusion.

G. Accelerated Curing

In those cases in which the extruded hydraulically settable mixture is so water deficient that there is insufficient water to adequately hydrate the cement or other hydraulically settable binder, it might be advantageous to expose the extruded object to water or air having high humidity. The hygroscopic nature of typical binders, particularly hydraulic cement, allows the binder to literally absorb the necessary water of hydration from the air. Although this would occur naturally in any event (at least in the case of hydraulic cement), exposing the very water deficient extruded object to air having high humidity greatly increases this water absorption process and the rate of hydration of the binder particles. In particular, autoclaving may be used in order to greatly increase the strength of the final cured article.

III. EXAMPLES OF THE PREFERRED EMBODIMENTS

To date, numerous tests have been performed comparing the rheological and extrusion properties of various hydraulically settable mixtures of varying composition. Below are specific examples of compositions which have been extruded according to the present invention. In addition, a number of hypothetical, or "prophetic", examples have been included based on actual mix designs that have been extruded or which would be expected, based on experience, to posses the properties described hereinafter. The actual examples are written in the past tense while the hypothetical examples are written in the present tense in order to distinguish between the two.

In general, the examples are directed to hydraulically settable mixtures which employ varying levels of water deficiency and particle packing efficiency, along with varying amounts of, for example, hydraulically settable binder, aggregates, fibers, rheology-modifying agents, and other admixtures in order to obtain mixtures having varying flow properties when extruded under pressure, and varying degrees of form-stability once the article has been extruded and the pressure released.

EXAMPLES 1–9

Hydraulically settable mixtures having 4 kg of portland cement Type 1, 6 kg fine silica sand, 50 g Tylose® FL 15002, and varying amounts of water were prepared and then extruded through a die using a piston extruder. The fine silica sand had a natural packing density of about 0.55 and a particle size in the range from about 30–50 microns. When mixed with portland cement Type 1, which has an average particle size in a range from about 10–25 microns, the resulting dry mixture had a particle packing density of about 0.65, which represents only a moderate increase over the natural packing density of each. The natural packed volume of the cement and sand was 5.504 liter, with a porosity of 1.924 liter.

The amount of water in the mixtures was varied as follows in order to determine the extrudability of the mixture at varying levels of water deficiency:

| Example | Water | % Deficient | Extrusion Pressure |
|---------|---------|-------------|--------------------|
| 1 | 3.0 kg | (55.9%) | 15 psi |
| 2 | 2.5 kg | (29.9%) | 15 psi |
| 3 | 1.924 kg | 0% | 45 psi |
| 4 | 1.905 kg | 1.0% | 100 psi |
| 5 | 1.65 kg | 14.2% | 300 psi |
| 6 | 1.443 kg | 25.0% | 820 psi |
| 7 | 0.962 kg | 50.0% | 1639 psi |
| 8 | 0.60 kg | 68.8% | 2131 psi |
| 9 | 0.40 kg | 79.2% | 3278 psi |

In Examples 1 and 2, the numbers in parentheses under the heading "% Deficient" indicates that an excess of water was used. That is, more water than the volume of interstitial space (or porosity, which was 1.924 liter) was added. As a result, these mixtures were characterized as "very fluid" and could not be extruded with sufficient form-stabilitty so that the extruded objects would maintain their shape without external support. Similarly, although Examples 3 and 4 were less fluid and were characterized as "very soft" they could not be extruded into form-stable objects that would completely maintain their shape without external support. However, as the amount of water was further decreased, thereby increasing the water deficiency, the form-stability of the extruded material increased to the point where an extruded object would maintain its shape without external support.

The mixture of Example 5 was characterized as "soft" but could be extruded at relatively low pressure into an object having good form-stability. The mixtures in Examples 6–9 could be extruded by increasing the extrusion pressure as the amount of water was decreased, with increasing form-stability being observed as the amount of water decreased. As the water deficiency and extrusion was increased, the level of compaction of the mixture also increased, which resulted in greater packing of the particles together and higher density of the extruded material. After each of the mixtures was allowed to harden, the hardened material for each example had the following tensile strengths, respectively, expressed in MPa: 2.4, 3.1, 5.2, 15.2, 28.2, 30.3, 32.2, 35.0, and 38.0.

The mixtures of Examples 5–9 were successfully extruded into honeycomb (i.e., multicellular) structures, bars, and window frames. The mixtures of Examples 6–9 were also extruded into pipes of varying wall thickness. The pipe extruded from the mixture of Example 7 had a wall thickness that was 25% of the pipe cavity; the pipe extruded from the mixture of Example 8 had a wall thickness that was 15% of the pipe cavity; and the pipe extruded from the mixture of Example 9 had a wall thickness that was 10% of the pipe cavity.

EXAMPLE 10–13

To the mixtures of Examples 5–9 are added the following amounts of fiber, expressed as a percentage by volume of the total solids content of the hydraulically settable mixture:

| Example | Fiber |
| --- | --- |
| 10 | 1% |
| 11 | 2% |
| 12 | 3% |
| 13 | 4% |

The type of fiber that will be added depends on the properties and performance criteria of the extruded article. In general, however, increasing the tensile strength of the fiber will increase the tensile strength of the extruded article. Nevertheless, other factors such as aspect ratio, length, and reactivity with the hydraulically settable binder will affect the level of anchoring or pull-out of the fibers within the hydraulically settable matrix when subjected to stresses and strains. As the amount of fiber is increased, the tensile strength and ductility of the hardened extruded article also increase.

EXAMPLE 14

The procedures of Examples 1–9 were repeated except that the amount of Tylose® FL 15002 within the hydraulically settable mixture was increased to 100 g prior to extrusion. The increased amount of Tylose® aided the extrusion process by increasing the lubrication between the particles themselves and between the particles and the extruder walls and diehead. In addition, the increased Tylose® increased the form-stability of the extruded articles somewhat, although not two-fold.

EXAMPLE 15

The procedures of Examples 1–9 were repeated except that 160 g of sulfonated naphthalene-formaldehyde condensate was added to the mixture as a dispersant. First the hydraulic cement, water, dispersant and at least part of the aggregate were mixed together using a high shear mixer for about 10 minutes. Afterward, the Tylose® FL 15,002 and the remaining aggregate, if any, were mixed into the mixture using a low shear mixer. The dispersant allowed for the obtaining of a more fluid mixture while maintaining the same level of water.

The resulting hydraulically settable mixtures have lower viscosity, which made them more easily extruded using lower pressures, compared to the mixtures of Examples 1–9. However, the extruded articles were generally less form stable than their counterparts obtained in Examples 1–9. Nevertheless, significantly less water was required to obtain a mixture having the same level of extrudability and form stability in the present example compared to in Examples 1–9. This yielded final cured articles having higher strength due to the reduced amount of water within the hydraulically settable mixtures, according to the Strength Equation.

EXAMPLE 16

The procedures of Examples 1–9 and 15 were repeated, except that 0.8 kg of silica fume was also added to each of the mixtures. Because of the high specific surface area of silica fume, the mixtures which included silica fume had better dispersion, particularly where a dispersant was added to the mixture.

While the addition of silica fume would be expected to result in a mixture requiring more water to obtain the same level of workability, it turns out that the extremely small particle size of the silica fume relative to the other particles within the hydraulically settable mixtures greatly increased their particle packing densities. Consequently, the mixtures had significantly lower porosities, which decreased the amount of water needed to lubricate the particles. As a result, the extrudability of the mixtures containing silica fume was similar to those which did not include silica fume. However, the silica fume increased the yield stress and cohesive nature of the mixtures, which increased the form stability of the extruded articles made therefrom.

In the following examples, the particle sizes of the silica sand aggregate were increased in order to increase the packing density of the resulting mixture. The increased particle packing densities that were thus obtained resulted in extruded articles of higher strength. This goes against conventional wisdom, which teaches the use of the finest particle size available in order to increase the density, and hence the strength, the final hardened article. In contrast, by progressively increasing the size of the silica sand particles, which increased the ratio of the size of the aggregate particle to the cement particles to within the preferred and more preferred ranges, the density of the mixture actually increased.

EXAMPLES 17-36

The same amounts and types of hydraulically settable binder and aggregate were used according to Examples 1-9, except that the amount of added water was varied in much smaller gradations as follows:

| Example | Water | % Deficient |
|---|---|---|
| 17 | 3.0 kg | (55.73%) |
| 18 | 2.8 kg | (45.35%) |
| 19 | 2.6 kg | (34.97%) |
| 20 | 2.4 kg | (24.59%) |
| 21 | 2.2 kg | (14.20%) |
| 22 | 2.0 kg | (3.82%) |
| 23 | 1.8 kg | 6.46% |
| 24 | 1.6 kg | 16.94% |
| 25 | 1.4 kg | 27.32% |
| 26 | 1.2 kg | 37.71% |
| 27 | 1.0 kg | 48.09% |
| 28 | 0.9 kg | 53.23% |
| 29 | 0.8 kg | 58.47% |
| 30 | 0.7 kg | 63.66% |
| 31 | 0.6 kg | 68.85% |
| 32 | 0.5 kg | 74.04% |
| 33 | 0.4 kg | 79.24% |
| 34 | 0.3 kg | 84.43% |
| 35 | 0.2 kg | 89.62% |
| 36 | 0.1 kg | 94.81% |

The extrusion pressure needed to extrude the mixtures of these examples were similar to those needed to extrude the mixtures of Examples 1-9. As above, the mixtures in Examples 17-22 were too fluid to have adequate form-stability after being extruded. In addition, because they had an excess of water initially, they exhibited relatively low strength according to the Strength Equation. While the mixture of Example 23 could be extruded, only articles of larger cross section and simple shape were able to maintain their shape without external support. The mixtures of Examples 24-33 could be extruded within about the same range of pressures as the mixtures of Examples 5-9. However, the mixtures of Examples 34-36 were unable to be extruded using the extruding equipment available to the inventors.

EXAMPLES 37-53

Hydraulically settable mixtures having 4 kg of portland cement Type 1, 6 kg silica sand, 50 g Tylose®, and varying amounts of water were prepared and then extruded through a die using a piston extruder. The silica sand had a natural packing density of about 0.55 and a particle size within the range from about 50-80 microns. When mixed with portland cement Type 1, which has a particle size within the range from about 10-25 microns, the resulting dry mixture had a particle packing density of about 0.7, which represents a better increase over the natural packing density of each compared to what was obtained in Examples 1-9.

The amount of water in the mixtures was varied as follows in order to determine the extrudability of the mixture at varying levels of water deficiency:

| Example | Water | % Deficient |
|---|---|---|
| 37 | 2.4 kg | (56.53%) |
| 38 | 2.2 kg | (43.49%) |
| 39 | 2.0 kg | (30.44%) |
| 40 | 1.8 kg | (17.40%) |
| 41 | 1.6 kg | (4.35%) |
| 42 | 1.4 kg | 8.69% |
| 43 | 1.2 kg | 21.73% |
| 44 | 1.0 kg | 34.78% |
| 45 | 0.9 kg | 41.30% |
| 46 | 0.8 kg | 47.82% |
| 47 | 0.7 kg | 54.34% |
| 48 | 0.6 kg | 60.87% |
| 49 | 0.5 kg | 67.39% |
| 50 | 0.4 kg | 73.91% |
| 51 | 0.3 kg | 80.43% |
| 52 | 0.2 kg | 86.96% |
| 53 | 0.1 kg | 93.48% |

In Examples 37-41, the number in parentheses under the heading "% Deficient" indicates the amount of excess water that was used. As above, these mixtures were "very fluid" and could not be extruded with sufficient form-stability so that an extruded object would maintain its shape without external support. The mixtures of Examples 42-50 were able to be extruded into a variety of form-stable articles as above, including honeycomb structures, bars, and window frames. Because of the higher particle packing efficiencies of the mixtures of Examples 37-53 compared to those of Examples 1-9, holding the water constant resulted in mixtures having decreased water deficiency and, hence, greater flowability and lower viscosity.

As the amount of water deficiency increased, pipes of increasingly thinner walls could be extruded. In addition, the final hardened extruded articles had higher strength compared to the articles extruded from the mixtures having a lower particle packing density, which comports with the Strength Equation.

However, as the amount of water fell below 0.4 kg and the water deficiency increased to above about 75%, the mixtures could not be extruded using the equipment available, although it is believed that using a higher pressure extruder would make it possible, though less practical, to extrude such mixtures. Therefore, the mixtures in Examples 51-53 could not be extruded.

From these examples it can be seen that increasing the packing density of the solid particles while keeping the amount of added water constant results in a mixture having less water deficiency. This allows for the extrusion of a higher packed mixture at a lower pressure for the same amount of water.

EXAMPLES 54-67

The hydraulically settable mixtures of Examples 40-53 are repeated except that silica sand having particle sizes in the range of about 60-120 microns is used. The resulting particle packing density of the resulting sand and cement mixture is about 0.75. Keeping the amount of added water constant according to Examples 40-53 yields mixtures having the following amounts of water deficiency:

| Example | Water | % Deficient |
|---|---|---|
| 54 | 1.8 kg | (50.94%) |
| 55 | 1.6 kg | (34.17%) |
| 56 | 1.4 kg | (17.40%) |
| 57 | 1.2 kg | (0.63%) |
| 58 | 1.0 kg | 16.14% |
| 59 | 0.9 kg | 24.53% |
| 60 | 0.8 kg | 32.91% |
| 61 | 0.7 kg | 41.30% |
| 62 | 0.6 kg | 49.69% |

| Example | Water | % Deficient |
|---|---|---|
| 63 | 0.5 kg | 58.07% |
| 64 | 0.4 kg | 66.46% |
| 65 | 0.3 kg | 74.84% |
| 66 | 0.2 kg | 83.23% |
| 67 | 0.1 kg | 91.61% |

As above, keeping the amount of water constant while increasing the particle packing density yields a hydraulically settable mixture that can be extruded at lower extrusion pressures. In addition, the final hardened extruded article has higher strength according to the Strength Equation. However, the mixtures of Examples 54–57 lack form-stability after being extruded, while the mixtures of Examples 58–65 can be extruded into a number of articles, including those listed above. Finally, the mixtures of Examples 66 and 67 are too dry and viscous to be extruded using the equipment available.

EXAMPLES 68–79

The hydraulically settable mixtures obtained in Examples 25–36 are altered by decreasing the amount of fine silica sand to 4 kg and adding 2 kg of precipitated calcium carbonate having an average particle size of about 1 micron. This results in a hydraulically settable mixture having a particle packing density of about 0.8. The resulting water deficiencies for a given amount of water are as follows:

| Example | Water | % Deficient |
|---|---|---|
| 68 | 1.4 kg | (56.53%) |
| 69 | 1.2 kg | (34.17%) |
| 70 | 1.0 kg | (11.81%) |
| 71 | 0.9 kg | (0.63%) |
| 72 | 0.8 kg | 10.55% |
| 73 | 0.7 kg | 21.73% |
| 74 | 0.6 kg | 32.91% |
| 75 | 0.5 kg | 44.10% |
| 76 | 0.4 kg | 55.28% |
| 77 | 0.3 kg | 66.46% |
| 78 | 0.2 kg | 77.64% |
| 79 | 0.1 kg | 88.82% |

As above, keeping the amount of water constant while increasing the particle packing density yields a hydraulically settable mixture that can be extruded at lower extrusion pressures. In addition, the final hardened extruded article has higher strength, according to the Strength Equation.

EXAMPLES 80–89

The hydraulically settable mixtures obtained in Examples 44–53 are altered by decreasing the amount of silica sand to 4 kg and adding 2 kg of precipitated calcium carbonate having an average particle size of about 1 micron. This results in a hydraulically settable mixture having a particle packing density of about 0.85. The resulting water deficiencies for a given amount of water are as follows:

| Example | Water | % Deficient |
|---|---|---|
| 80 | 1.0 kg | (58.40%) |
| 81 | 0.9 kg | (42.56%) |
| 82 | 0.8 kg | (26.72%) |
| 83 | 0.7 kg | (10.88%) |
| 84 | 0.6 kg | 4.96% |
| 85 | 0.5 kg | 20.80% |
| 86 | 0.4 kg | 36.64% |
| 87 | 0.3 kg | 52.48% |
| 88 | 0.2 kg | 68.32% |
| 89 | 0.1 kg | 84.16% |

As above, keeping the amount of water constant while increasing the particle packing density yields a hydraulically settable mixture that can be extruded at lower extrusion pressures. In addition, the final hardened extruded article has higher strength, according to the Strength Equation.

EXAMPLES 90–95

The hydraulically settable mixtures obtained in Examples 62–67 are altered by decreasing the amount of silica sand to 4 kg and adding 2 kg of precipitated calcium carbonate having an average particle size of about 1 micron. This results in a hydraulically settable mixture having a particle packing density of about 0.9. The resulting water deficiencies for a given amount of water are as follows:

| Example | Water | % Deficient |
|---|---|---|
| 90 | 0.6 kg | (46.06%) |
| 91 | 0.5 kg | (21.71%) |
| 92 | 0.4 kg | 2.63% |
| 93 | 0.3 kg | 26.97% |
| 94 | 0.2 kg | 51.31% |
| 95 | 0.1 kg | 75.66% |

As above, keeping the amount of water constant while increasing the particle packing density yields a hydraulically settable mixture that can be extruded at lower extrusion pressures. In addition, the final hardened extruded article has higher strength according to the Strength Equation.

EXAMPLE 96

The procedures of Examples 1–9 are repeated, except that the average particle size is decreased while maintaining the same level of particle packing density and water deficiency. The resulting hydraulically settable mixtures exhibit greater pseudo-plastic behavior. In other words, the apparent viscosities of the mixtures having a lower average particle size decreases for a given shear rate, while the yield stress increases. This results in mixtures which may be extruded under lower pressure while exhibiting greater form stability.

EXAMPLE 97

The procedures of Examples 90–95 are repeated, except that the extruded articles are cured by autoclaving at 400° C. and 24 bars of pressure for 12 hours. The final cured articles have compressive strength of about 800 MPa and a tensile strength of about 100 MPa.

EXAMPLE 98

The procedures of Examples 1–9 are repeated, except that 25 g of Tylose® 4000 are added as lubricant. The resulting hydraulically settable mixtures have greater flowability and result in extruded articles having a better surface finish. The strength properties remain approximately the same.

EXAMPLE 99

The procedures of Examples 1–9 are repeated, except that 25 g of calcium or magnesium stearate are added as lubricant. The resulting hydraulically settable mixtures have greater flowability and result in extruded articles having a better surface finish. The strength properties remain approximately the same.

EXAMPLE 100

The procedures of Examples 1–9 are repeated, except that 25 g of polyethylene glycol having an average molecular weight of about 35,000 are added as lubricant. The resulting hydraulically settable mixtures have greater flowability and result in extruded articles having a better surface finish. The strength properties remain approximately the same.

EXAMPLE 101

An extrudable hydraulically settable mixture is formed using the following components:

| Fly ash | 90 g |
| Portland Cement | 10 g |
| NaOH | 10 g |
| Water | 20 g |

The sodium hydroxide raises the pH of the aqueous phase of the hydraulically settable mixture to about 14, which activates the fly ash so that it behaves as a hydraulically settable binder. Portland cement is added in order to increase the compressive strength of the final cured product to about 20 MPa and the tensile strength to about 105 MPa. Because of the low cost of fly ash, the mixture of this example is less expensive than those containing higher levels of portland cement and conventional aggregates. Of course, where lower strengths are acceptable, the portland cement may be further reduced or eliminated altogether.

EXAMPLE 102

An extrudable hydraulically settable mixture is formed using the following components:

| Portland White Cement | 4.0 kg |
| Fine Sand | 6.0 kg |
| Water | 1.5 kg |
| Tylose ® FL 15002 | 200 g |

The hydraulically settable mixture is formed by mixing the ingredients together for 10 minutes using a high speed mixer to obtain a very homogeneous mixture. Thereafter, the mixture is extruded into a variety of multi-cell structures, including "honeycomb" structures, which have very high compressive strength, particularly in light of the open cell nature of the extruded object.

Because of the multi-cell structure, the cured material is much more lightweight than comparable solid extruded objects made from the same hydraulically settable mixtures. The block density of the multi-cell structures is only 1.02 g/cm$^3$. Moreover, the cured materials have a compressive strength of about 75 MPa and a tensile strength of about 28 MPa. Depending upon the amount of space within the multi-cell structure, the block density can easily range anywhere from between about 0.5 g/cm$^3$ to about 1.6 g/cm$^3$.

EXAMPLES 103–105

Extrudable hydraulically settable mixtures are formed according to Example 102, except that abaca fiber is added to the mixtures in varying amounts as follows (measured by volume):

| Example | Abaca Fiber |
| --- | --- |
| 103 | 1% |
| 104 | 2% |
| 105 | 3% |

The resulting extruded multi-cell structures have greater strengths, both in the green state and after they are cured, than the structures of Example 102. Moreover, the multi-cell structures formed in these examples are more ductile and less brittle, particularly as more fiber is added to the hydraulically settable mixture.

EXAMPLES 106–108

Extrudable hydraulically settable mixtures are formed according to Example 102, except that glass fiber is added to the mixtures in varying amounts as follows (measured by volume):

| Example | Glass Fiber |
| --- | --- |
| 106 | 1% |
| 107 | 2% |
| 108 | 3% |

The resulting extruded multi-cell structures have greater strengths, both in the green state and after they are cured, than the structures of Example 102. Moreover, the multi-cell structures formed in these examples are more ductile and less brittle, particularly as more fiber is added to the hydraulically settable mixture.

The following examples demonstrate how the strength of an extruded hydraulically settable mixture increases or decreases as the following variables are varied: particle packing density, water to cement ratio, and amount of cement as a percentage of the solids content of the mixture.

EXAMPLES 109–114

Extrudable hydraulically settable mixtures are formed which have 1.0 kg portland cement and 6.0 kg sand. In each mixture the portland cement comprises 14.3% by weight of the dry mixture. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

As will be shown, the compressive strength of a hydraulically settable mixture having a constant weight percentage of portland cement and sand increases if either (1) the particle packing density is increased while maintaining a constant level of water deficiency or (2) the level of water deficiency is increased while maintaining a constant packing density. The amount of water is expressed in kg, while the compressive strength is expressed in MPa. The phrase "W/C Ratio" is shorthand for water to cement ratio.

| Example | Packing Density | Water | W/C Ratio | Strength |
|---|---|---|---|---|
| 109 | 0.65 | 0.71 | 0.71 | 24 |
| 110 | 0.70 | 0.56 | 0.56 | 33 |
| 111 | 0.75 | 0.44 | 0.44 | 47 |
| 112 | 0.80 | 0.33 | 0.33 | 69 |
| 113 | 0.85 | 0.23 | 0.23 | 103 |
| 114 | 0.90 | 0.15 | 0.15 | 160 |

Figure 8A:
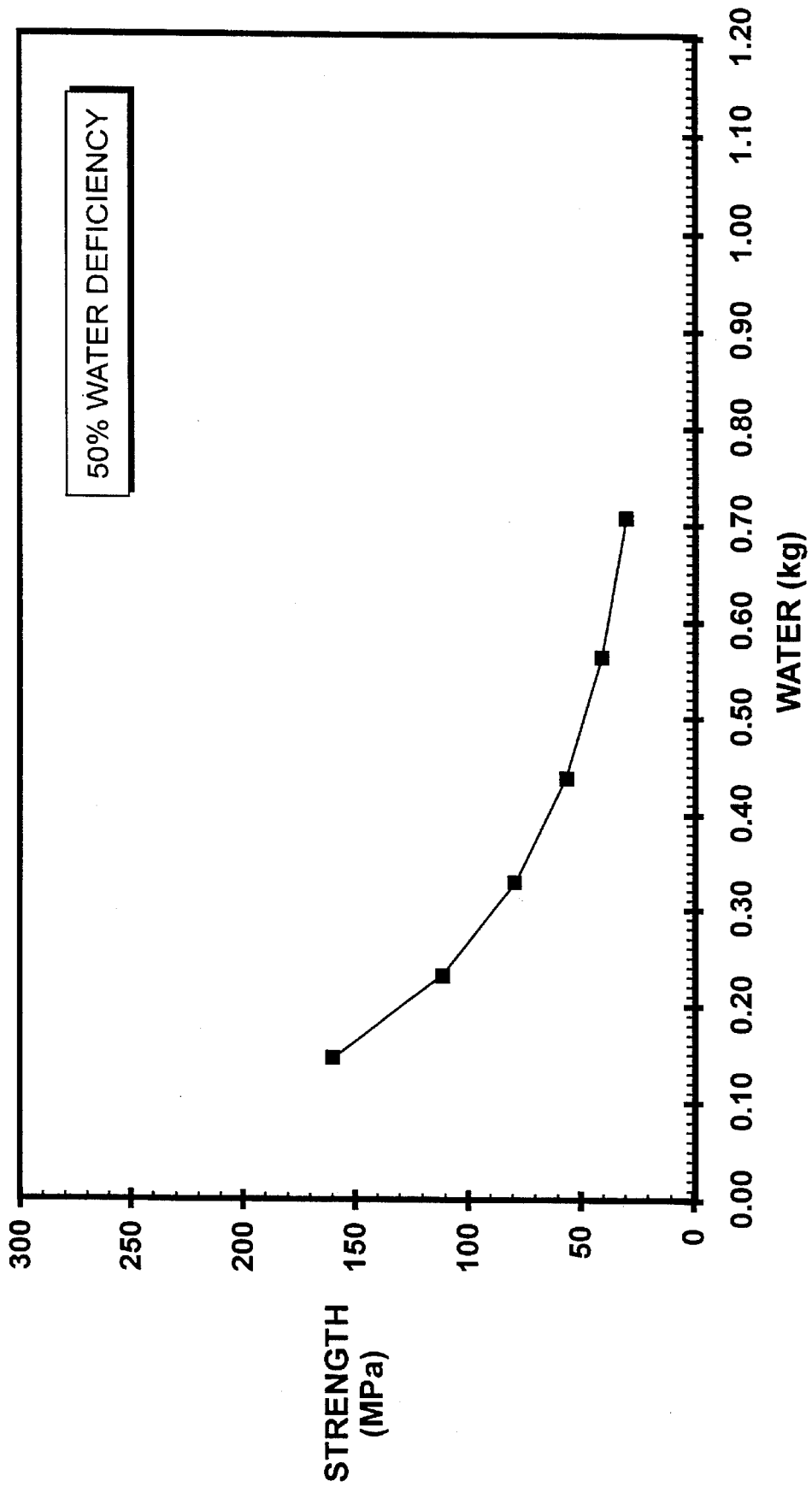
FIGS. 8A–8E show graphs illustrating the relationship between strength, particle packing density, and water content of hydraulically settable mixtures that have 14.3% portland cement, 85.7% aggregate, and varying water deficiencies.

These examples clearly demonstrate that the strength of an extruded article will greatly increase as the particle packing density is increased, even while the absolute level of cement and sand are held constant. This correlates to the Strength Equation because as the particle packing density is increased both the amount of air and water within the mixture are decreased. However, because the amount of water deficiency is held constant, the mixtures have similar levels of workability and may be extruded using similar extrusion pressures. The strengths of the different compositions as a function of particle packing are plotted and illustrated by the graph of FIG. 8A.

EXAMPLES 115–120

The compositions of Examples 109–114 are substantially repeated except that the amount of water is reduced in each example in order to yield a water deficiency of 60%.

| Example | Packing Density | Water | W/C Ratio | Strength |
|---|---|---|---|---|
| 115 | 0.65 | 0.57 | 0.57 | 31 |
| 116 | 0.70 | 0.45 | 0.45 | 43 |
| 117 | 0.75 | 0.35 | 0.35 | 59 |
| 118 | 0.80 | 0.26 | 0.26 | 84 |
| 119 | 0.85 | 0.19 | 0.19 | 121 |
| 120 | 0.90 | 0.12 | 0.12 | 182 |

Figure 8B:
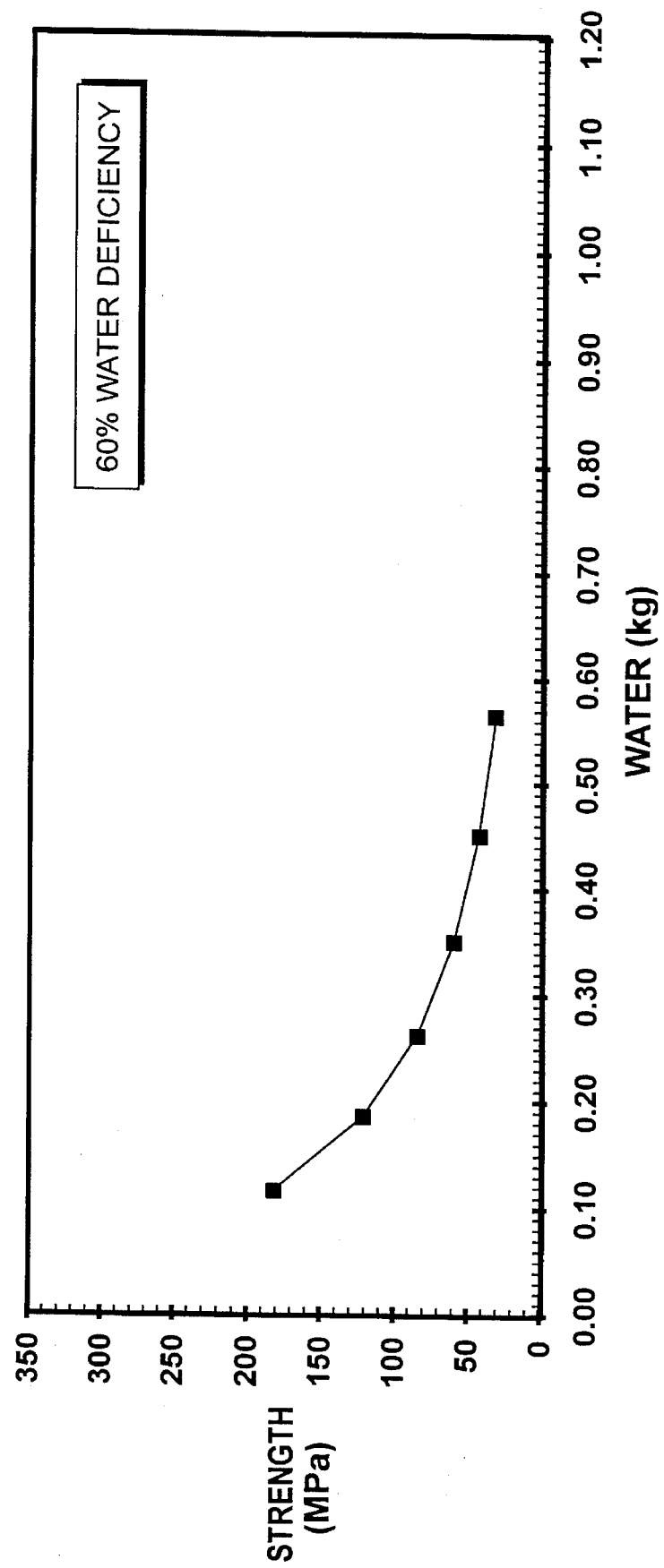

The strengths of the different compositions as a function of particle packing are plotted and illustrated by the graph of FIG. 8B.

EXAMPLES 121–126

The compositions of Examples 109–114 are substantially repeated except that the amount of water is reduced in each example in order to yield a water deficiency of 70%.

| Example | Packing Density | Water | W/C Ratio | Strength |
|---|---|---|---|---|
| 121 | 0.65 | 0.42 | 0.42 | 42 |
| 122 | 0.70 | 0.34 | 0.34 | 57 |
| 123 | 0.75 | 0.26 | 0.26 | 76 |
| 124 | 0.80 | 0.20 | 0.20 | 105 |
| 125 | 0.85 | 0.14 | 0.14 | 146 |
| 126 | 0.90 | 0.09 | 0.09 | 209 |

Figure 8C:
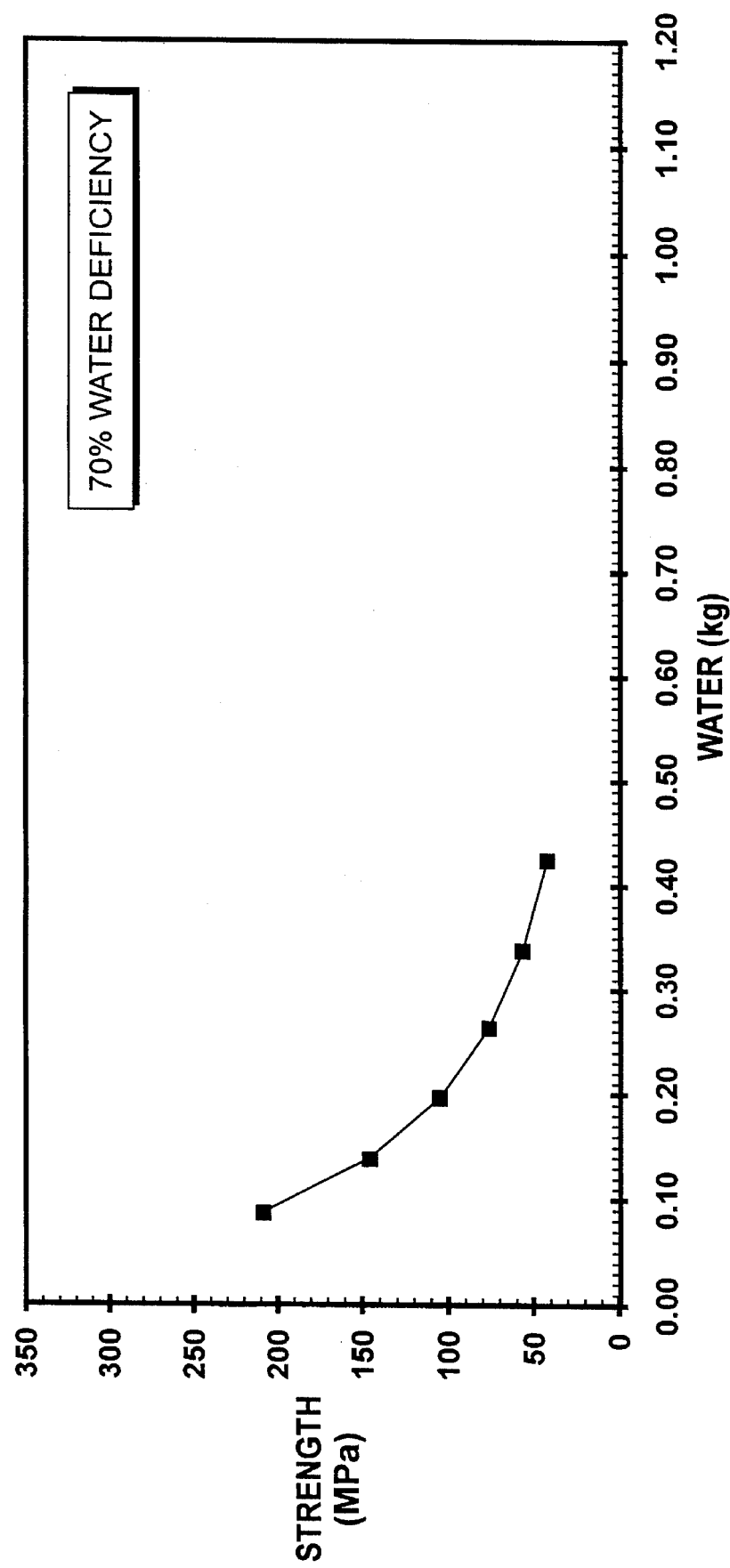

The strengths of the different compositions as a function of particle packing are plotted and illustrated by the graph of FIG. 8C.

EXAMPLES 127–132

The compositions of Examples 109–114 are substantially repeated except that the amount of water is reduced in each example in order to yield a water deficiency of 80%.

| Example | Packing Density | Water | W/C Ratio | Strength |
|---|---|---|---|---|
| 127 | 0.65 | 0.28 | 0.28 | 60 |
| 128 | 0.70 | 0.23 | 0.23 | 78 |
| 129 | 0.75 | 0.18 | 0.18 | 102 |
| 130 | 0.80 | 0.13 | 0.13 | 134 |
| 131 | 0.85 | 0.09 | 0.09 | 179 |
| 132 | 0.90 | 0.06 | 0.06 | 243 |

Figure 8D:
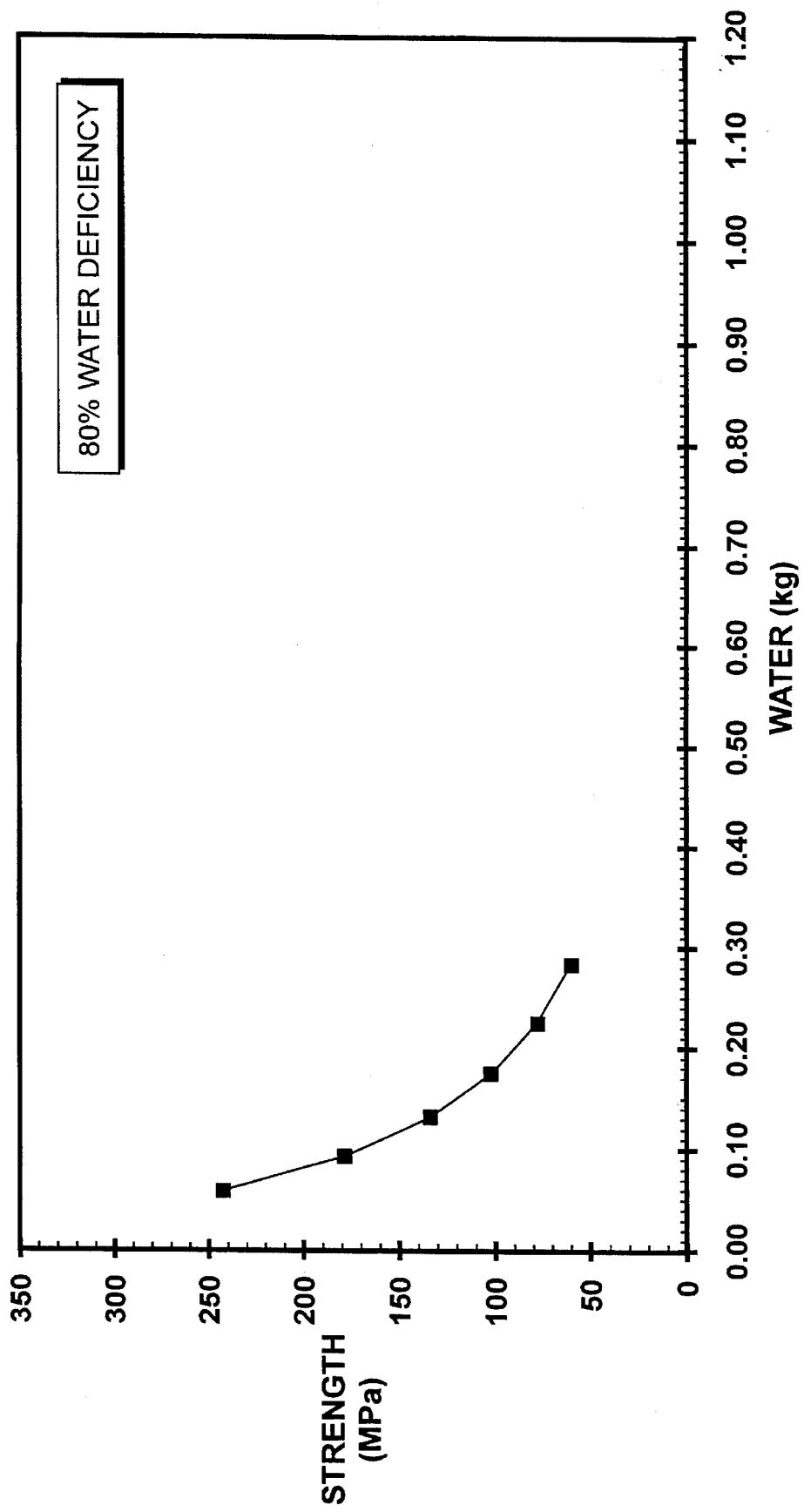

The strengths of the different compositions as a function of particle packing are plotted and illustrated by the graph of FIG. 8D.

EXAMPLES 133–138

The compositions of Examples 109–114 are substantially repeated except that the amount of water is reduced in each example in order to yield a water deficiency of 90%.

| Example | Packing Density | Water | W/C Ratio | Strength |
|---|---|---|---|---|
| 133 | 0.65 | 0.14 | 0.14 | 94 |
| 134 | 0.70 | 0.11 | 0.11 | 116 |
| 135 | 0.75 | 0.09 | 0.09 | 143 |
| 136 | 0.80 | 0.07 | 0.07 | 179 |
| 137 | 0.85 | 0.05 | 0.05 | 224 |
| 138 | 0.90 | 0.03 | 0.03 | 285 |

Figure 8E:
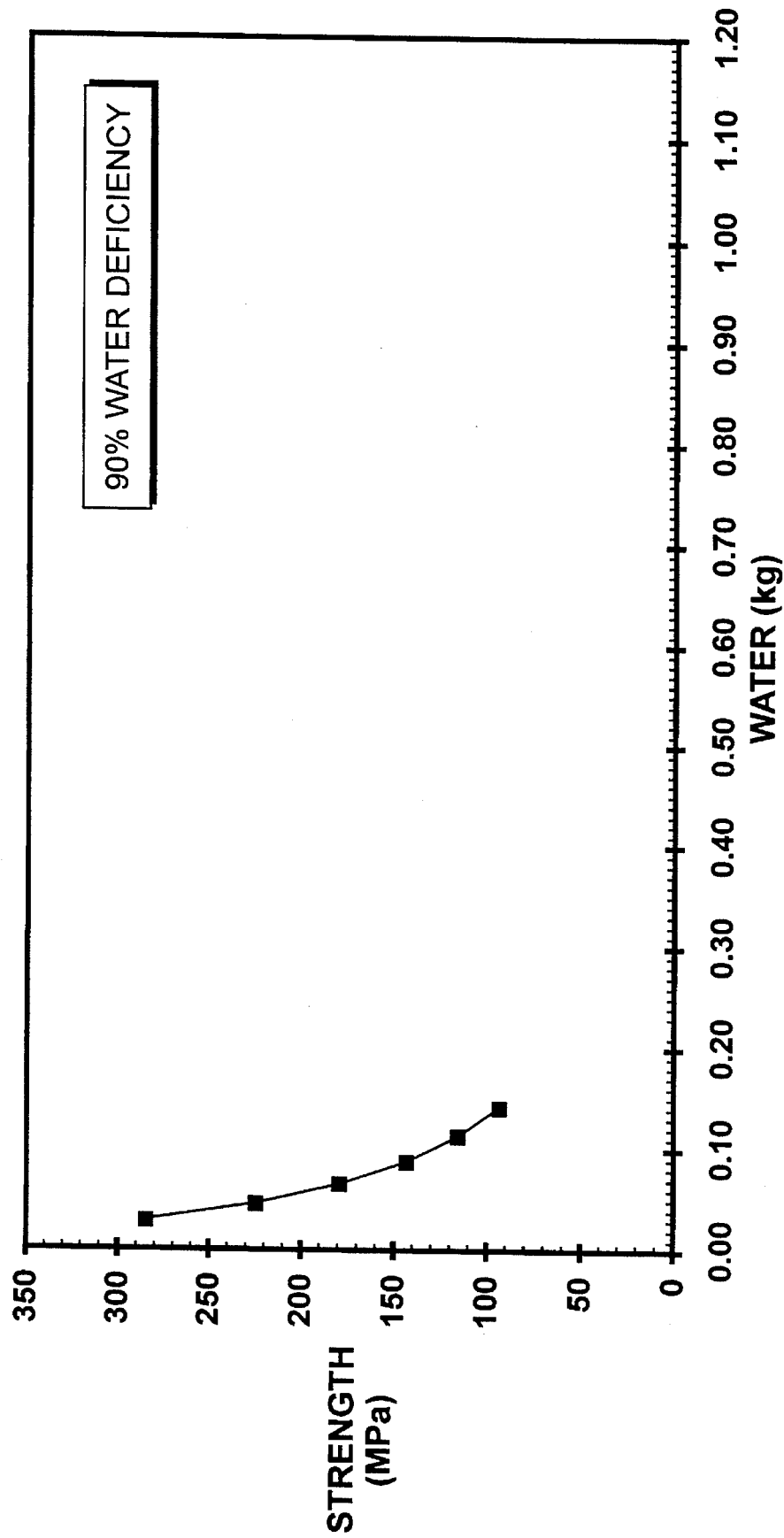

The strengths of the different compositions as a function of particle packing are plotted and illustrated by the graph of FIG. 8E. Superimposing the curves of FIGS. 8A–8E yields substantially one continuous curve, which demonstrates the close relationship between strength and the absolute level of water within the hydraulically settable mixture. This clearly demonstrates that in order to simultaneously achieve high strength and high workability in a given mixture, it is advantageous to increase the particle packing density rather than increase the level of water in order to increase the flowability of the mixture under pressure.

The next set of examples is substantially similar to Examples 109–138, except that the amount of portland cement is increased to 25% by weight of the dry mixtures. The purpose of these examples is to demonstrate that only modest increases of strength are attained by increasing the amount of hydraulically settable binder, while the most dramatic increases in strength are achieved by increasing the particle packing density and decreasing the amount of water within the mixtures.

EXAMPLES 139–144

Extrudable hydraulically settable mixtures are formed which have 2.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 139 | 0.65 | 0.79 | 0.40 | 52 |
| 140 | 0.70 | 0.63 | 0.32 | 69 |
| 141 | 0.75 | 0.49 | 0.25 | 90 |
| 142 | 0.80 | 0.37 | 0.18 | 120 |
| 143 | 0.85 | 0.26 | 0.13 | 160 |
| 144 | 0.90 | 0.16 | 0.08 | 215 |

Figure 9A:
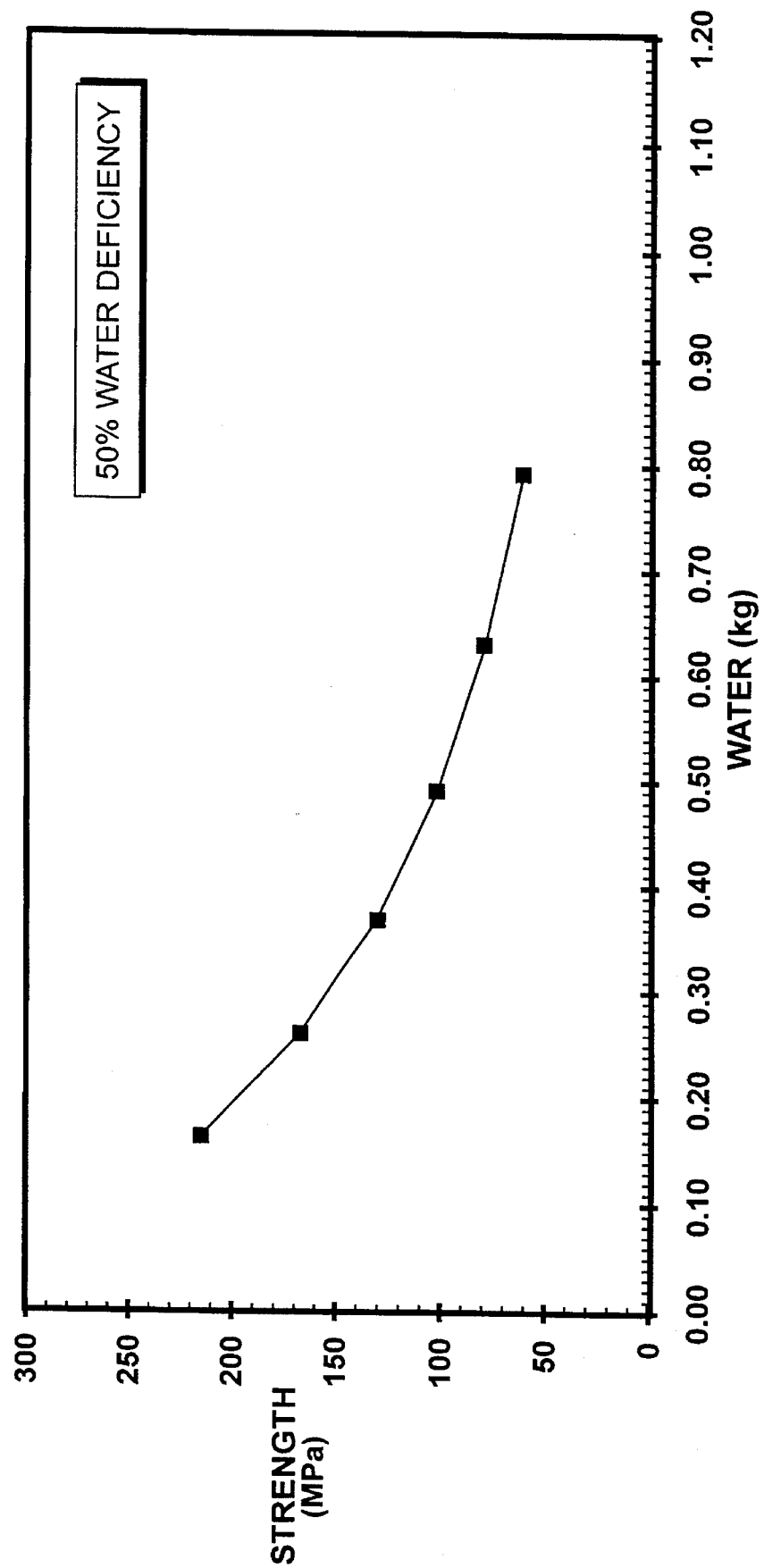
FIGS. 9A–9E show graphs illustrating the relationship between strength, particle packing density, and water content of hydraulically settable mixtures that have 25% portland cement, 75% aggregate, and varying water deficiencies.

The strengths of the different compositions as a function of particle packing are plotted and illustrated by the graph of FIG. 9A.

EXAMPLES 145–150

The compositions of Examples 138–139 are substantially repeated except that the amount of water is reduced in each example in order to yield a water deficiency of 60%.

| Example | Packing Density | Water | W/C Ratio | Strength |
|---------|-----------------|-------|-----------|----------|
| 145 | 0.65 | 0.63 | 0.32 | 65 |
| 146 | 0.70 | 0.50 | 0.25 | 83 |
| 147 | 0.75 | 0.39 | 0.20 | 107 |
| 148 | 0.80 | 0.29 | 0.15 | 138 |
| 149 | 0.85 | 0.21 | 0.10 | 179 |
| 150 | 0.90 | 0.13 | 0.07 | 234 |

Figure 9B:
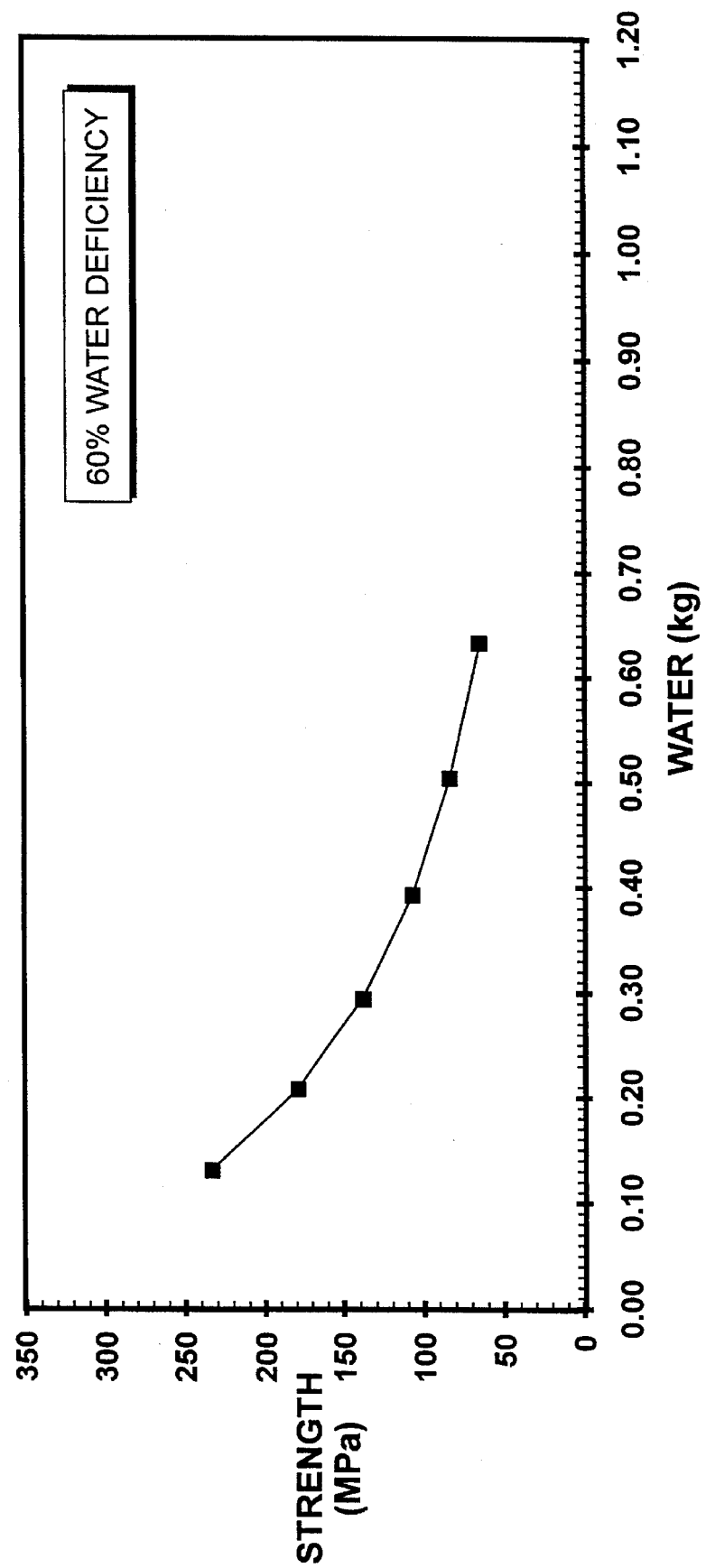

The strengths of the different compositions as a function of particle packing are plotted and illustrated by the graph of FIG. 9B.

EXAMPLES 151–156

The compositions of Examples 138–139 are substantially repeated except that the amount of water is reduced in each example in order to yield a water deficiency of 70%.

| Example | Packing Density | Water | W/C Ratio | Strength |
|---------|-----------------|-------|-----------|----------|
| 151 | 0.65 | 0.48 | 0.24 | 82 |
| 152 | 0.70 | 0.38 | 0.19 | 103 |
| 153 | 0.75 | 0.29 | 0.15 | 129 |
| 154 | 0.80 | 0.22 | 0.11 | 162 |
| 155 | 0.85 | 0.16 | 0.08 | 203 |
| 156 | 0.90 | 0.10 | 0.05 | 255 |

Figure 9C:
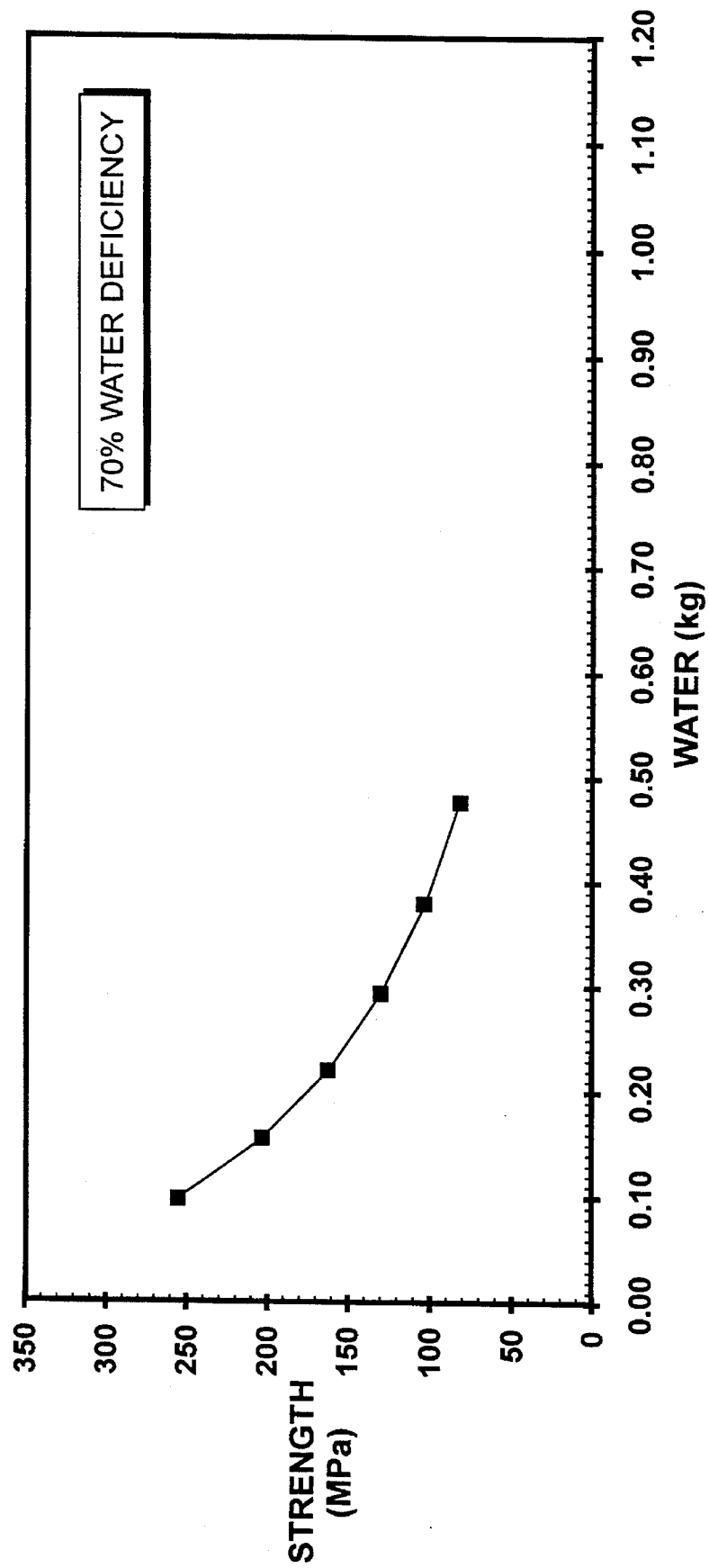

The strengths of the different compositions as a function of particle packing are plotted and illustrated by the graph of FIG. 9C.

EXAMPLES 157–162

The compositions of Examples 138–139 are substantially repeated except that the amount of water is reduced in each example in order to yield a water deficiency of 80%.

| Example | Packing Density | Water | W/C Ratio | Strength |
|---------|-----------------|-------|-----------|----------|
| 157 | 0.65 | 0.32 | 0.16 | 109 |
| 158 | 0.70 | 0.25 | 0.13 | 132 |
| 159 | 0.75 | 0.20 | 0.10 | 159 |
| 160 | 0.80 | 0.15 | 0.07 | 192 |
| 161 | 0.85 | 0.10 | 0.05 | 231 |
| 162 | 0.90 | 0.07 | 0.03 | 279 |

Figure 9D:
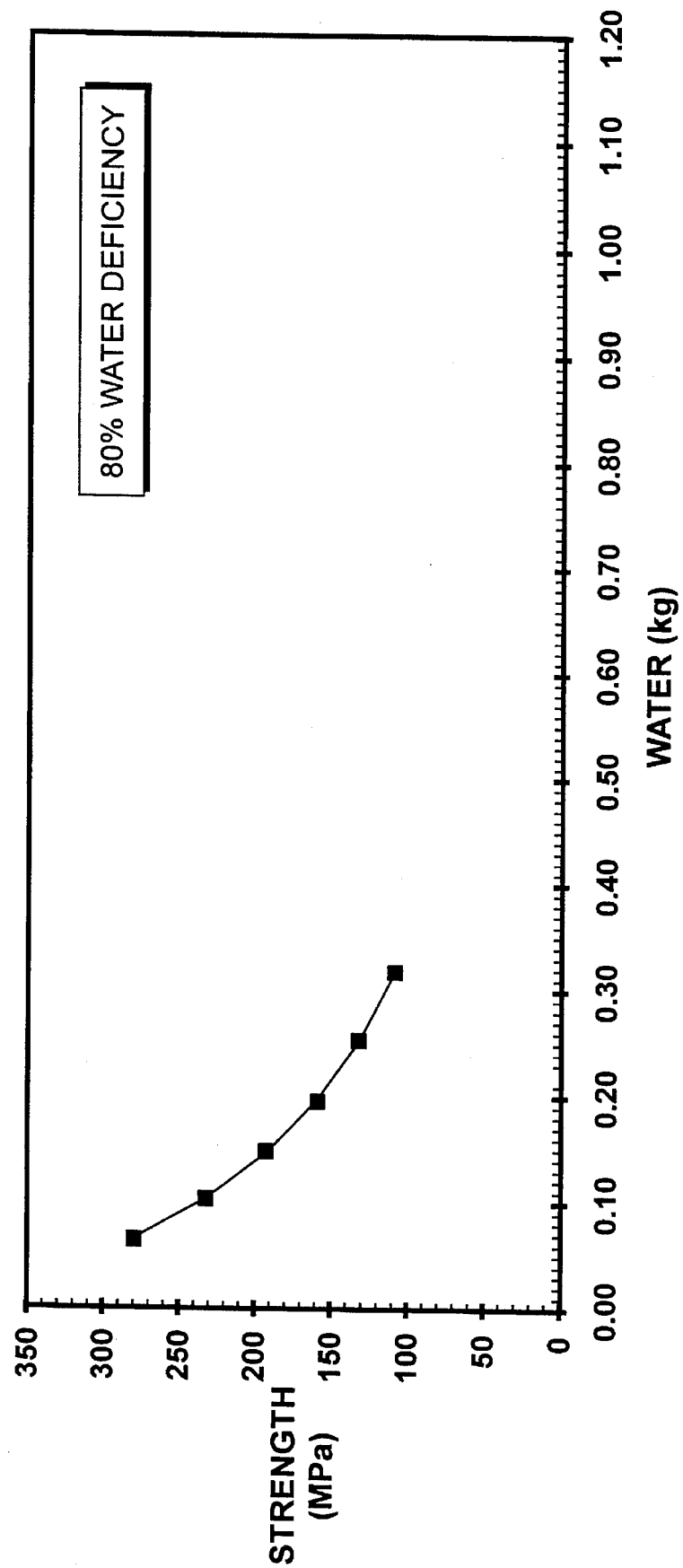

The strengths of the different compositions as a function of particle packing are plotted and illustrated by the graph of FIG. 9D.

EXAMPLES 163–168

The compositions of Examples 138–139 are substantially repeated except that the amount of water is reduced in each example in order to yield a water deficiency of 90%.

| Example | Packing Density | Water | W/C Ratio | Strength |
|---------|-----------------|-------|-----------|----------|
| 163 | 0.65 | 0.16 | 0.08 | 150 |
| 164 | 0.70 | 0.13 | 0.06 | 173 |
| 165 | 0.75 | 0.10 | 0.05 | 200 |
| 166 | 0.80 | 0.07 | 0.04 | 231 |
| 167 | 0.85 | 0.05 | 0.03 | 267 |
| 168 | 0.90 | 0.03 | 0.02 | 308 |

Figure 9E:
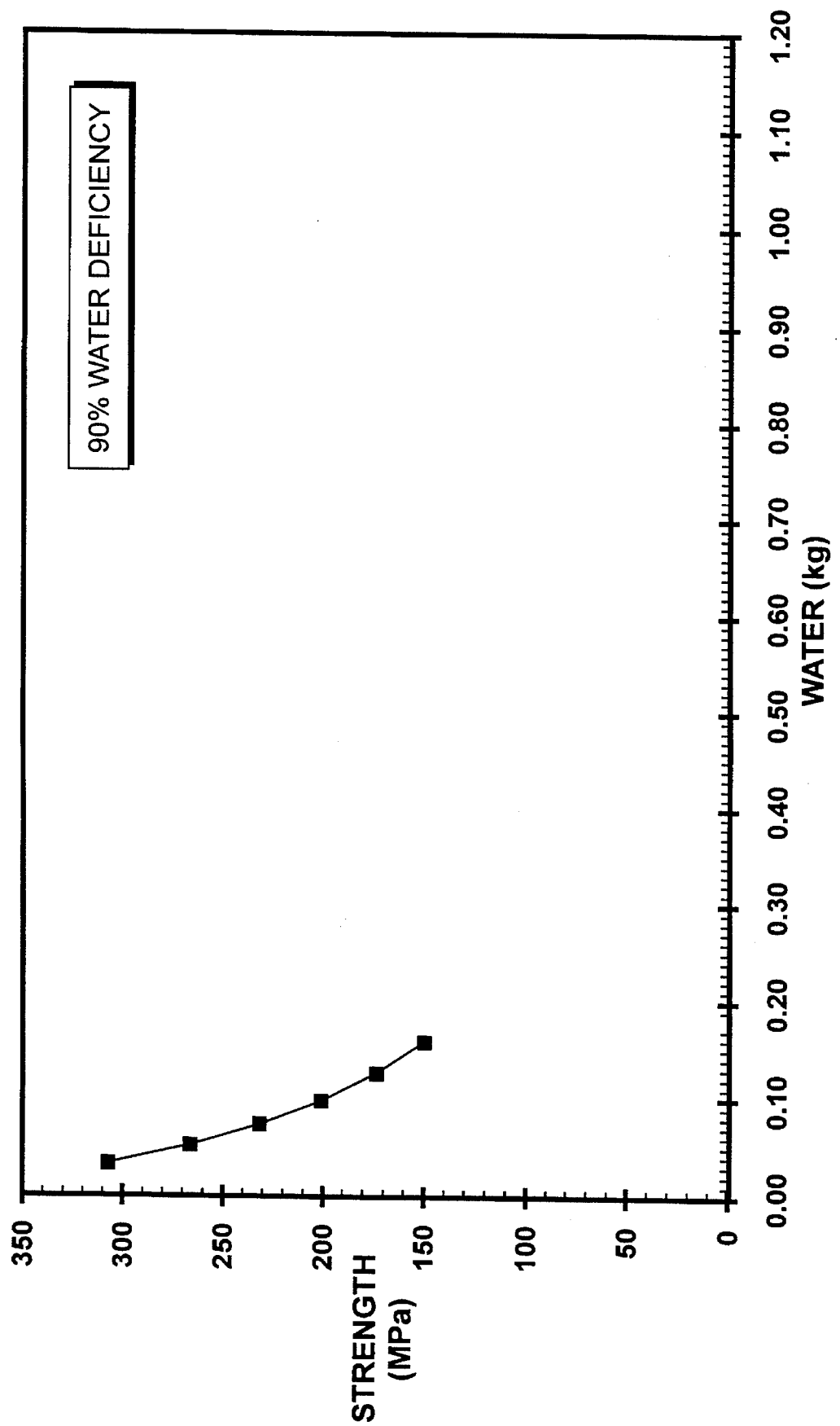

The strengths of the different compositions as a function of particle packing are plotted and illustrated by the graph of FIG. 9E. Superimposing the curves of FIGS. 9A–9E yields substantially one continuous curve, which demonstrates the close relationship between strength and the absolute level of water within the hydraulically settable mixture. Although increasing the amount of portland cement within the mixtures of Examples 139–168 causes an increase in the overall strength of the mixtures, the increase is less dramatic than increasing the particle packing density and decreasing the level of water within the mixtures.

The next set of examples is substantially similar to Examples 139–168, except that the amount of portland cement is increased to 33% by weight of the dry mixtures.

EXAMPLES 169–174

Extrudable hydraulically settable mixtures are formed which have 3.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---------|-----------------|-------|-----------|----------|
| 169 | 0.65 | 0.88 | 0.29 | 74 |
| 170 | 0.70 | 0.70 | 0.23 | 94 |
| 171 | 0.75 | 0.54 | 0.18 | 118 |
| 172 | 0.80 | 0.41 | 0.14 | 150 |
| 173 | 0.85 | 0.29 | 0.10 | 189 |
| 174 | 0.90 | 0.18 | 0.06 | 240 |

Figure 10A:
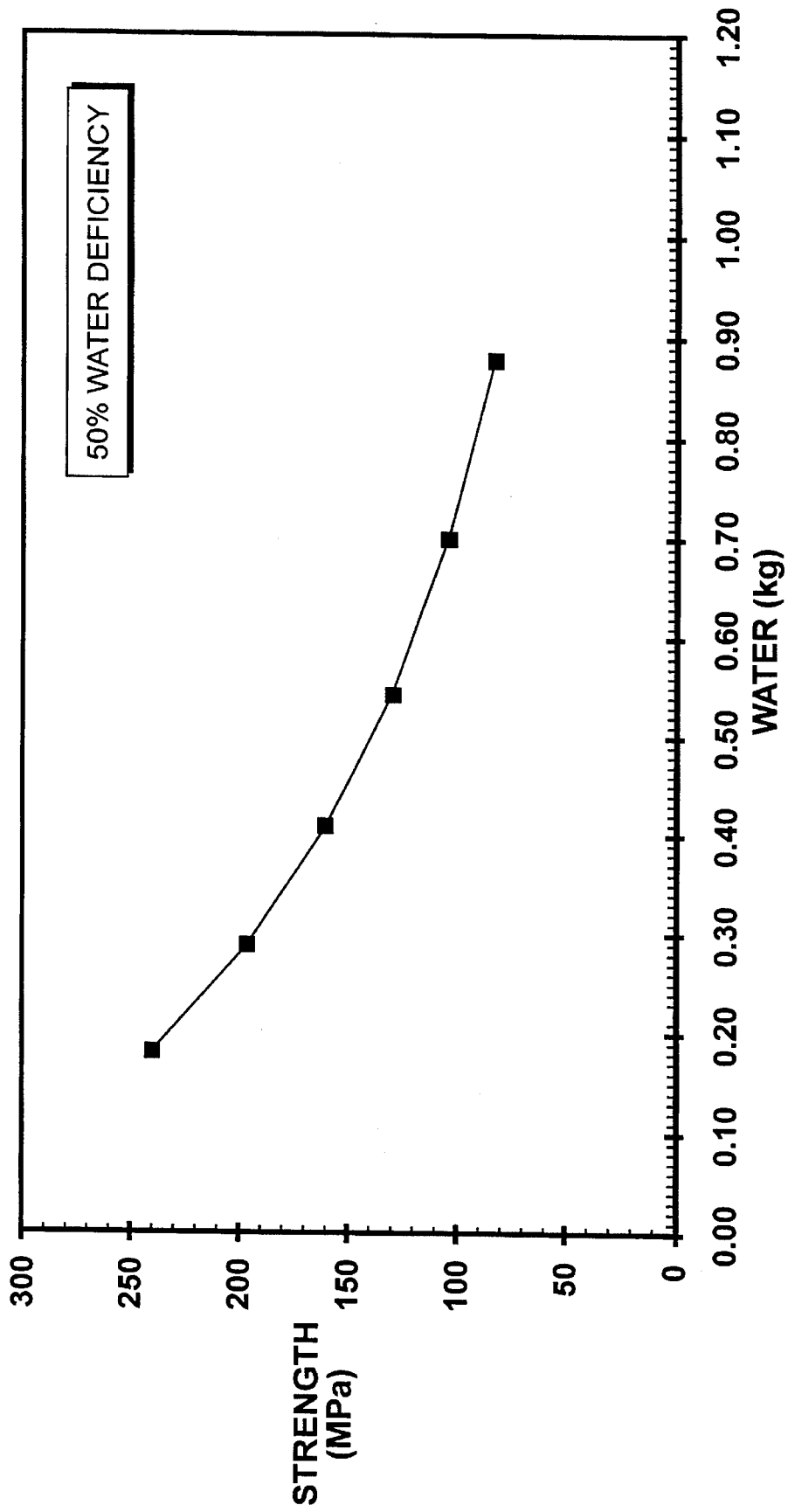
FIGS. 10A–10E show graphs illustrating the relationship between strength, particle packing density, and water content of hydraulically settable mixtures that have 33.3% portland cement, 66.7% aggregate, and varying water deficiencies.

The strengths of the different compositions as a function of particle packing are plotted and illustrated by the graph of FIG. 10A.

EXAMPLES 175–180

The compositions of Examples 169–174 are substantially repeated except that the amount of water is reduced in each example in order to yield a water deficiency of 60%.

| Example | Packing Density | Water | W/C Ratio | Strength |
|---------|-----------------|-------|-----------|----------|
| 175 | 0.65 | 0.70 | 0.23 | 89 |
| 176 | 0.70 | 0.56 | 0.19 | 111 |
| 177 | 0.75 | 0.43 | 0.14 | 137 |
| 178 | 0.80 | 0.33 | 0.11 | 169 |
| 179 | 0.85 | 0.23 | 0.08 | 208 |
| 180 | 0.90 | 0.14 | 0.05 | 256 |

Figure 10B:
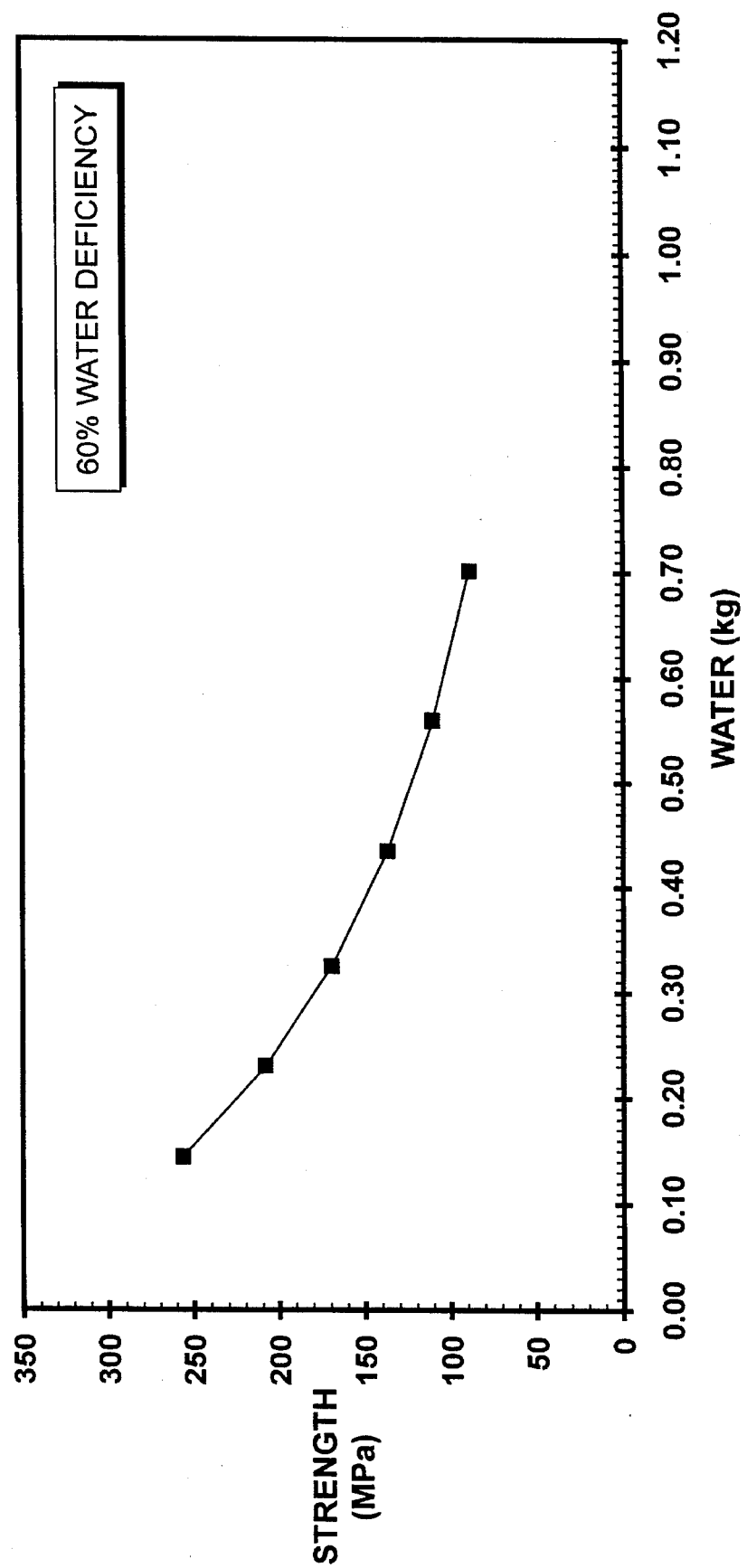

The strengths of the different compositions as a function of particle packing are plotted and illustrated by the graph of FIG. 10B.

EXAMPLES 181–186

The compositions of Examples 169–174 are substantially repeated except that the amount of water is reduced in each example in order to yield a water deficiency of 70%.

| Example | Packing Density | Water | W/C Ratio | Strength |
|---|---|---|---|---|
| 181 | 0.65 | 0.53 | 0.18 | 109 |
| 182 | 0.70 | 0.42 | 0.14 | 133 |
| 183 | 0.75 | 0.33 | 0.11 | 160 |
| 184 | 0.80 | 0.24 | 0.08 | 192 |
| 185 | 0.85 | 0.17 | 0.06 | 229 |
| 186 | 0.90 | 0.11 | 0.04 | 274 |

Figure 10C:
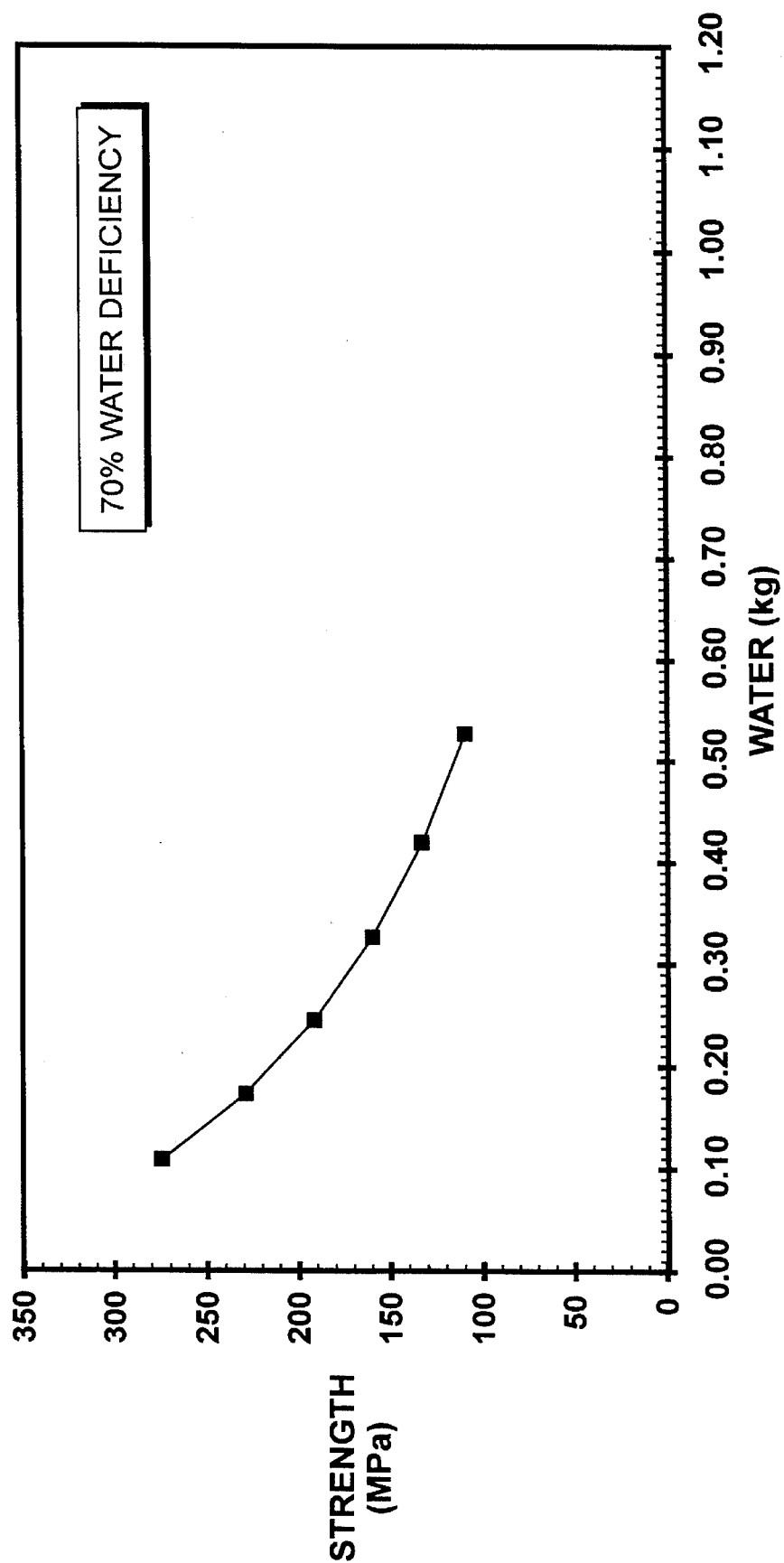

The strengths of the different compositions as a function of particle packing are plotted and illustrated by the graph of FIG. 10C.

EXAMPLES 187–192

The compositions of Examples 169–174 are substantially repeated except that the amount of water is reduced in each example in order to yield a water deficiency of 80%.

| Example | Packing Density | Water | W/C Ratio | Strength |
|---|---|---|---|---|
| 187 | 0.65 | 0.35 | 0.12 | 138 |
| 188 | 0.70 | 0.28 | 0.09 | 162 |
| 189 | 0.75 | 0.22 | 0.07 | 189 |
| 190 | 0.80 | 0.16 | 0.05 | 220 |
| 191 | 0.85 | 0.12 | 0.04 | 254 |
| 192 | 0.90 | 0.07 | 0.02 | 294 |

Figure 10D:
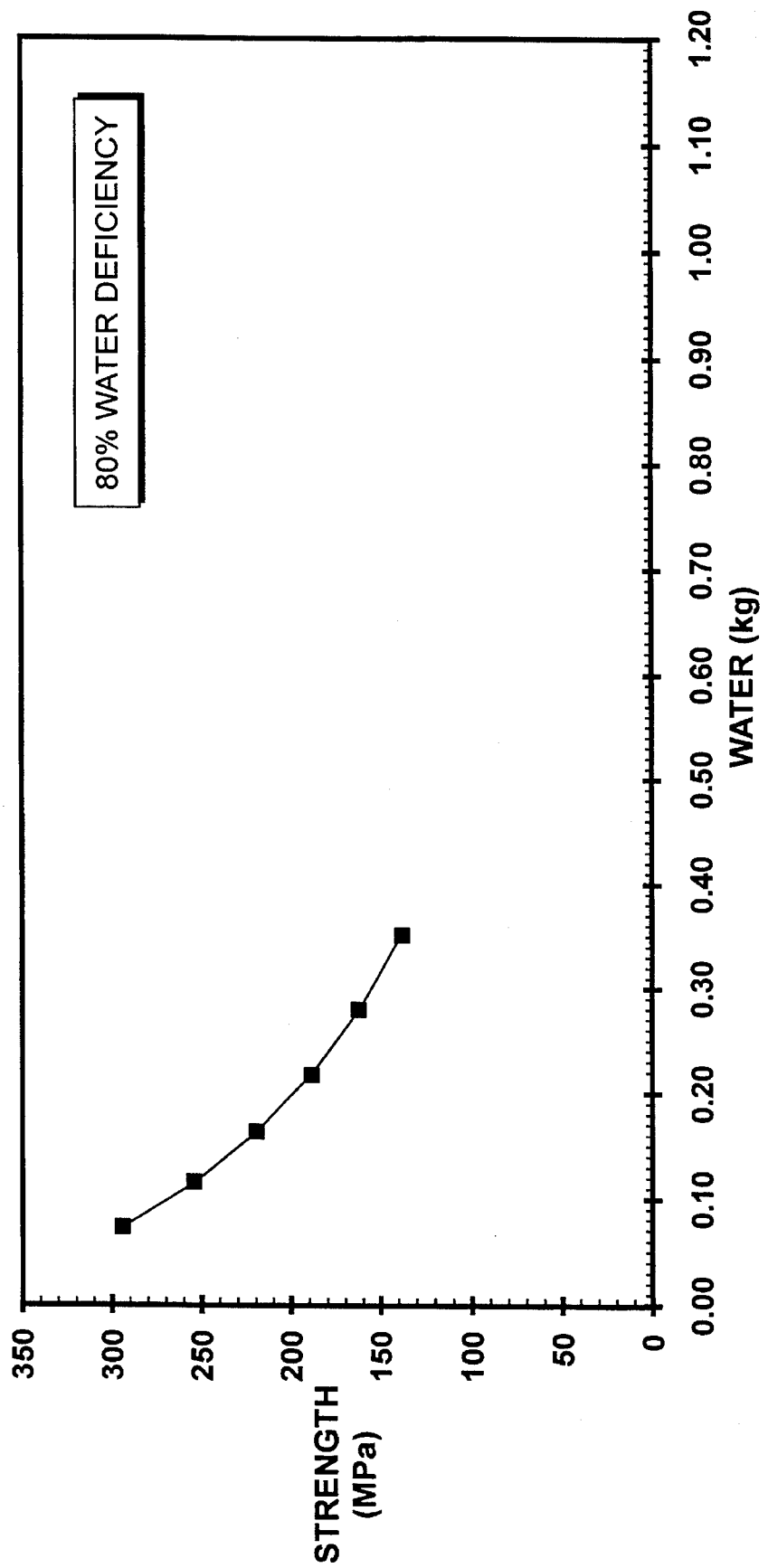

The strengths of the different compositions as a function of particle packing are plotted and illustrated by the graph of FIG. 10D.

EXAMPLES 193–198

The compositions of Examples 169–174 are substantially repeated except that the amount of water is reduced in each example in order to yield a water deficiency of 90%.

| Example | Packing Density | Water | W/C Ratio | Strength |
|---|---|---|---|---|
| 193 | 0.65 | 0.18 | 0.06 | 180 |
| 194 | 0.70 | 0.14 | 0.05 | 203 |
| 195 | 0.75 | 0.11 | 0.04 | 227 |
| 196 | 0.80 | 0.08 | 0.03 | 254 |
| 197 | 0.85 | 0.06 | 0.02 | 283 |
| 198 | 0.90 | 0.04 | 0.01 | 316 |

Figure 10E:
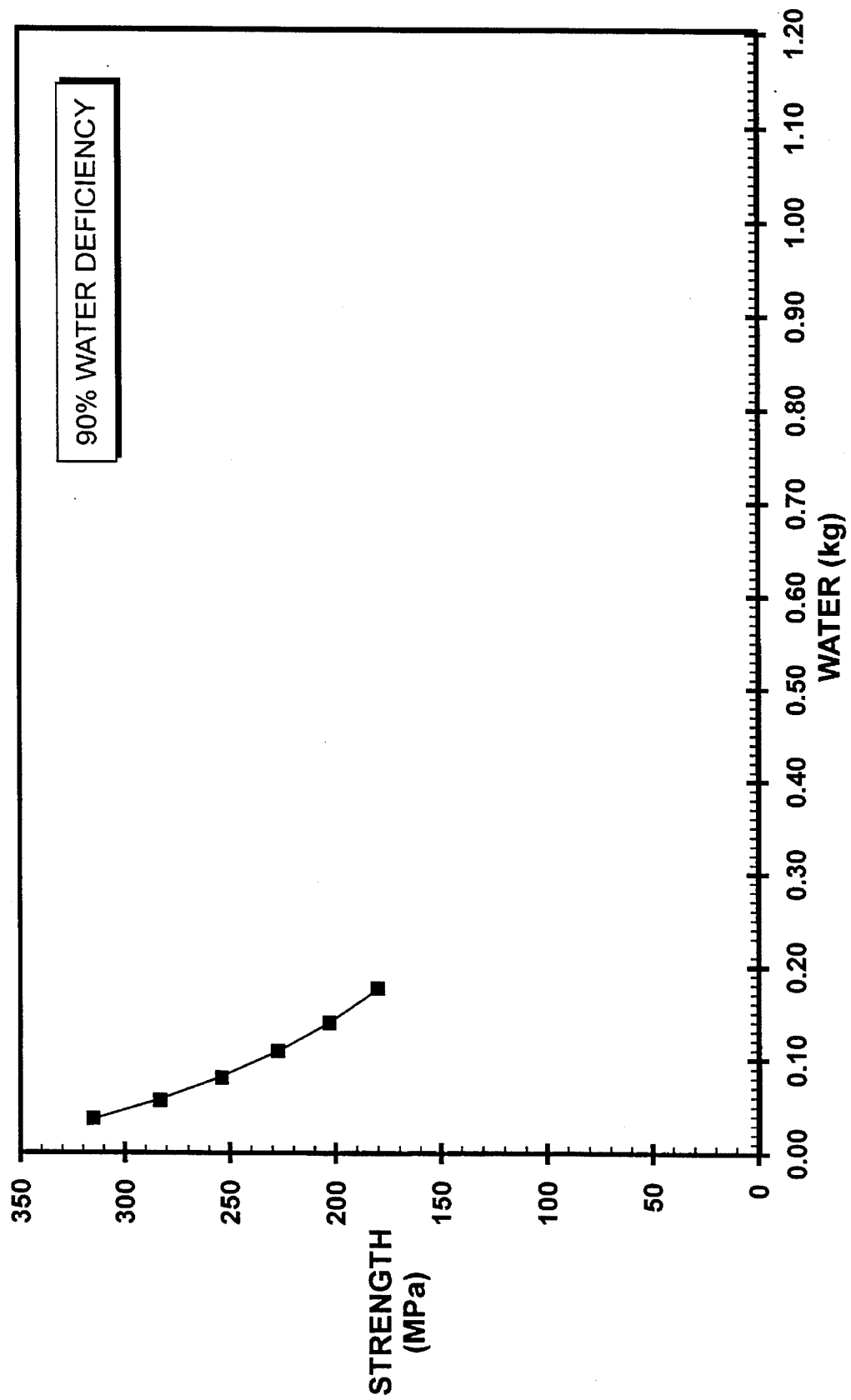

The strengths of the different compositions as a function of particle packing are plotted and illustrated by the graph of FIG. 10E. Superimposing the curves of FIGS. 10A–10E yields substantially one continuous curve, which demonstrates the close relationship between strength and the absolute level of water within the hydraulically settable mixture. Although increasing the amount of portland cement within the mixtures of Examples 169–198 causes an increase in the overall strength of the mixtures, the increase is less dramatic than increasing the particle packing density and decreasing the level of water within the mixtures.

The next set of examples is substantially similar to Examples 169–198, except that the amount of portland cement is increased to 40% by weight of the dry mixtures.

EXAMPLES 199–204

Extrudable hydraulically settable mixtures are formed which have 4.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 199 | 0.65 | 0.96 | 0.24 | 90 |
| 200 | 0.70 | 0.77 | 0.19 | 111 |
| 201 | 0.75 | 0.60 | 0.15 | 138 |
| 202 | 0.80 | 0.45 | 0.11 | 169 |
| 203 | 0.85 | 0.32 | 0.08 | 208 |
| 204 | 0.90 | 0.20 | 0.05 | 254 |

Figure 11A:
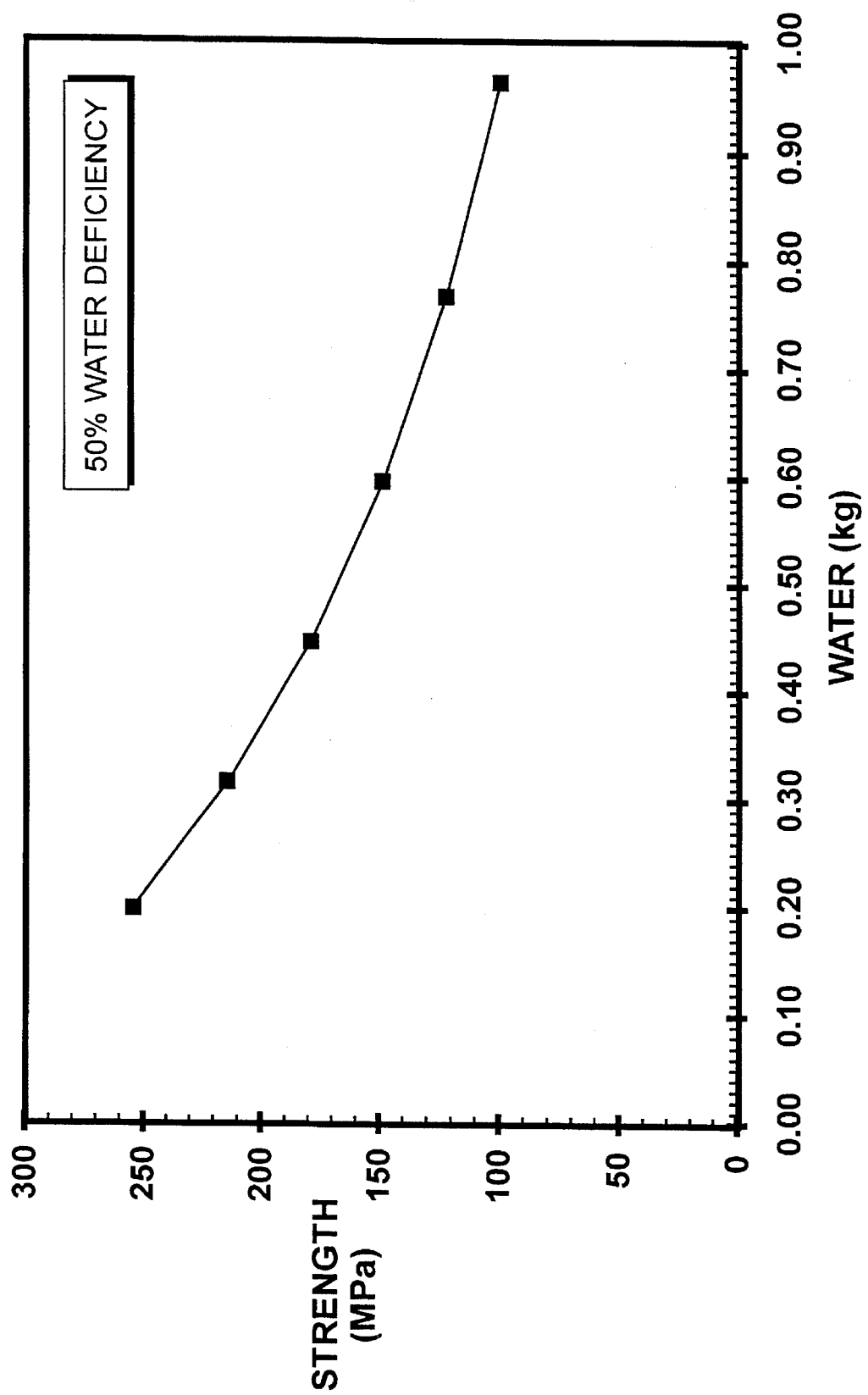
FIGS. 11A–11E show graphs illustrating the relationship between strength, particle packing density, and water content of hydraulically settable mixtures that have 40% portland cement, 60% aggregate, and varying water deficiencies.

The strengths of the different compositions as a function of particle packing are plotted and illustrated by the graph of FIG. 11A.

EXAMPLES 205–210

The compositions of Examples 199–204 are substantially repeated except that the amount of water is reduced in each example in order to yield a water deficiency of 60%.

| Example | Packing Density | Water | W/C Ratio | Strength |
|---|---|---|---|---|
| 205 | 0.65 | 0.77 | 0.19 | 106 |
| 206 | 0.70 | 0.61 | 0.15 | 129 |
| 207 | 0.75 | 0.48 | 0.12 | 156 |
| 208 | 0.80 | 0.36 | 0.09 | 188 |
| 209 | 0.85 | 0.25 | 0.06 | 225 |
| 210 | 0.90 | 0.16 | 0.04 | 269 |

Figure 11B:
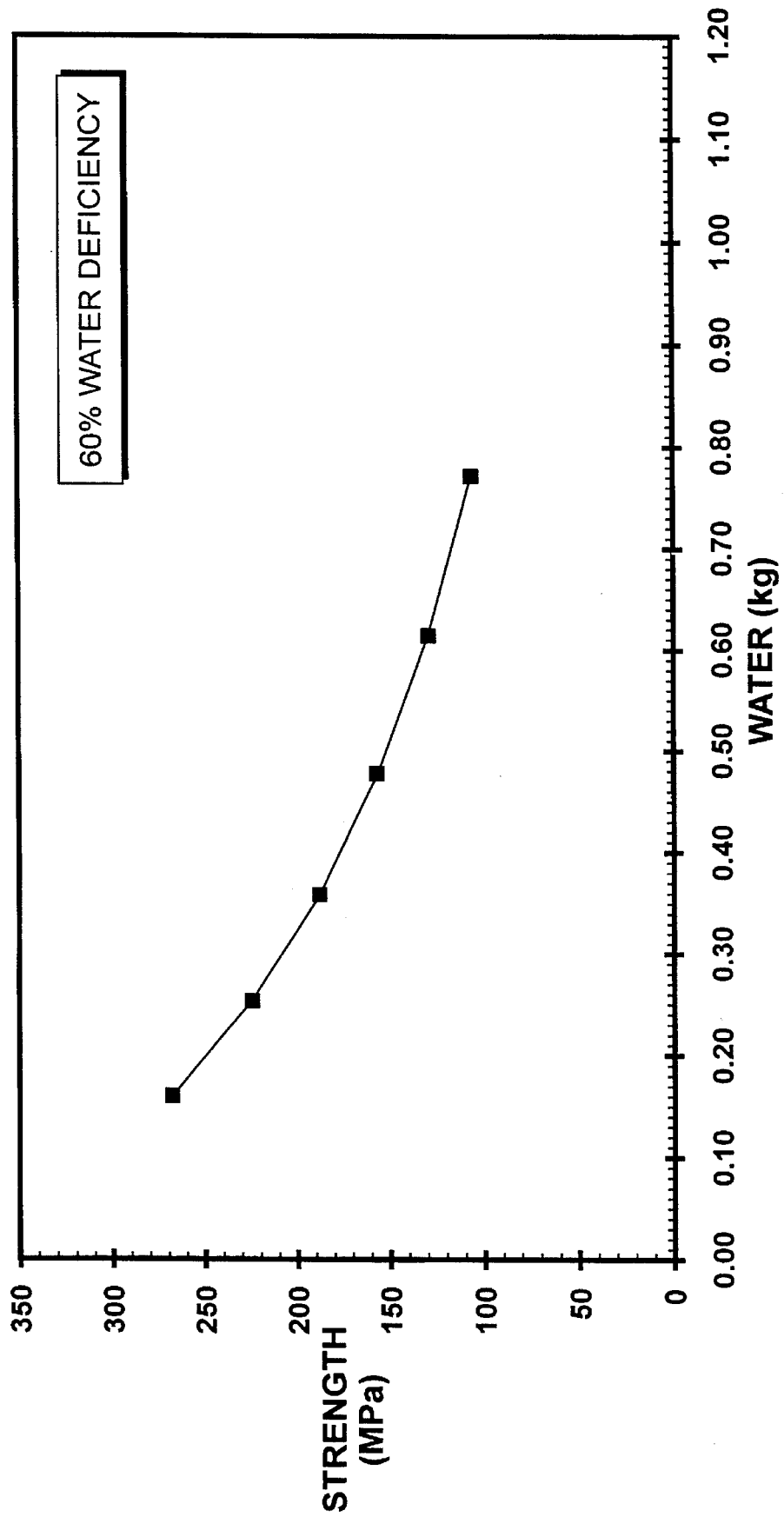

The strengths of the different compositions as a function of particle packing are plotted and illustrated by the graph of FIG. 11B.

EXAMPLES 211–216

The compositions of Examples 199–204 are substantially repeated except that the amount of water is reduced in each example in order to yield a water deficiency of 70%.

| Example | Packing Density | Water | W/C Ratio | Strength |
|---|---|---|---|---|
| 211 | 0.65 | 0.58 | 0.14 | 128 |
| 212 | 0.70 | 0.46 | 0.11 | 152 |
| 213 | 0.75 | 0.36 | 0.09 | 179 |
| 214 | 0.80 | 0.27 | 0.07 | 210 |
| 215 | 0.85 | 0.19 | 0.05 | 245 |
| 216 | 0.90 | 0.12 | 0.03 | 284 |

Figure 11C:
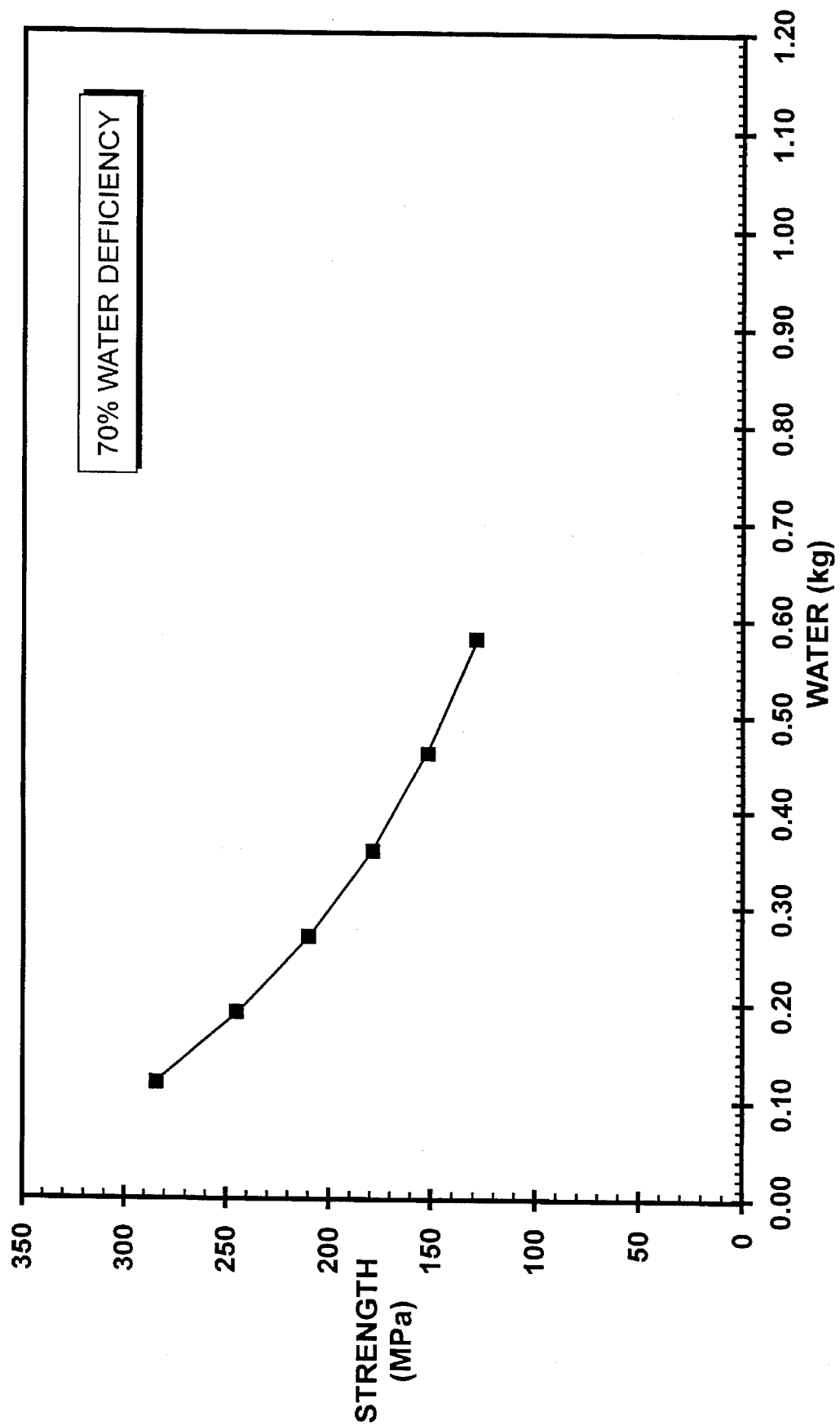

The strengths of the different compositions as a function of particle packing are plotted and illustrated by the graph of FIG. 11C.

EXAMPLES 217–222

The compositions of Examples 199–204 are substantially repeated except that the amount of water is reduced in each example in order to yield a water deficiency of 80%.

| Example | Packing Density | Water | W/C Ratio | Strength |
|---|---|---|---|---|
| 217 | 0.65 | 0.39 | 0.10 | 158 |
| 218 | 0.70 | 0.31 | 0.08 | 181 |
| 219 | 0.75 | 0.24 | 0.06 | 207 |
| 220 | 0.80 | 0.18 | 0.04 | 236 |
| 221 | 0.85 | 0.13 | 0.03 | 267 |
| 222 | 0.90 | 0.08 | 0.02 | 301 |

Figure 11D:
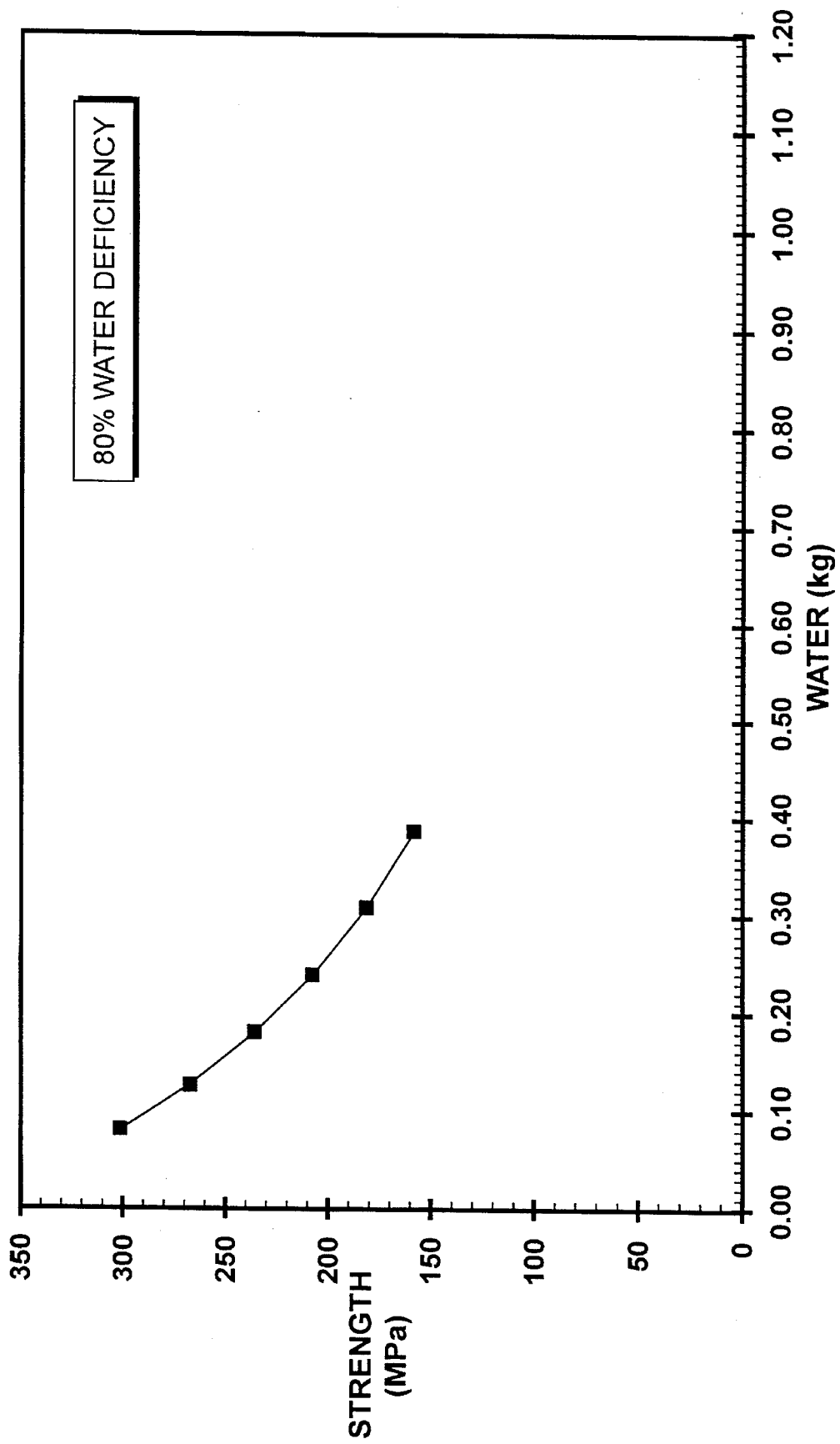

The strengths of the different compositions as a function of particle packing are plotted and illustrated by the graph of FIG. 11D.

EXAMPLES 223–228

The compositions of Examples 199–204 are substantially repeated except that the amount of water is reduced in each example in order to yield a water deficiency of 90%.

| Example | Packing Density | Water | W/C Ratio | Strength |
|---|---|---|---|---|
| 223 | 0.65 | 0.19 | 0.05 | 199 |
| 224 | 0.70 | 0.15 | 0.04 | 220 |
| 225 | 0.75 | 0.12 | 0.03 | 243 |
| 226 | 0.80 | 0.09 | 0.02 | 267 |
| 227 | 0.85 | 0.06 | 0.02 | 292 |
| 228 | 0.90 | 0.04 | 0.01 | 320 |

Figure 11E:
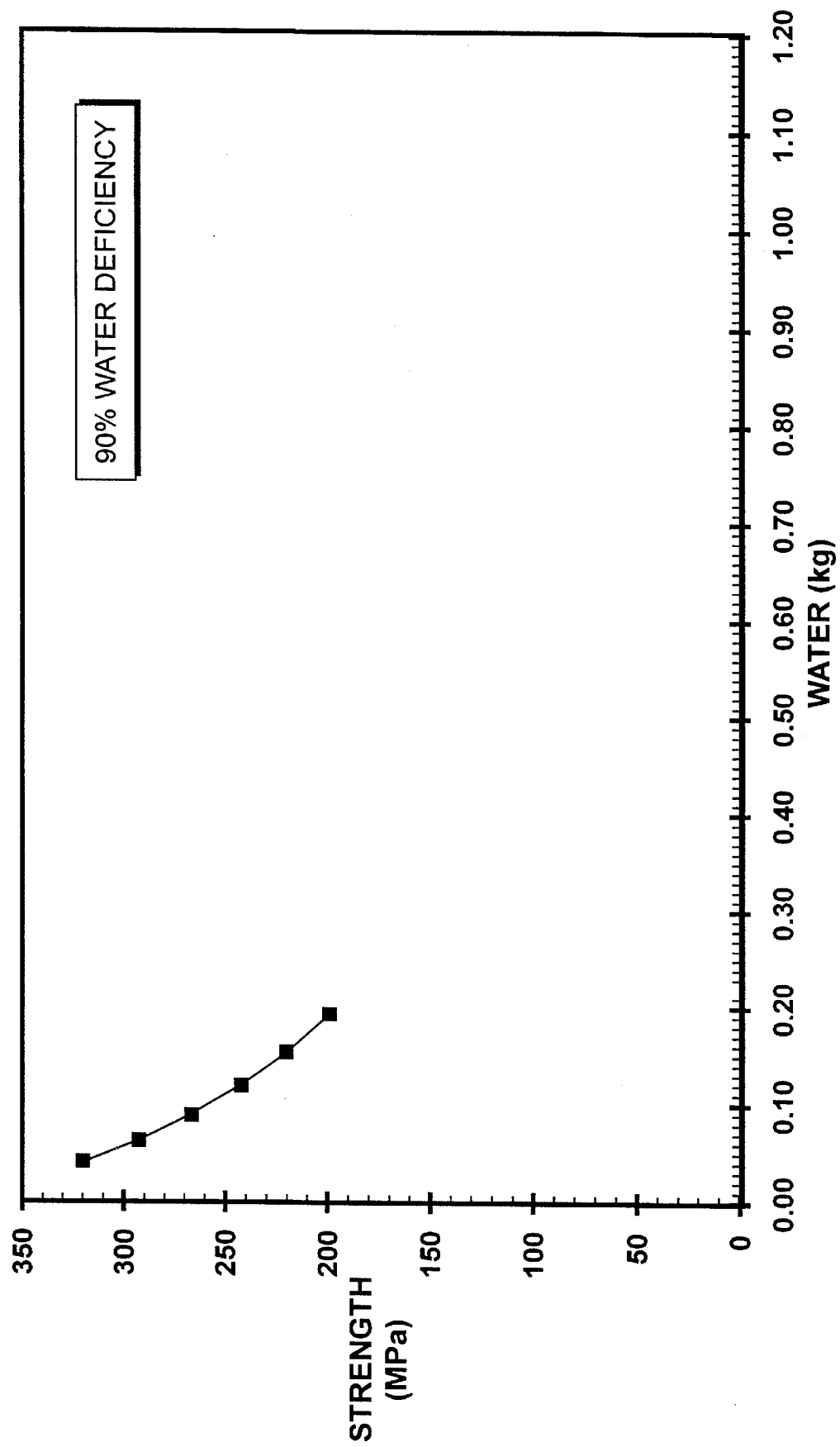

The strengths of the different compositions as a function of particle packing are plotted and illustrated by the graph of FIG. 11E. Superimposing the curves of FIGS. 11A–11E yields substantially one continuous curve, which demonstrates the close relationship between strength and the absolute level of water within the hydraulically settable mixture. Although increasing the amount of portland cement within the mixtures of Examples 199–228 causes an increase in the overall strength of the mixtures, the increase is less dramatic than increasing the particle packing density and decreasing the level of water within the mixtures.

The next set of examples is substantially similar to Examples 199–228, except that the amount of portland cement is increased to 45.5% by weight of the dry mixtures.

EXAMPLES 229–234

Extrudable hydraulically settable mixtures are formed which have 5.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 229 | 0.65 | 1.05 | 0.21 | 102 |
| 230 | 0.70 | 0.83 | 0.17 | 125 |
| 231 | 0.75 | 0.65 | 0.13 | 152 |
| 232 | 0.80 | 0.49 | 0.10 | 183 |
| 233 | 0.85 | 0.34 | 0.07 | 220 |
| 234 | 0.90 | 0.22 | 0.04 | 263 |

Figure 12A:
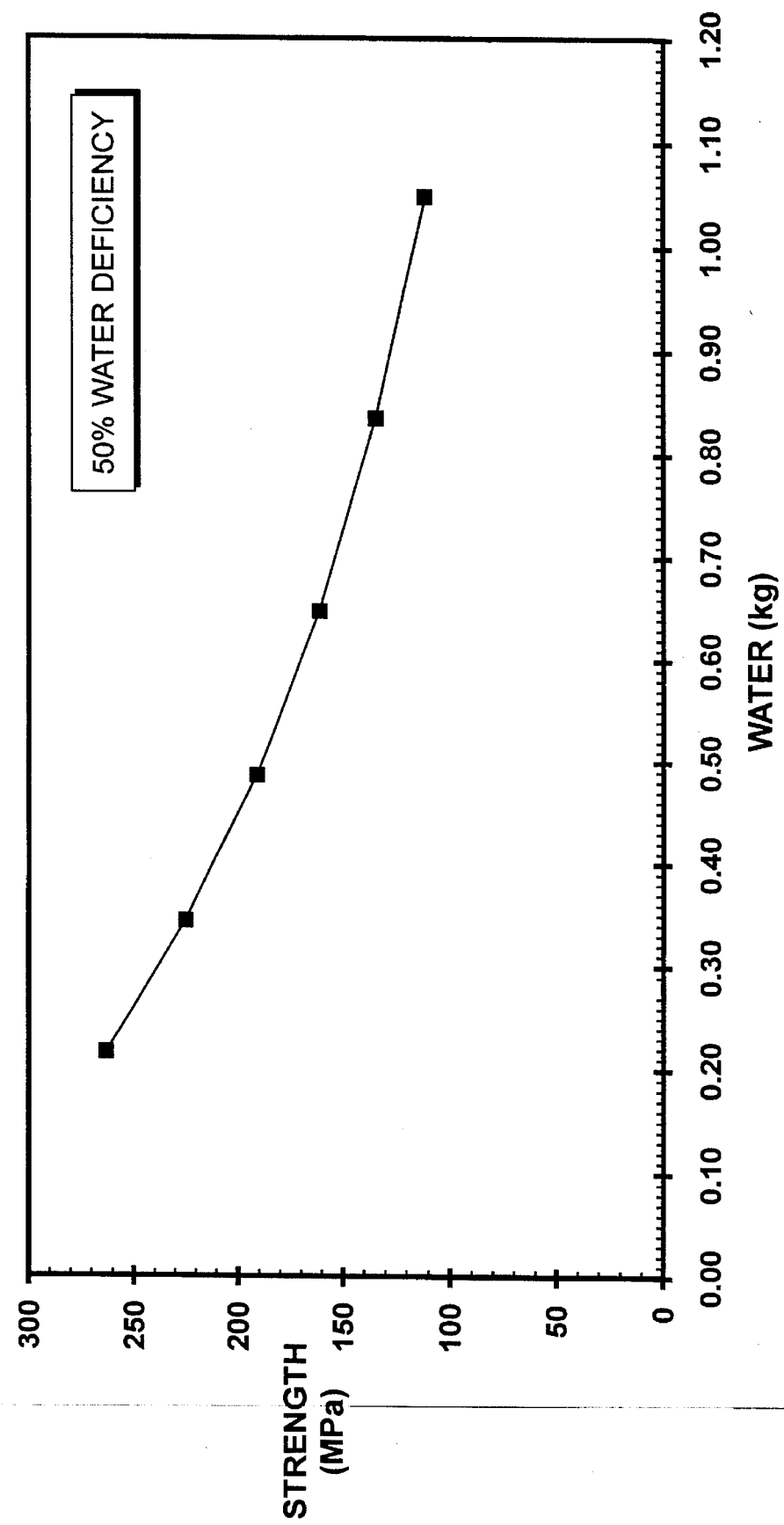
FIGS. 12A–12E show graphs illustrating the relationship between strength, particle packing density, and water content of hydraulically settable mixtures that have 45.5% portland cement, 54.5% aggregate, and varying water deficiencies.

The strengths of the different compositions as a function of particle packing are plotted and illustrated by the graph of FIG. 12A.

EXAMPLES 235–240

The compositions of Examples 229–234 are substantially repeated except that the amount of water is reduced in each example in order to yield a water deficiency of 60%.

| Example | Packing Density | Water | W/C Ratio | Strength |
|---|---|---|---|---|
| 235 | 0.65 | 0.84 | 0.17 | 120 |
| 236 | 0.70 | 0.67 | 0.13 | 143 |
| 237 | 0.75 | 0.52 | 0.10 | 170 |
| 238 | 0.80 | 0.39 | 0.08 | 201 |
| 239 | 0.85 | 0.27 | 0.05 | 236 |
| 240 | 0.90 | 0.17 | 0.03 | 276 |

Figure 12B:
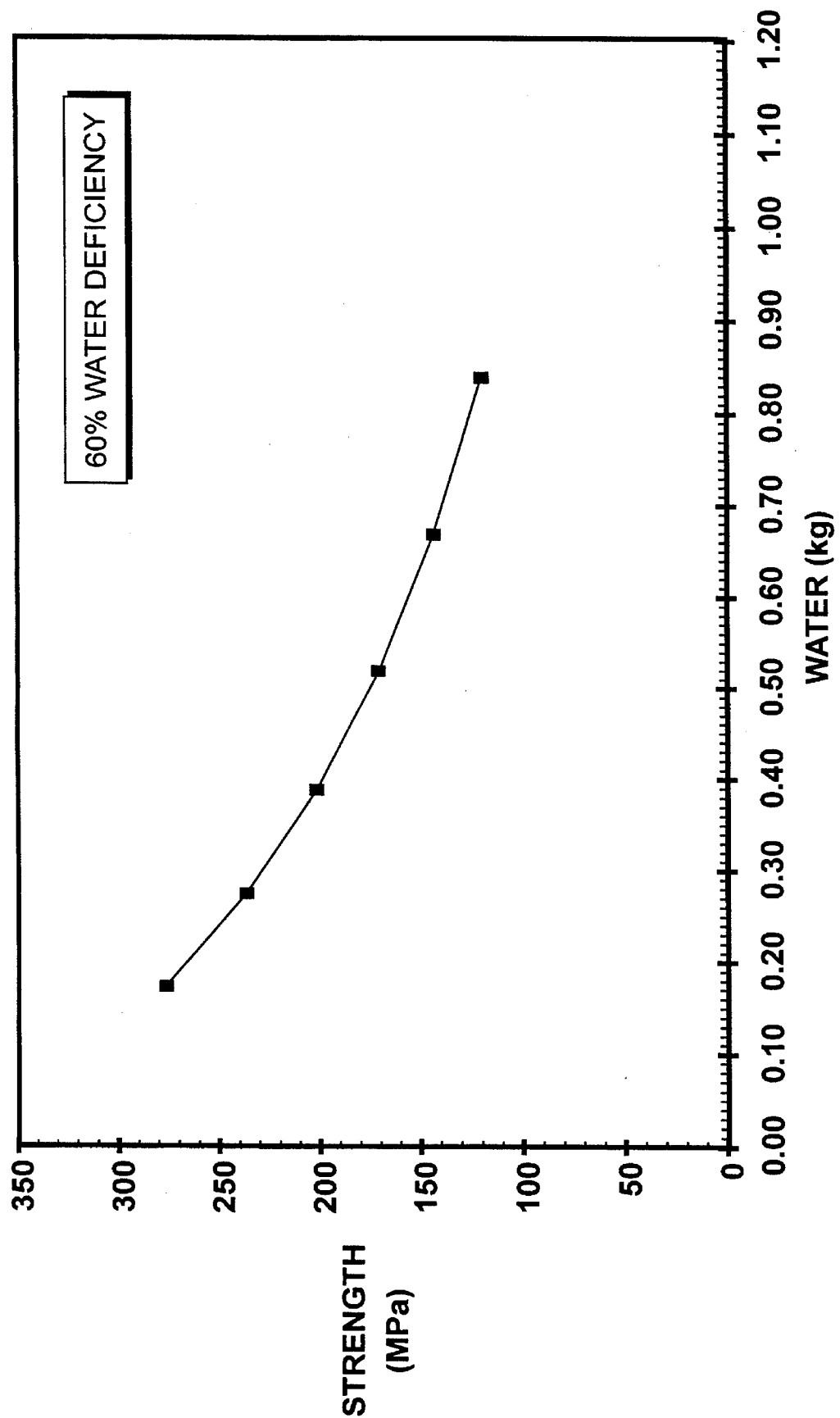

The strengths of the different compositions as a function of particle packing are plotted and illustrated by the graph of FIG. 12B.

EXAMPLES 241–246

The compositions of Examples 229–234 are substantially repeated except that the amount of water is reduced in each example in order to yield a water deficiency of 70%.

| Example | Packing Density | Water | W/C Ratio | Strength |
|---|---|---|---|---|
| 241 | 0.65 | 0.63 | 0.13 | 142 |
| 242 | 0.70 | 0.50 | 0.10 | 166 |
| 243 | 0.75 | 0.39 | 0.08 | 193 |
| 244 | 0.80 | 0.29 | 0.06 | 222 |
| 245 | 0.85 | 0.21 | 0.04 | 254 |
| 246 | 0.90 | 0.13 | 0.03 | 291 |

Figure 12C:
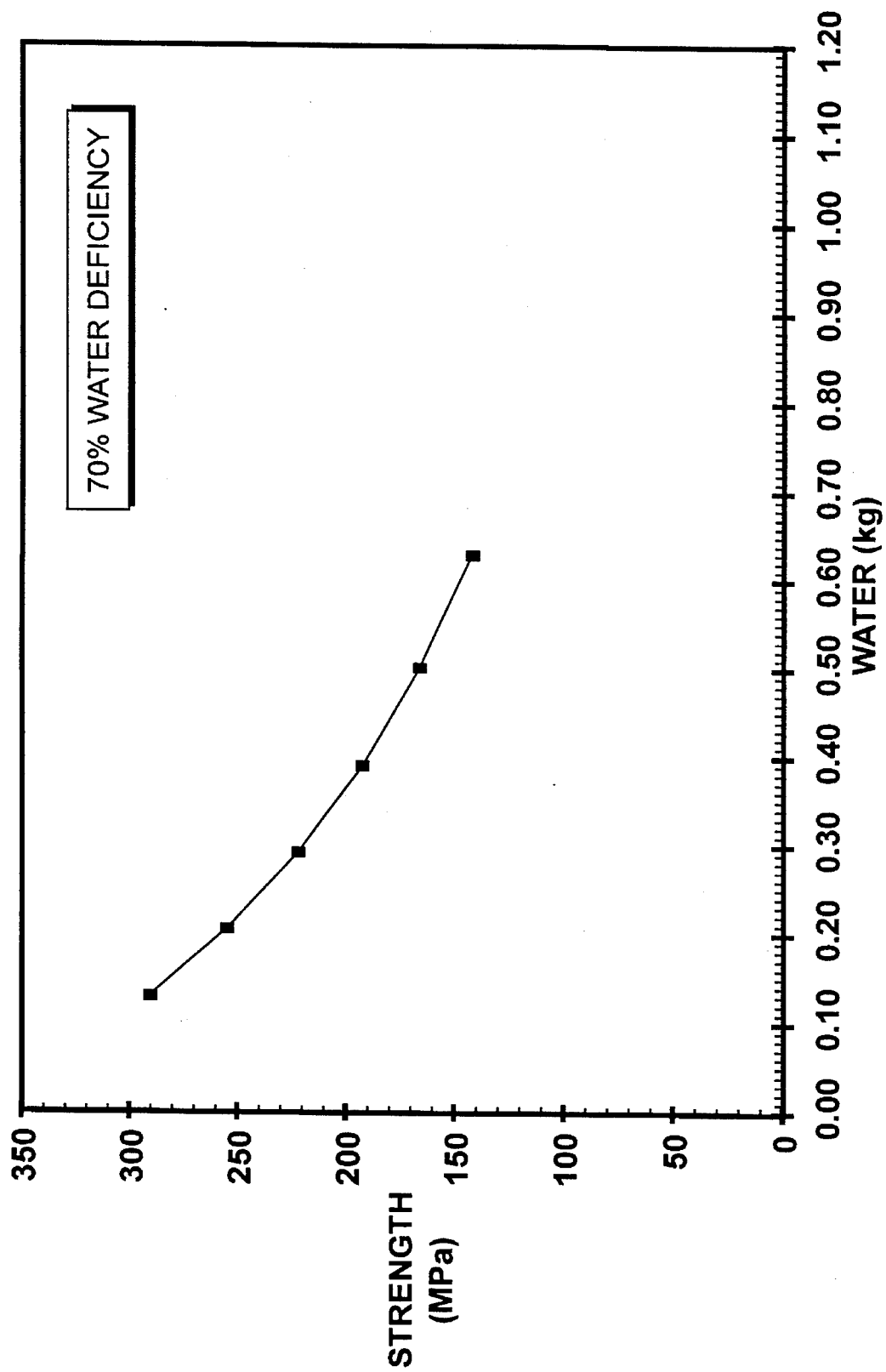

The strengths of the different compositions as a function of particle packing are plotted and illustrated by the graph of FIG. 12C.

EXAMPLES 247–252

The compositions of Examples 229–234 are substantially repeated except that the amount of water is reduced in each example in order to yield a water deficiency of 80%.

| Example | Packing Density | Water | W/C Ratio | Strength |
|---|---|---|---|---|
| 247 | 0.65 | 0.42 | 0.08 | 172 |
| 248 | 0.70 | 0.33 | 0.07 | 195 |
| 249 | 0.75 | 0.26 | 0.05 | 220 |
| 250 | 0.80 | 0.19 | 0.04 | 246 |
| 251 | 0.85 | 0.14 | 0.03 | 275 |
| 252 | 0.90 | 0.09 | 0.02 | 306 |

Figure 12D:
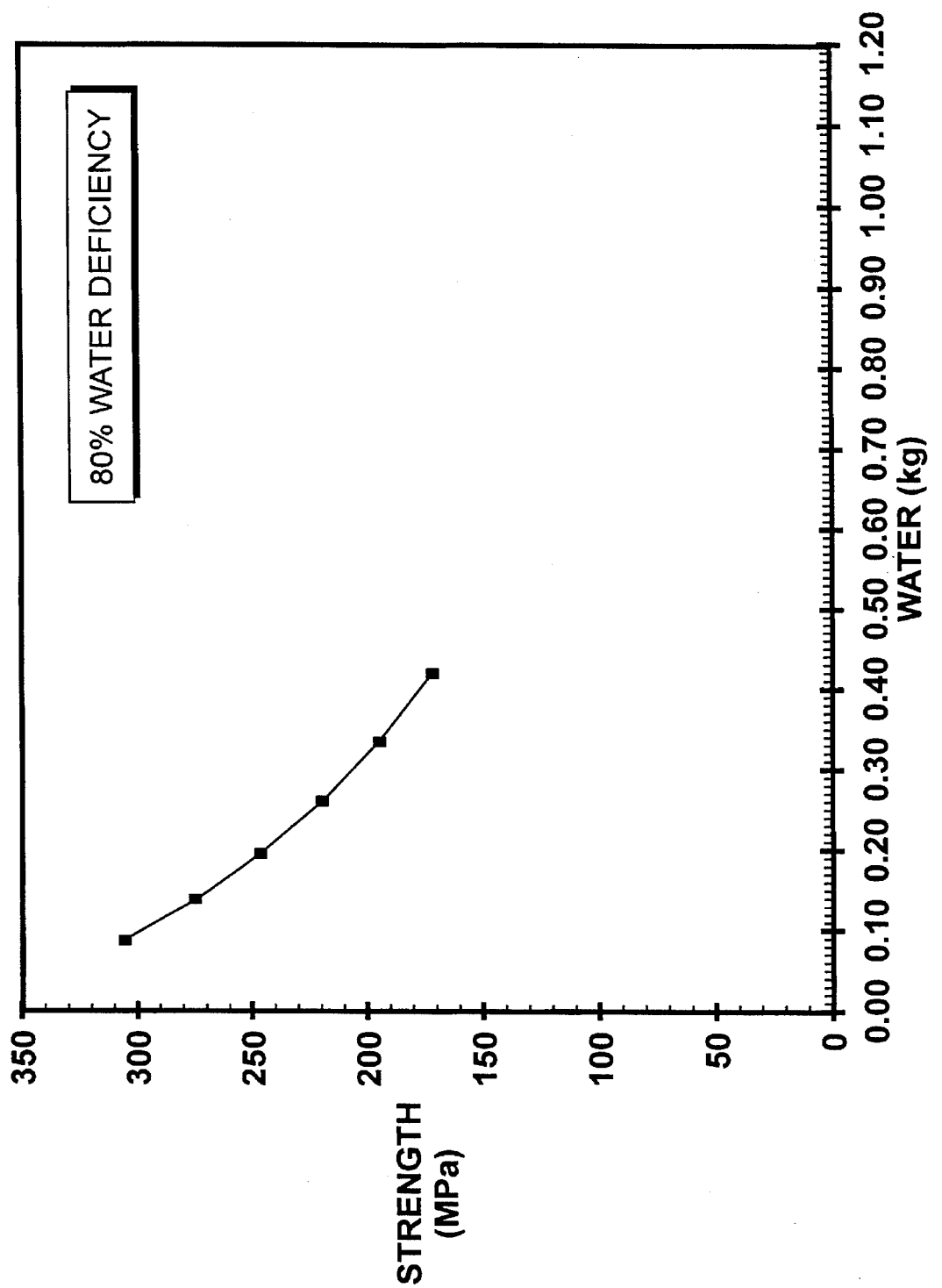

The strengths of the different compositions as a function of particle packing are plotted and illustrated by the graph of FIG. 12D.

EXAMPLES 253–258

The compositions of Examples 229–234 are substantially repeated except that the amount of water is reduced in each example in order to yield a water deficiency of 90%.

| Example | Packing Density | Water | W/C Ratio | Strength |
|---------|----------------|-------|-----------|----------|
| 253 | 0.65 | 0.21 | 0.04 | 211 |
| 254 | 0.70 | 0.17 | 0.03 | 232 |
| 255 | 0.75 | 0.13 | 0.03 | 253 |
| 256 | 0.80 | 0.10 | 0.02 | 275 |
| 257 | 0.85 | 0.07 | 0.01 | 298 |
| 258 | 0.90 | 0.04 | 0.01 | 322 |

Figure 12E:
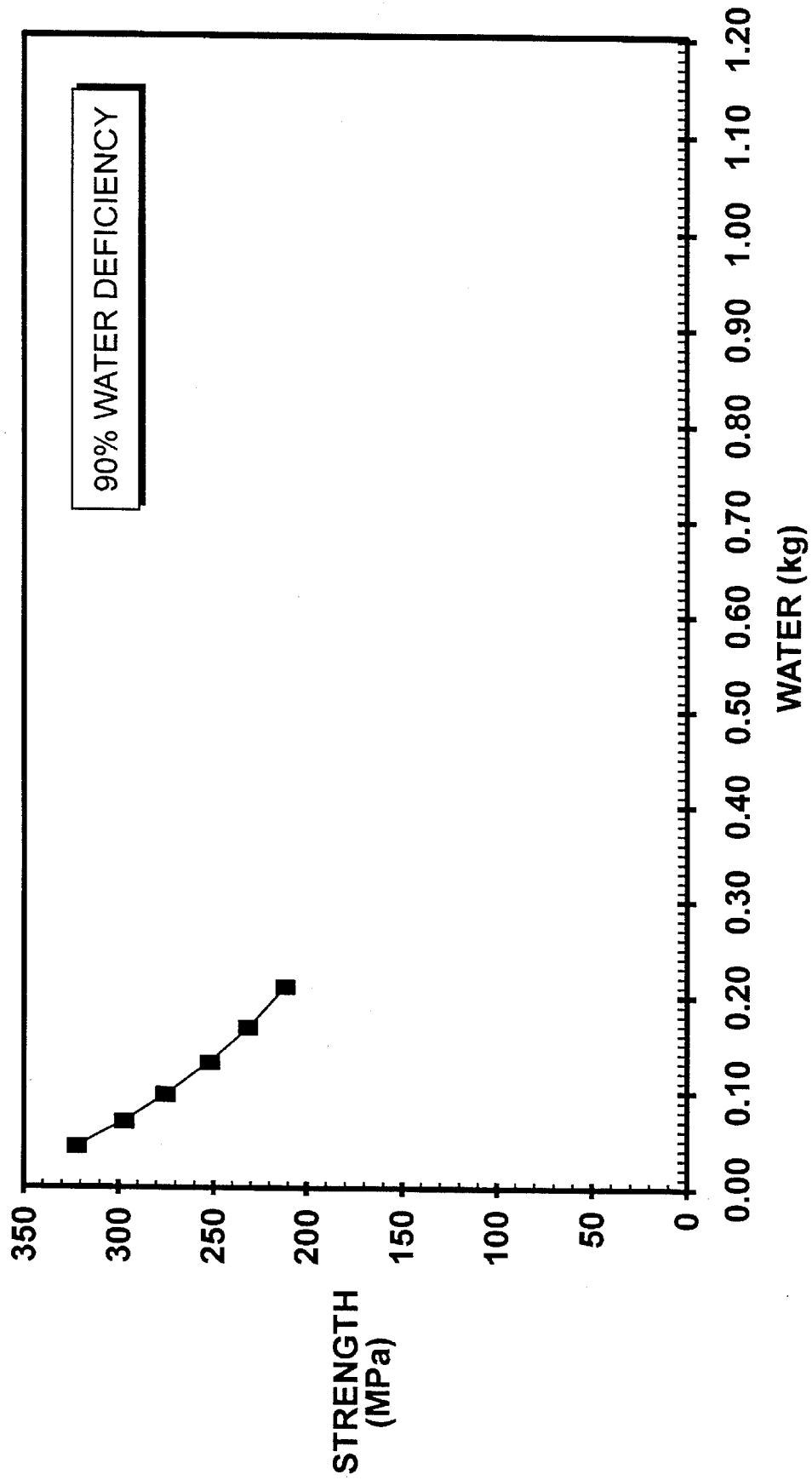

The strengths of the different compositions as a function of particle packing are plotted and illustrated by the graph of FIG. 12E. Superimposing the curves of FIGS. 12A–12E yields substantially one continuous curve, which demonstrates the close relationship between strength and the absolute level of water within the hydraulically settable mixture. Although increasing the amount of portland cement within the mixtures of Examples 229–258 causes an increase in the overall strength of the mixtures, the increase is less dramatic than increasing the particle packing density and decreasing the level of water within the mixtures.

The next set of examples is substantially similar to Examples 229–258, except that the amount of portland cement is increased to 50% by weight of the dry mixtures.

EXAMPLES 259–264

Extrudable hydraulically settable mixtures are formed which have 6.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---------|----------------|-------|-----------|----------|
| 259 | 0.65 | 1.13 | 0.19 | 112 |
| 260 | 0.70 | 0.90 | 0.15 | 135 |
| 261 | 0.75 | 0.70 | 0.12 | 162 |
| 262 | 0.80 | 0.53 | 0.09 | 193 |
| 263 | 0.85 | 0.37 | 0.06 | 229 |
| 264 | 0.90 | 0.23 | 0.04 | 270 |

Figure 13A:
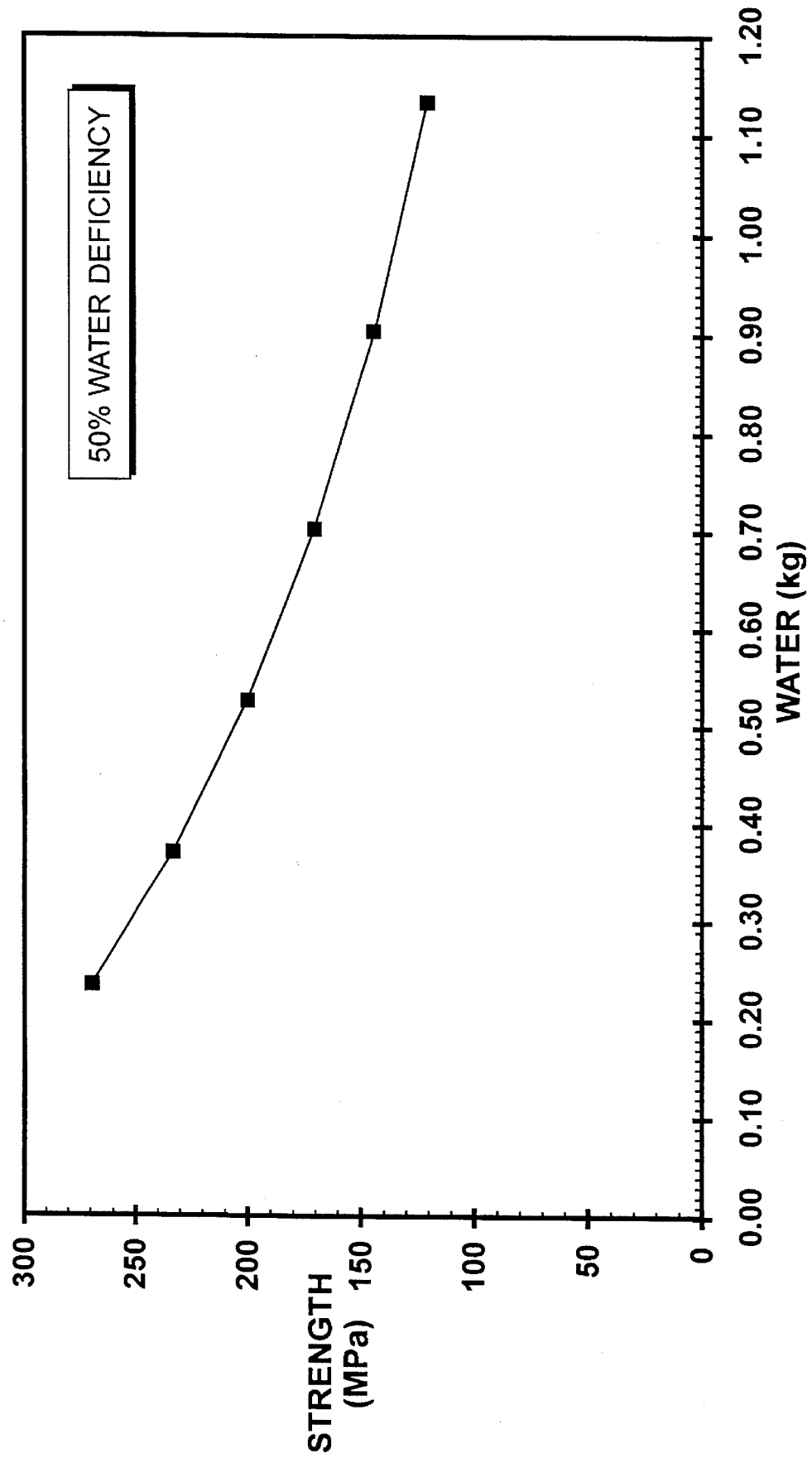
FIGS. 13A–13E show graphs illustrating the relationship between strength, particle packing density, and water content of hydraulically settable mixtures that have 50% portland cement, 50% aggregate, and varying water deficiencies.

The strengths of the different compositions as a function of particle packing are plotted and illustrated by the graph of FIG. 13A.

EXAMPLES 265–270

The compositions of Examples 259–264 are substantially repeated except that the amount of water is reduced in each example in order to yield a water deficiency of 60%.

| Example | Packing Density | Water | W/C Ratio | Strength |
|---------|----------------|-------|-----------|----------|
| 265 | 0.65 | 0.91 | 0.15 | 130 |
| 266 | 0.70 | 0.72 | 0.12 | 154 |
| 267 | 0.75 | 0.56 | 0.09 | 181 |
| 268 | 0.80 | 0.42 | 0.07 | 211 |
| 269 | 0.85 | 0.30 | 0.05 | 244 |
| 270 | 0.90 | 0.19 | 0.03 | 282 |

Figure 13B:
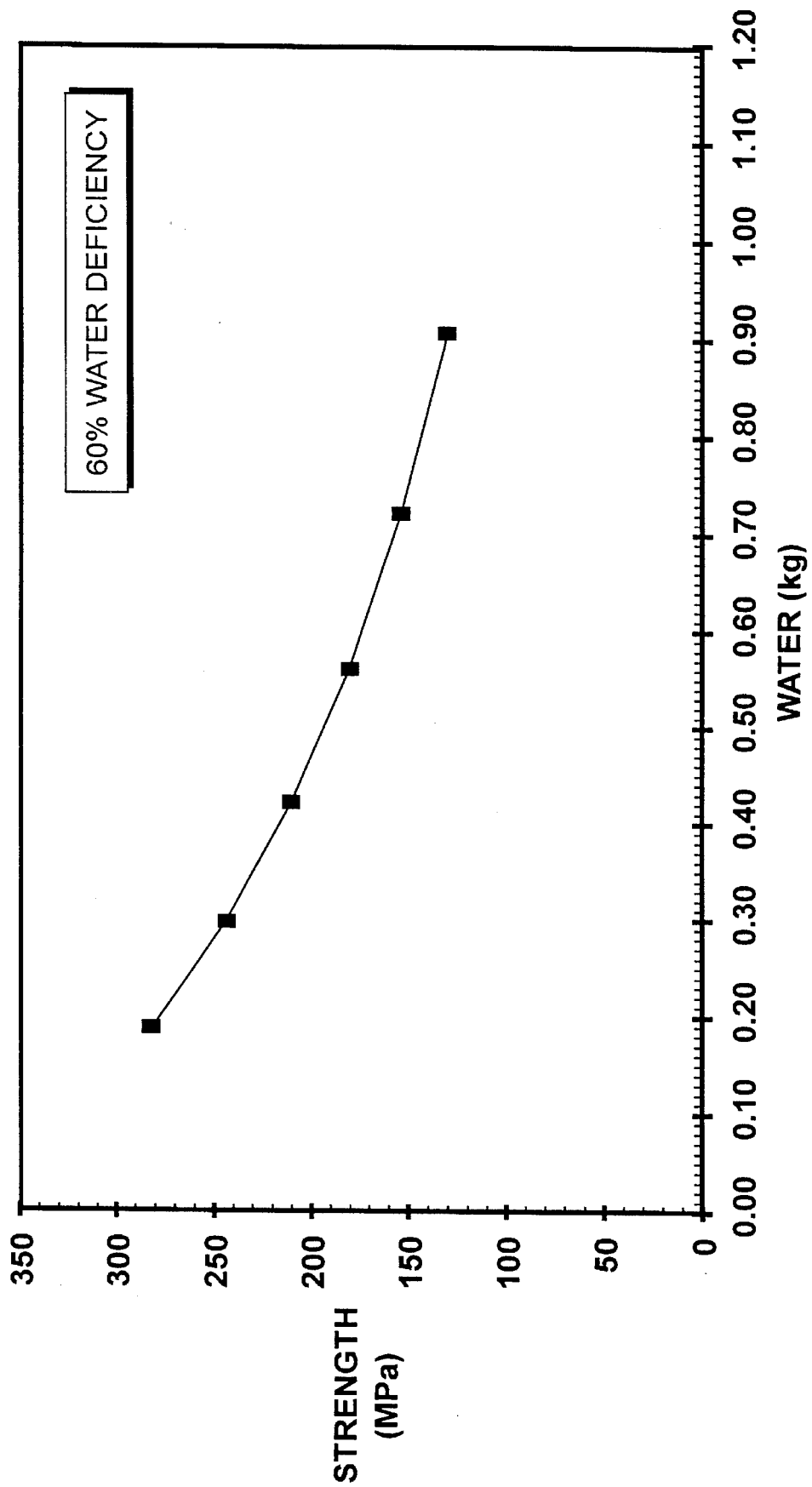

The strengths of the different compositions as a function of particle packing are plotted and illustrated by the graph of FIG. 13B.

EXAMPLES 271–276

The compositions of Examples 259–264 are substantially repeated except that the amount of water is reduced in each example in order to yield a water deficiency of 70%.

| Example | Packing Density | Water | W/C Ratio | Strength |
|---------|----------------|-------|-----------|----------|
| 271 | 0.65 | 0.68 | 0.11 | 153 |
| 272 | 0.70 | 0.54 | 0.09 | 176 |
| 273 | 0.75 | 0.42 | 0.07 | 202 |
| 274 | 0.80 | 0.32 | 0.05 | 231 |
| 275 | 0.85 | 0.22 | 0.04 | 261 |
| 276 | 0.90 | 0.14 | 0.02 | 295 |

Figure 13C:
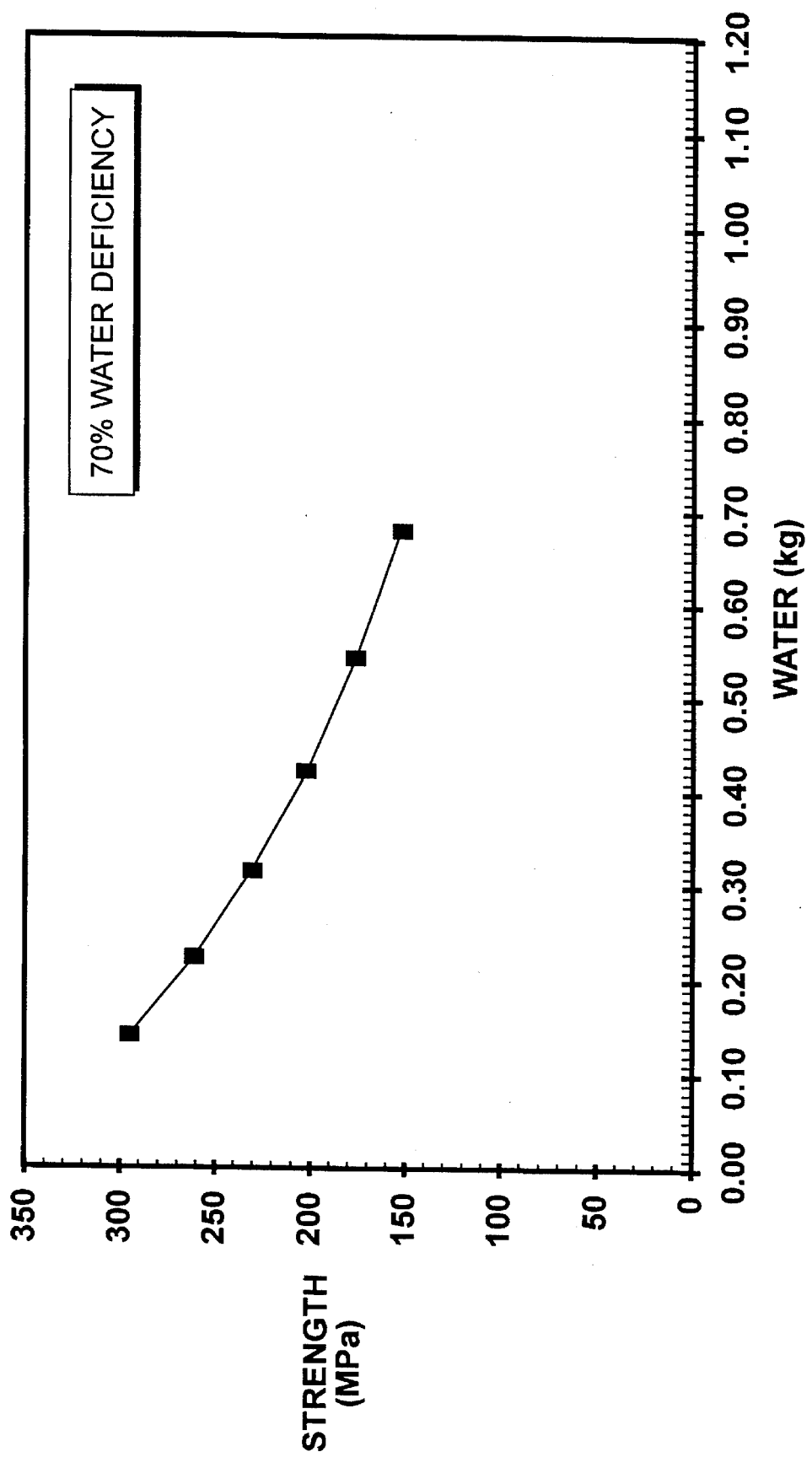

The strengths of the different compositions as a function of particle packing are plotted and illustrated by the graph of FIG. 13C.

EXAMPLES 277–282

The compositions of Examples 259–264 are substantially repeated except that the amount of water is reduced in each example in order to yield a water deficiency of 80%.

| Example | Packing Density | Water | W/C Ratio | Strength |
|---------|----------------|-------|-----------|----------|
| 277 | 0.65 | 0.45 | 0.08 | 182 |
| 278 | 0.70 | 0.36 | 0.06 | 204 |
| 279 | 0.75 | 0.28 | 0.05 | 228 |
| 280 | 0.80 | 0.21 | 0.04 | 254 |
| 281 | 0.85 | 0.15 | 0.02 | 280 |
| 282 | 0.90 | 0.09 | 0.02 | 309 |

Figure 13D:
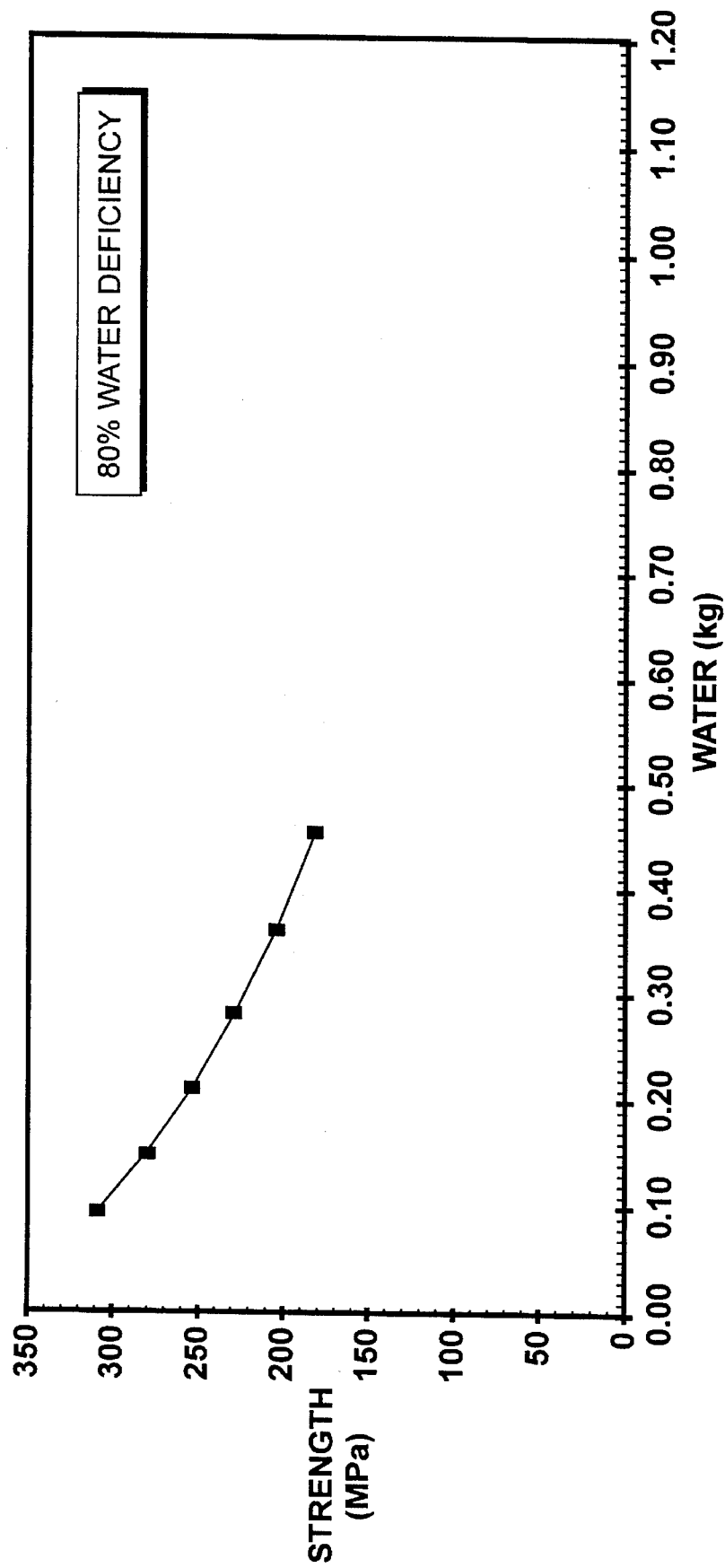

The strengths of the different compositions as a function of particle packing are plotted and illustrated by the graph of FIG. 13D.

EXAMPLES 283–288

The compositions of Examples 259–264 are substantially repeated except that the amount of water is reduced in each example in order to yield a water deficiency of 90%.

| Example | Packing Density | Water | W/C Ratio | Strength |
|---------|----------------|-------|-----------|----------|
| 283 | 0.65 | 0.23 | 0.04 | 221 |
| 284 | 0.70 | 0.18 | 0.03 | 240 |
| 285 | 0.75 | 0.14 | 0.02 | 260 |
| 286 | 0.80 | 0.11 | 0.02 | 280 |
| 287 | 0.85 | 0.07 | 0.01 | 302 |
| 288 | 0.90 | 0.05 | 0.01 | 324 |

Figure 13E:
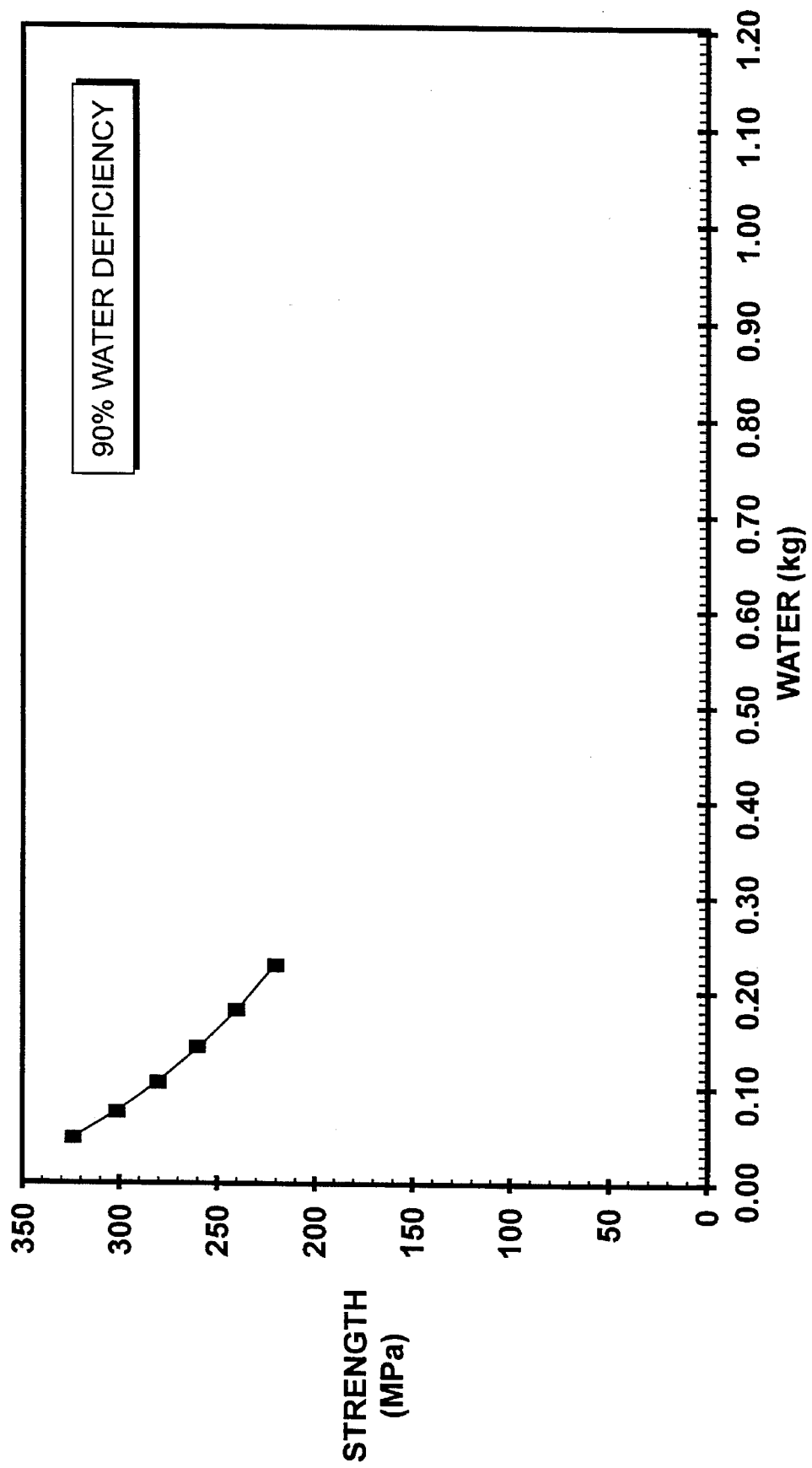

The strengths of the different compositions as a function of particle packing are plotted and illustrated by the graph of FIG. 13E. Superimposing the curves of FIGS. 13A–13E yields substantially one continuous curve, which demonstrates the close relationship between strength and the absolute level of water within the hydraulically settable mixture. Although increasing the amount of portland cement within the mixtures of Examples 259–288 causes an increase in the overall strength of the mixtures, the increase is less dramatic than increasing the particle packing density and decreasing the level of water within the mixtures.

The next group of examples illustrates how the overall particle packing density of a two-component system (i.e., portland cement and sand) is affected by the natural packing densities of the sand component and the portland cement component. Using the information contained in these examples would allow one of ordinary skill in the art to design hydraulically settable mixtures having the particle packing densities of the compositions set forth above in Examples 109–288. As shown below, the resulting particle packing density is affected not only by the individual natural packing densities for the cement and sand components but also by the average particle diameter of the cement and sand components, respectively.

Note that different sand aggregates may have the same average diameter and yet have greatly varying packing densities. The natural packing density of an aggregate of a given average diameter will increase or decrease depending on the distribution of particle diameters away from the mean diameter. In general, the greater the size variation among the particles the greater the natural packing density of a given aggregate.

EXAMPLES 289–294

Hydraulically settable mixtures are formed which contain 1.0 kg portland cement and 6.0 kg sand, yielding mixtures having 14.3% cement and 85.7% sand aggregate by weight of the dry components. The portland cement has an average particle size of 15 microns and a natural packing density of 0.580. Five different types of sand aggregate categorized on the basis of average diameter are selected to yield the desired overall packing density of the dry mixture. The five different aggregates, which shall be referred to as "Aggregate 1", "Aggregate 2" and so on, have average particle diameters of 0.1 mm, 0.2 mm, 0.5 mm, 1.0 mm, and 1.25 mm, respectively.

Each of the five types of sand aggregate is further distinguished on the basis of natural packing density, as set forth below. The following table illustrates the effect on the overall particle packing density of mixing the five different types of aggregates having varying particle packing densities with the portland cement described above. The term "Aggregate" is abbreviated as "Agg"; the overall packing density is abbreviated as "Density"; and the numbers below each of the Aggregate headings is the natural packing density for a given aggregate.

| Example | Density | Agg 1 | Agg 2 | Agg 3 | Agg 4 | Agg 5 |
|---|---|---|---|---|---|---|
| 289 | 0.65 | 0.595 | 0.586 | 0.579 | 0.577 | 0.577 |
| 290 | 0.70 | 0.644 | 0.633 | 0.623 | 0.622 | 0.622 |
| 291 | 0.75 | 0.696 | 0.682 | 0.673 | 0.670 | 0.669 |
| 292 | 0.80 | 0.755 | 0.738 | 0.726 | 0.722 | 0.722 |
| 293 | 0.85 | 0.828 | 0.806 | 0.791 | 0.786 | 0.785 |
| 294 | 0.90 | N/A | 0.945 | 0.918 | 0.907 | 0.905 |

As illustrated by these examples, greater overall particle packing density can be achieved either by keeping the average diameter of the aggregate constant while increasing the natural packing density of the aggregate, or by keeping the natural packing density constant and increasing the average diameter of the aggregate. The increased packing effect using the latter method is caused by the increase in variance between the average aggregate particle size and cement particle size. However, varying the natural packing density of a given aggregate appears to yield the greater increase in overall packing density.

EXAMPLES 295–298

The compositions, methodologies, and assumptions set forth in Examples 289–294 are repeated in every way, except that the hydraulically settable mixtures contain 2.0 kg portland cement and 6.0 kg of sand aggregate, yielding mixtures having 25% cement and sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---|---|---|---|---|---|---|
| 295 | 0.65 | 0.554 | 0.536 | 0.524 | 0.521 | 0.520 |
| 296 | 0.70 | 0.612 | 0.589 | 0.575 | 0.570 | 0.569 |
| 297 | 0.75 | 0.683 | 0.654 | 0.635 | 0.628 | 0.627 |
| 298 | 0.80 | 0.785 | 0.745 | 0.718 | 0.708 | 0.707 |

As illustrated in these examples, as the quantity of portland cement is increased, the difficulty of creating mixtures from a two-component system which have high overall packing density also increases. This is because of the general uniformity of particle sizes of the portland cement compared to the sand aggregate. Greater particle uniformity generally decreases the ability to achieve higher particle packing densities.

EXAMPLES 299–302

The compositions, methodologies, and assumptions set forth in Examples 289–294 are repeated in every way, except that the hydraulically settable mixtures contain 3.0 kg portland cement and 6.0 kg of sand aggregate, yielding mixtures having 33.3% cement and 66.7% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---|---|---|---|---|---|---|
| 299 | 0.65 | 0.529 | 0.502 | 0.488 | 0.483 | 0.482 |
| 300 | 0.70 | 0.601 | 0.568 | 0.547 | 0.540 | 0.538 |
| 301 | 0.75 | 0.709 | 0.661 | 0.629 | 0.618 | 0.616 |
| 302 | 0.80 | 0.950 | 0.915 | 0.849 | 0.816 | 0.809 |

EXAMPLES 303–305

The compositions, methodologies, and assumptions set forth in Examples 289–294 are repeated in every way, except that the hydraulically settable mixtures contain 4.0 kg portland cement and 6.0 kg of sand aggregate, yielding mixtures having 40% cement and sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---|---|---|---|---|---|---|
| 303 | 0.65 | 0.515 | 0.483 | 0.462 | 0.456 | 0.454 |
| 304 | 0.70 | 0.609 | 0.562 | 0.533 | 0.523 | 0.522 |
| 305 | 0.75 | 0.792 | 0.719 | 0.662 | 0.643 | 0.639 |

EXAMPLES 306–308

The compositions, methodologies, and assumptions set forth in Examples 289–294 are repeated in every way, except that the hydraulically settable mixtures contain 5.0 kg portland cement and 6.0 kg of sand aggregate, yielding mixtures having 45.5% cement and 54.5% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 306 | 0.65 | 0.508 | 0.468 | 0.444 | 0.435 | 0.434 |
| 307 | 0.70 | 0.634 | 0.571 | 0.531 | 0.518 | 0.515 |
| 308 | 0.75 | N/A | N/A | 0.894 | 0.835 | 0.819 |

EXAMPLES 309–310

The compositions, methodologies, and assumptions set forth in Examples 289–294 are repeated in every way, except that the hydraulically settable mixtures contain 6.0 kg portland cement and 6.0 kg of sand aggregate, yielding mixtures having 50% cement and sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 309 | 0.65 | 0.507 | 0.459 | 0.430 | 0.421 | 0.419 |
| 310 | 0.70 | 0.682 | 0.599 | 0.543 | 0.525 | 0.521 |

IV. SUMMARY

From the foregoing, it will be appreciated that the present invention provides novel compositions and methods for making a variety of extruded hydraulically settable articles of manufacture which have heretofore not been possible.

In particular, the present invention provides novel compositions and methods for improving the extrudability of hydraulically settable materials. Specifically, the present invention allows for the formation of extruded products and shapes which have not heretofore been possible using traditional hydraulic materials because of the inherent strength and moldability limitations of presently known hydraulically settable compositions.

In addition, the present invention provides novel compositions and methods which result in the ability to extrude hydraulically settable products having excellent form-stability in the green state. Such extruded objects have the benefit of being immediately self-supporting without external support even before they have cured.

Further, the present invention provides novel compositions and processes which yield highly plastic compositions which will maintain whatever shape into which the are extruded. Such extruded objects can usually be handled and transported using conventional means shortly after being extruded.

The present invention further provides novel compositions and processes which yield a variety of thin-walled extruded objects, which are often more lightweight and less dense than presently known hydraulically settable materials. Such extruded hydraulically settable products also show an increase in strength without a corresponding increase in density.

The present invention further provides novel compositions and processes useful for extruding hydraulically settable objects that can take the place of products which are presently made from other materials, such as paper, paperboard, plastic polystyrene, or metal. A further advantage is that such hydraulically settable products can be made to have similar, or even superior, properties than those presently made from existing materials.

In addition, the present invention provides novel compositions and processes which yield hydraulically settable objects that are environmentally benign and which essentially consist of the components found naturally within the earth into which such materials might eventually be disposed. Finally, the present invention provides novel compositions and processes for extruding hydraulically settable objects at a cost that is comparable, or even superior, to the cost of manufacturing equivalent objects from paper, paperboard, plastic, polystyrene, or metal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method for extruding a hydraulically settable mixture to form an article of manufacture having a hydraulically settable matrix, the method comprising the steps of:

combining a hydraulically settable binder, at least one aggregate material, a rheology-modifying agent and water to form a hydraulically settable mixture, the hydraulically settable binder and at least one aggregate material each comprising a plurality of particles which form a combination of particles that are in an initial state of natural packing density, the hydraulically settable mixture having an initial net deficiency of water such that the mixture is initially granular and substantially noncohesive;

extruding the hydraulically settable mixture under an extrusion pressure sufficient to increase the initial packing density of the combination of the hydraulically settable binder particles and aggregate material particles, thereby reducing the initial net deficiency of water, causing the hydraulically settable mixture to become cohesive, and causing the mixture to flow through a die to form an extruded article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure.

2. A method for extruding a hydraulically settable mixture as defined in claim 1, wherein the natural packing density of the combination of hydraulically settable particles and aggregate material particles is in a range from about 0.65 to about 0.99.

3. A method for extruding a hydraulically settable mixture as defined in claim 1, wherein the natural packing density of the combination of hydraulically settable particles and aggregate material particles is in a range from about 0.7 to about 0.95.

4. A method for extruding a hydraulically settable mixture as defined in claim 1, wherein the natural packing density of the combination of hydraulically settable particles and aggregate material particles is in a range from about 0.75 to about 0.9.

5. A method for extruding a hydraulically settable mixture as defined in claim 1, wherein the combining step includes mixing using a high shear mixer.

6. A method for extruding a hydraulically settable mixture as defined in claim 1, wherein the extruding step is carried out using an auger extruder.

7. A method for extruding a hydraulically settable mixture as defined in claim 6, wherein the extruding step includes applying a negative pressure to the hydraulically settable mixture in order to remove air from the mixture.

8. A method for extruding a hydraulically settable mixture as defined in claim 1, wherein the extruding step is carried out using a piston extruder.

9. A method for extruding a hydraulically settable mixture as defined in claim 1, wherein the extrusion pressure is in a range from about 10 bars to about 7000 bars.

10. A method for extruding a hydraulically settable mixture as defined in claim 1, wherein the extrusion pressure is in a range from about 20 bars to about 3000 bars.

11. A method for extruding a hydraulically settable mixture as defined in claim 1, wherein the extrusion pressure is in a range from about 50 bars to about 200 bars.

12. A method for extruding a hydraulically settable mixture as defined in claim 1, wherein the hydraulically settable binder comprises hydraulic cement.

13. A method for extruding a hydraulically settable mixture as defined in claim 12, wherein the hydraulic cement includes portland cement.

14. A method for extruding a hydraulically settable mixture as defined in claim 12, wherein the hydraulic cement includes a cement selected from the group consisting of microfine cement, slag cement, calcium aluminate cement, plaster, silicate cement, gypsum cement, phosphate cement, white cement, high-alumina cement, magnesium oxychloride cement, aggregates coated with microfine cement particles, and mixtures thereof.

15. A method for extruding a hydraulically settable mixture as defined in claim 12, wherein the hydraulic cement includes a cement selected from the group consisting of macro defect free cement and DSP cement.

16. A method for extruding a hydraulically settable mixture as defined in claim 1, wherein the hydraulically settable binder comprises gypsum hemihydrate.

17. A method for extruding a hydraulically settable mixture as defined in claim 1, wherein the hydraulically settable binder comprises fly ash activated with a strong base.

18. A method for extruding a hydraulically settable mixture as defined in claim 1, wherein the combining step includes adding a fibrous material to the hydraulically settable mixture.

19. A method for extruding a hydraulically settable mixture as defined in claim 18, wherein the fibrous material comprises cellulosic fibers.

20. A method for extruding a hydraulically settable mixture as defined in claim 19, wherein the cellulosic fibers are selected from the group consisting of cotton, bagasse, hemp, abaca, sisal, and mixtures thereof.

21. A method for extruding a hydraulically settable mixture as defined in claim 19, wherein the cellulosic fibers comprise wood fibers.

22. A method for extruding a hydraulically settable mixture as defined in claim 18, wherein the fibrous material is selected from the group consisting of ceramic fibers, glass fibers, carbon fibers, and mixtures thereof.

23. A method for extruding a hydraulically settable mixture as defined in claim 18, wherein the fibrous material comprises metal fibers.

24. A method for extruding a hydraulically settable mixture as defined in claim 18, wherein the fibrous material comprises synthetic organic polymer fibers.

25. A method for extruding a hydraulically settable mixture as defined in claim 18, wherein the fibrous material has a concentration in a range from about 0.5% to about 30% by volume of the hydraulically settable mixture.

26. A method for extruding a hydraulically settable mixture as defined in claim 18, wherein the fibrous material has a concentration in a range from about 1% to about 20% by volume of the hydraulically settable mixture.

27. A method for extruding a hydraulically settable mixture as defined in claim 18, wherein the fibrous material has a concentration in a range from about 2% to about 10% by volume of the hydraulically settable mixture.

28. A method for extruding a hydraulically settable mixture as defined in claim 1, wherein the step of allowing the hydraulically settable matrix to cure includes autoclaving the extruded article of manufacture.

29. A method for extruding a hydraulically settable mixture as defined in claim 1, wherein the step of allowing the hydraulically settable matrix to cure includes passing the extruded article by a source of thermal energy.

30. A method for extruding a hydraulically settable mixture as defined in claim 1, wherein the rheology-modifying agent is included in a range from about 0.1% to about 5% by weight of the hydraulically settable mixture exclusive of the water.

31. A method for extruding a hydraulically settable mixture as defined in claim 1, wherein the rheology-modifying agent is included in a range from about 0.5% to about 1% by weight of the hydraulically settable mixture exclusive of the water.

32. A method for extruding a hydraulically settable mixture as defined in claim 1, wherein the rheology-modifying agent comprises a cellulose-based material or a derivative thereof.

33. A method for extruding a hydraulically settable mixture as defined in claim 32, wherein the cellulose-based material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures thereof.

34. A method for extruding a hydraulically settable mixture as defined in claim 1, wherein the rheology-modifying agent comprises a starch-based material or a derivative thereof.

35. A method for extruding a hydraulically settable mixture as defined in claim 34, wherein the starch-based material is selected from the group consisting of amylopectin, amylose, sea gel, starch acetates, starch hydroxyethyl ethers, ionic starches, long-chain alkyl starches, dextrins, amine starches, phosphate starches, dialdehyde starches, and mixtures thereof.

36. A method for extruding a hydraulically settable mixture as defined in claim 1, wherein the rheology-modifying agent comprises a protein-based material or a derivative thereof.

37. A method for extruding a hydraulically settable mixture as defined in claim 36, wherein the protein-based material is selected from the group consisting of prolamine, collagen derivatives, gelatin, glue, casein, and mixtures thereof.

38. A method for extruding a hydraulically settable mixture as defined in claim 1, wherein the rheology-modifying agent comprises a synthetic organic material.

39. A method for extruding a hydraulically settable mixture as defined in claim 38, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polylactic acid, polyacrylimides, ethylene oxide polymers, latex, and mixtures thereof.

40. A method for extruding a hydraulically settable mixture as defined in claim 1, wherein the rheology-modifying agent is selected from the group consisting of alginic acid, phycocolloids, agar, gum arabic, guar gum, locust bean gum, gum karaya, gum tragacanth, and mixtures thereof.

41. A method for extruding a hydraulically settable mixture as defined in claim 1, wherein the combining step includes adding a dispersant to the hydraulically settable mixture.

42. A method for extruding a hydraulically settable mixture as defined in claim 41, wherein the dispersant is combined into the hydraulically settable mixture after the formation of early hydration products.

43. A method for extruding a hydraulically settable mixture as defined in claim 41, wherein the dispersant is selected from the group consisting of sulfonated naphthalene-formaldehyde condensate, sulfonated melamineformaldehyde condensate, lignosulfonate, acrylic acid, and salts of the foregoing.

44. A method for extruding a hydraulically settable mixture as defined in claim 41, wherein the dispersant is added to the hydraulically settable mixture prior to adding the rheology-modifying agent to the mixture.

45. A method for extruding a hydraulically settable mixture as defined in claim 1, wherein the aggregate material includes clay.

46. A method for extruding a hydraulically settable mixture as defined in claim 1, wherein the aggregate material is selected from the group consisting of gravel, sand, alumina, silica sand, fused silica, crushed limestone, crushed sandstone, crushed granite, crushed basalt, and mixtures thereof.

47. A method for extruding a hydraulically settable mixture as defined in claim 1, wherein the aggregate material includes silica fume.

48. A method for extruding a hydraulically settable mixture as defined in claim 1, wherein the aggregate material includes hydraulically settable binder particles that are at least partially hydrated.

49. A method for extruding a hydraulically settable mixture as defined in claim 1, wherein the aggregate material includes fly ash.

50. A method for extruding a hydraulically settable mixture as defined in claim 1, further including the step of joining together a plurality of extruded articles of manufacture.

51. A method for extruding a hydraulically settable mixture as defined in claim 1, further including the step of reshaping the extruded article of manufacture into a desired shape.

52. A method for extruding a hydraulically settable mixture as defined in claim 1, wherein the extruding step includes extruding the hydraulically settable mixture into a pipe.

53. A method for extruding a hydraulically settable mixture as defined in claim 1, wherein the extruding step includes extruding the hydraulically settable mixture into a bar.

54. A method for extruding a hydraulically settable mixture as defined in claim 1, wherein the extruding step includes extruding the hydraulically settable mixture into a multicellular structure.

55. A method for extruding a hydraulically settable mixture as defined in claim 54, wherein the multicellular structure comprises a honeycomb structure.

56. A method for extruding a hydraulically settable mixture as defined in claim 54, wherein the multicellular structure has a bulk density up to about 1.5 $g/cm^3$.

57. A method for extruding a hydraulically settable mixture as defined in claim 54, wherein the multicellular structure has a bulk density up to about 0.7 $g/cm^3$.

58. A method for extruding a hydraulically settable mixture as defined in claim 54, wherein the multicellular structure has a bulk density up to about 0.3 $g/cm^3$.

59. A method for extruding a hydraulically settable mixture as defined in claim 1, wherein the extruding step includes extruding the hydraulically settable mixture into an I-beam.

60. A method for extruding a hydraulically settable mixture as defined in claim 1, wherein the extruding step includes extruding the hydraulically settable mixture into a sheet.

61. A method for extruding a hydraulically settable mixture as defined in claim 1, wherein the extruding step includes extruding the hydraulically settable mixture into a board.

62. A method for extruding a hydraulically settable mixture as defined in claim 1, wherein the extruding step includes extruding the hydraulically settable mixture into a two-by-four.

63. A method for extruding a hydraulically settable mixture as defined in claim 1, wherein the extruding step includes extruding the hydraulically settable mixture into a window frame.

64. A method for extruding a hydraulically settable mixture as defined in claim 1, wherein the extruding step includes extruding the hydraulically settable mixture into a brick.

65. A method for extruding a hydraulically settable mixture as defined in claim 1, wherein the extruding step includes extruding the hydraulically settable mixture into a roofing tile.

66. A method for extruding a hydraulically settable mixture as defined in claim 1, wherein the extruding step includes extruding the hydraulically settable mixture into a wall panel.

67. A method for extruding a hydraulically settable mixture as defined in claim 1, wherein the hydraulically settable matrix has a thickness less than about 3 min.

68. A method for extruding a hydraulically settable mixture as defined in claim 1, wherein the hydraulically settable matrix has a thickness less than about 1 mm.

69. A method for extruding a hydraulically settable mixture as defined in claim 1, wherein the hydraulically settable matrix includes a wall having a thickness and defining a cavity, and wherein the wall thickness to cavity ratio of the hydraulically settable matrix is less than about 0.25.

70. A method for extruding a hydraulically settable mixture as defined in claim 69, wherein the wall thickness to cavity ratio of the hydraulically settable matrix is less than about 0.15.

71. A method for extruding a hydraulically settable mixture as defined in claim 69, wherein the wall thickness to cavity ratio of the hydraulically settable matrix is less than about 0.1.

72. A method for extruding a hydraulically settable mixture as defined in claim 1, wherein the cured hydraulically settable matrix of the article of manufacture has a tensile strength greater than about 15 MPa.

73. A method for extruding a hydraulically settable mixture as defined in claim 1, wherein the cured hydraulically settable matrix of the article of manufacture has a tensile strength greater than about 30 MPa.

74. A method for extruding a hydraulically settable mixture as defined in claim 1, wherein the cured hydraulically settable matrix of the article of manufacture has a tensile strength greater than about 50 MPa.

75. A method for extruding a hydraulically settable mixture as defined in claim 1, wherein the cured hydraulically settable matrix has a tensile strength to bulk density ratio greater than about 5 MPa·cm³/g.

76. A method for extruding a hydraulically settable mixture as defined in claim 1, wherein the cured hydraulically settable matrix has a tensile strength to bulk density ratio greater than about 15 MPa·cm³/g.

77. A method for extruding a hydraulically settable mixture as defined in claim 1, wherein the cured hydraulically settable matrix has a tensile strength to bulk density ratio greater than about 30 MPa·cm³/g.

78. A method for extruding a hydraulically settable mixture as defined in claim 1, wherein the hydraulically settable binder and water together form a hydraulic paste having a specific gravity greater than about 2.2.

79. A method for extruding a hydraulically settable mixture as defined in claim 1, wherein the hydraulically settable binder and water together form a hydraulic paste having a specific gravity greater than about 2.5.

80. A method for extruding a hydraulically settable mixture as defined in claim 1, wherein the hydraulically settable binder and water together form a hydraulic paste having a specific gravity greater than about 2.7.

81. A method for extruding a hydraulically settable mixture as defined in claim 1, wherein the hydraulically settable mixture has a water to hydraulically settable binder ratio less than about 0.35 w/w.

82. A method for extruding a hydraulically settable mixture as defined in claim 1, wherein the initial net deficiency of water is at least about 10%.

83. A method for extruding a hydraulically settable mixture as defined in claim 1, wherein the initial net deficiency of water is at least about 25%.

84. A method for extruding a hydraulically settable mixture as defined in claim 1, wherein the initial net deficiency of water is at least about 50%.

85. A method for extruding a hydraulically settable mixture as defined in claim 1, wherein the initial net deficiency of water is at least about 75%.

86. A method for extruding a hydraulically settable mixture to form an article of manufacture having a hydraulically settable matrix, the method including the steps of:

mixing a hydraulically settable binder, at least one aggregate material, and water under sufficient shear to create a substantially homogeneous hydraulically settable mixture having an initial net deficiency of water such that the mixture is initially granular and substantially noncohesive;

extruding the hydraulically settable mixture under a pressure sufficient to cause the mixture to become cohesive and flow through a die to form an article of manufacture of a desired shape and having a hydraulically settable matrix, the hydraulically settable matrix of the extruded article of manufacture being form-stable immediately after being extruded through the die, the hydraulically settable matrix including a wall having a thickness and defining a cavity, the wall thickness to cavity ratio of the hydraulically settable matrix being less than about 0.25; and allowing the hydraulically settable matrix of the extruded article of manufacture to cure.

87. A method for extruding a hydraulically settable mixture as defined in claim 86, wherein the wall thickness to cavity ratio of the hydraulically settable matrix is less than about 0.15.

88. A method for extruding a hydraulically settable mixture as defined in claim 86, wherein the wall thickness to cavity ratio of the hydraulically settable matrix is less than about 0.1.

89. A method for extruding a hydraulically settable mixture to form an article of manufacture having a hydraulically settable matrix, the method including the steps of:

combining a hydraulically settable binder, at least one aggregate material, and water to form a hydraulically settable mixture having an initial net deficiency of water such that the mixture is initially granular and substantially noncohesive;

extruding the hydraulically settable mixture under a pressure sufficient to cause the mixture to become cohesive and flow through a die to form an article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure, wherein the cured hydraulically settable matrix of the article of manufacture has a bulk density less than about 1.5 g/cm³.

90. A method for extruding a hydraulically settable mixture to form an article of manufacture having a hydraulically settable matrix, the method including the steps of:

mixing a hydraulically settable binder, at least one aggregate material, and water under sufficient shear to create a substantially homogeneous hydraulically settable mixture having an initial net deficiency of water such that the mixture is initially granular and substantially noncohesive;

extruding the hydraulically settable mixture under a pressure sufficient to cause the mixture to become cohesive and flow through a die to form an article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure, wherein the cured hydraulically settable matrix of the article of manufacture has a tensile strength greater than about 15 MPa.

91. A method for extruding a hydraulically settable mixture as defined in claim 90, wherein the cured hydraulically settable matrix has a tensile strength to bulk density ratio greater than about 5 MPa·cm³/g.

92. A method for extruding a hydraulically settable mixture to form an article of manufacture having a hydraulically settable matrix, the method including the steps of:

combining a hydraulically settable binder, at least one aggregate material, and water to form a hydraulically settable mixture having a water to hydraulically settable binder ratio less than about 0.35 w/w and having an initial net deficiency of water such that the mixture is initially granular and substantially noncohesive;

extruding the hydraulically settable mixture under a pressure sufficient to cause the mixture to become cohesive and flow through a die to form an article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure.

93. A method for extruding a hydraulically settable mixture to form an article of manufacture having a hydraulically wettable matrix, the method including the steps of:

combining a hydraulically settable binder, at least one aggregate material, and water to form a hydraulically settable mixture, a portion of the water being available to interact with the hydraulically settable binder, the hydraulically settable binder and the portion of the water being available to interact with the hydraulically settable binder together forming a hydraulic paste having a water to hydraulically settable binder ratio less than about 0.27 w/w, the hydraulically settable mixture having an initial net deficiency of water such that the mixture is initially granular and substantially noncohesive;

extruding the hydraulically settable mixture under a pressure sufficient to cause the mixture to become cohesive and flow through a die to form an article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure.

94. A method for extruding a hydraulically settable mixture as defined in claim 93, wherein the hydraulic paste has a water to hydraulically settable binder ratio less than about 0.25 w/w.

95. A method for extruding a hydraulically settable mixture as defined in claim 93, wherein the hydraulic paste has a water to hydraulically settable binder ratio less than about 0.22 w/w.

96. A method for extruding a hydraulically settable mixture as defined in claim 93, wherein the hydraulic paste has a water to hydraulically settable binder ratio less than about 0.2 w/w.

97. A method for extruding a hydraulically settable mixture to form an article of manufacture having a hydraulically settable matrix, the method comprising the steps of:

combining a hydraulically settable binder, at least one aggregate, and water to form a hydraulically settable mixture having an initial net deficiency of water such that the mixture is initially granular and substantially noncohesive, the hydraulically settable binder and aggregate material together including a plurality of particles having an initial particle packing density;

extruding the hydraulically settable mixture under an extrusion pressure sufficient to increase the initial particle packing density, thereby decreasing the initial net deficiency of water of the hydraulically settable mixture such that the hydraulically settable mixture becomes substantially cohesive and is caused to flow through a die to form an article of manufacture of a desired shape and having a hydraulically settable matrix, the hydraulically settable matrix of the extruded article of manufacture being form-stable immediately after being extruded through the die; and allowing the hydraulically settable matrix of the extruded article of manufacture to cure.

98. A method for extruding a hydraulically settable mixture as defined in claim 97, wherein the hydraulically settable matrix of the extruded article of manufacture has a net deficiency of water immediately after being extruded.

99. A method for extruding a hydraulically settable mixture as defined in claim 97, wherein the initial net deficiency of water of the hydraulically settable mixture is greater than about 10%.

100. A method for extruding a hydraulically settable mixture as defined in claim 97, wherein the initial net deficiency of water of the hydraulically settable mixture is greater than about 25%.

101. A method for extruding a hydraulically settable mixture as defined in claim 97, wherein the initial net deficiency of water of the hydraulically settable mixture is greater than about 50%.

102. A method for extruding a hydraulically settable mixture as defined in claim 97, wherein the initial net deficiency of water of the hydraulically settable mixture is greater than about 75%.

103. A method for extruding a hydraulically settable mixture as defined in claim 97, wherein the extrusion pressure is sufficient to cause the hydraulically settable mixture to have a net excess of water during the extruding step.

104. A method for extruding a hydraulically settable mixture to form an article of manufacture having a hydraulically settable matrix, the method comprising the steps of:

combining a hydraulically settable binder, at least one aggregate, a rheology-modifying agent and water to form a hydraulically settable mixture having an initial net deficiency of water such that the mixture is initially granular and substantially noncohesive, the hydraulically settable binder and aggregate together including a plurality of particles having an initial particle packing density;

extruding the hydraulically settable mixture under an extrusion pressure sufficient to increase the initial particle packing density, thereby decreasing the initial net deficiency of water of the hydraulically settable mixture, the decrease in the initial net deficiency of water in combination with the rheology-modifying agent causing the hydraulically settable mixture to become substantially cohesive and to flow through a die to form an article of manufacture of a desired shape and having a hydraulically settable matrix, the hydraulically settable matrix of the extruded article of manufacture being form stable immediately after being extruded through the die; and allowing the hydraulically settable matrix of the extruded article of manufacture to cure.

\* \* \* \* \*

UNITED STATES PATENT AND TRADEMARK OFFICE
CERTIFICATE OF CORRECTION

PATENT NO. : 5,549,859  
DATED : August 27, 1996  
INVENTOR(S) : Per Just Andersen, Ph.D. and Simon K. Hodson Page 1 of 2

It is certified that error appears in the above-indentified patent and that said Letters Patent is hereby corrected as shown below:

On the Title page,

In the section entitled "Related U.S. Application Data" (Item No. 63), in the second line after "Jul." change "20" to --21--.

In the section entitled "References Cited" (Item No. 56), under the subheading "OTHER PUBLICATIONS", please make the following changes:

At page 2, second column, in each of the "Anderson" references, change "Anderson" to --Andersen--; and in the "Purton" reference, third line, change "13 √" to --13-29--.

At page 3, second column, in the "Anderson" reference, change "Anderson" to --Andersen--.

At col. 8, line 19, after "mixture" change "creates" to --create--.

At col. 11, line 17, change "FIG. 3 is" to --FIGS. 3A and 3B show--.

At col. 21, line 38, after "foregoing" change "patents" to --patent--.

At col. 22, line 25, after "flocculating" change "affects" to --effects--.

At col. 23, line 58, after "significant" change "mounts" to --amounts--.

At col. 24, line 8, after "reduce the" change "mount" to --amount--.

UNITED STATES PATENT AND TRADEMARK OFFICE
CERTIFICATE OF CORRECTION

PATENT NO. : 5,549,859
DATED : August 27, 1996
INVENTOR(S) : Per Just Andersen, Ph.D. and Simon K. Hodson It is certified that error appears in the above-indentified patent and that said Letters Patent is hereby corrected as shown below:

At col. 28, line 42, change "rheologyomodifying" to --rheology-modifying--.

At col. 35, line 67, after "where" delete "a".

At col. 37, line 33, before "extrusion" insert --the--.

At col. 38, line 22, after "order to" change "extruded" to --extrude--.

At col. 44, line 66, after "have" delete "a".

At col. 45, line 44, after "various" delete "o".

At col. 49, line 6, after "form-" change "stabilitty" to --stability--.

At col. 50, line 21, after "mixtures" change "have" to --had--.

At col. 74, line 49, after "3" change "min." to --mm--.

Signed and Sealed this

Twenty-eighth Day of January, 1997

Attest:

BRUCE LEHMAN

*Attesting Officer*   *Commissioner of Patents and Trademarks*